United States Patent
Ueno

(10) Patent No.: US 7,649,631 B2
(45) Date of Patent: Jan. 19, 2010

(54) DISTANCE/SPEED METER AND DISTANCE/SPEED MEASURING METHOD

(75) Inventor: Tatsuya Ueno, Tokyo (JP)

(73) Assignee: Yamatake Corporation, Tokyo (JP)

( * ) Notice: Subject to any disclaimer, the term of this patent is extended or adjusted under 35 U.S.C. 154(b) by 86 days.

(21) Appl. No.: 12/156,772

(22) Filed: Jun. 3, 2008

(65) Prior Publication Data

US 2008/0304042 A1    Dec. 11, 2008

(30) Foreign Application Priority Data

Jun. 6, 2007 (JP) ............................. 2007-150102
Mar. 5, 2008 (JP) ............................. 2008-054706

(51) Int. Cl.
*G01B 11/02* (2006.01)
(52) U.S. Cl. ..................................................... 356/498
(58) Field of Classification Search ................. 356/492, 356/498
See application file for complete search history.

(56) References Cited

U.S. PATENT DOCUMENTS

| | | | | |
|---|---|---|---|---|
| 3,572,935 | A * | 3/1971 | Howell et al. ................ | 356/498 |
| 3,574,292 | A * | 4/1971 | Butts ............................. | 91/37 |
| 2008/0181354 | A1* | 7/2008 | Ueno ........................... | 377/24 |

FOREIGN PATENT DOCUMENTS

JP     2006-313080 A     11/2006

OTHER PUBLICATIONS

Ueda et al., "Distance Meter Using Self-Mixing Effect of Semiconductor Laser", Papers for 1994 Tokai-Section Joint Conference of the 8 Institutes of Electrical and Related Engineers.
Yamada et al., "Study of Compact Distance Meter by Self-Coupled Effect of Laser Diode", Bulletin of Aichi Institute of Technology, vol. 31B, pp. 35-42, 1996.
Giuliani et al., "Laser diode self-mixing Technique for sensing applications", Journal of Optics A: Pure and Applied Optics, pp. 283-294, 2002.

* cited by examiner

*Primary Examiner*—Tarifur Chowdhury
*Assistant Examiner*—Jonathon D Cook
(74) *Attorney, Agent, or Firm*—Blakely, Sokoloff, Taylor & Zafman LLP

(57) ABSTRACT

In a distance/speed meter, first and second semiconductor lasers emit parallel laser light beams to a measurement target. A first laser driver drives the first semiconductor laser such that the oscillation interval in which at least the oscillation wavelength monotonically increases repeatedly exists. A second laser driver drives the second semiconductor laser such that the oscillation wavelength increases/decreases inversely to the oscillation wavelength of the first semiconductor laser. First and second light-receiving devices convert optical outputs from the first and second semiconductor lasers into electrical signals. A counting unit counts the numbers of interference waveforms generated by the first and second laser light beams and return light beams of the first and second laser light beams. A computing device computes the distance to the measurement target and the speed of the measurement target from the minimum and maximum oscillation wavelengths of the first and second semiconductor lasers and the count result obtained by the counting unit.

19 Claims, 20 Drawing Sheets

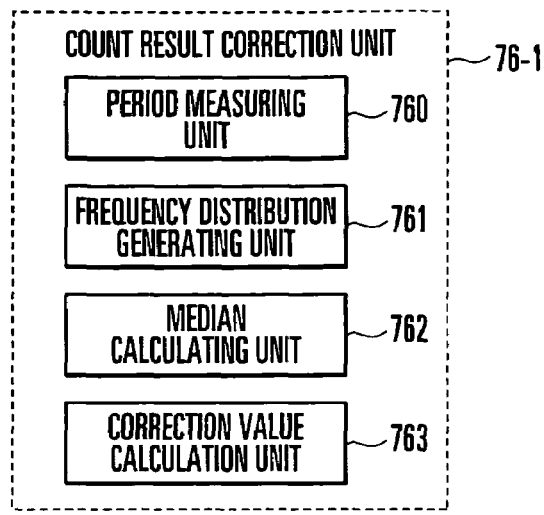
FIG. 14
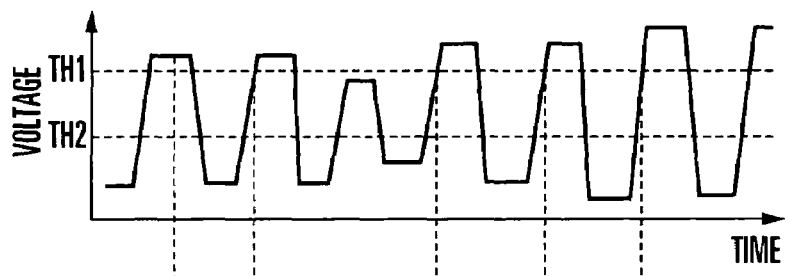
FIG. 15A
FIG. 15B
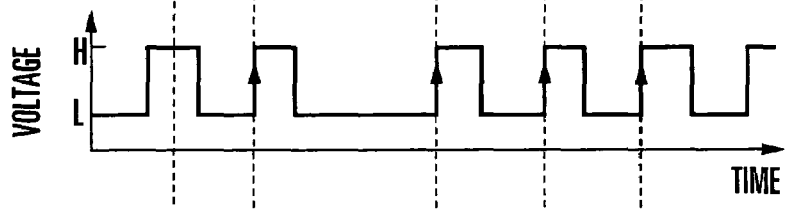
FIG. 15C
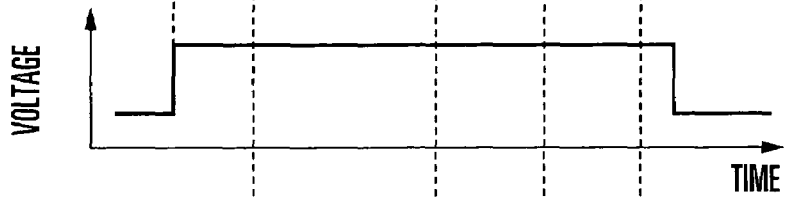
FIG. 15D
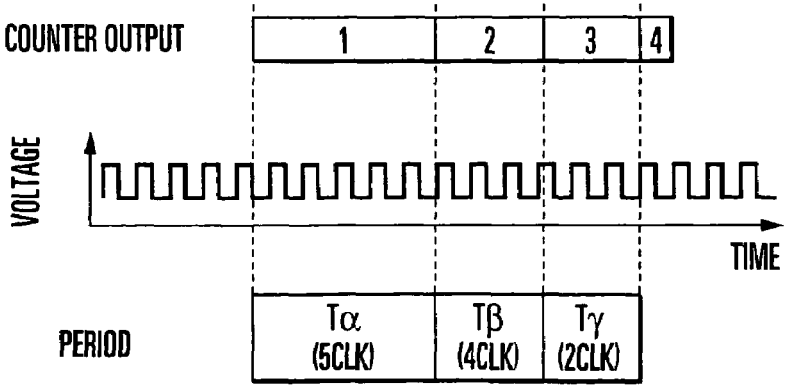
FIG. 15E
FIG. 15F

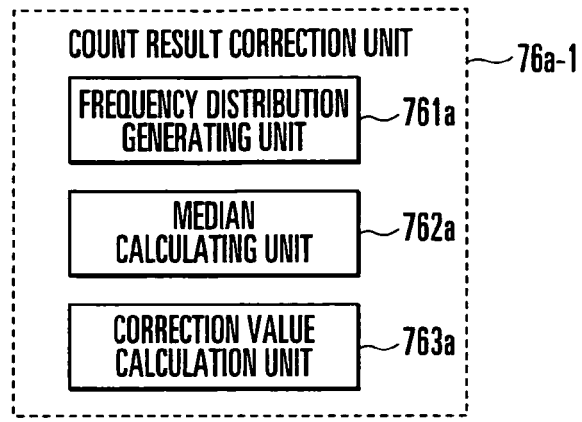
F I G. 32
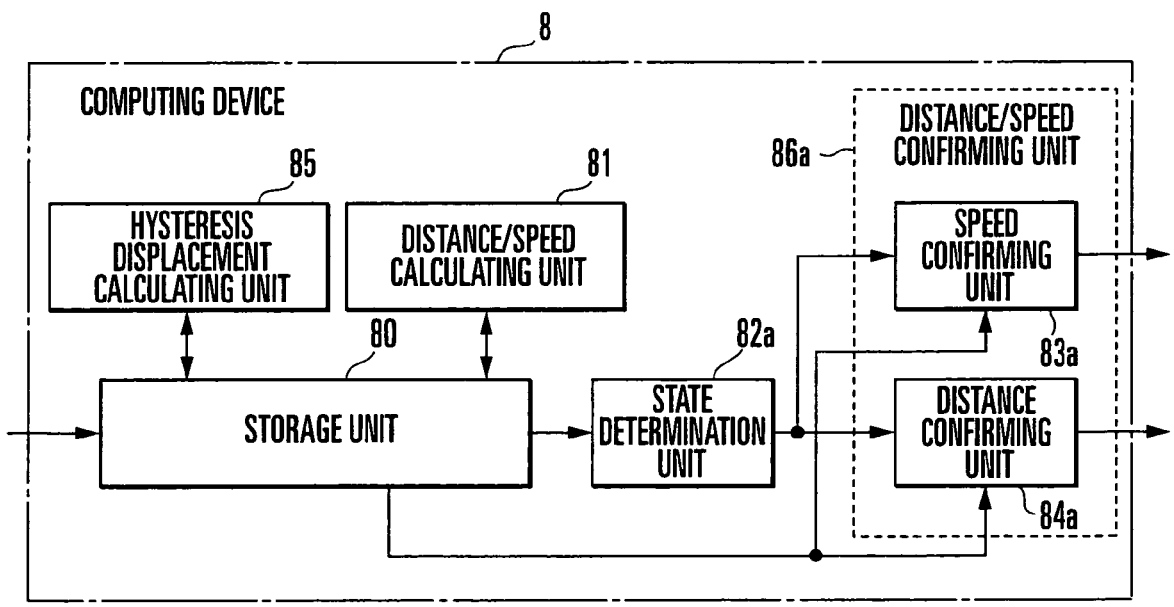
F I G. 33

DISTANCE/SPEED METER AND DISTANCE/SPEED MEASURING METHOD

BACKGROUND OF THE INVENTION

The present invention relates to a distance/speed meter and distance/speed measuring method which measure at least the distance to a measurement target or the speed of the measurement target by using optical interference.

Distance measurement by a laser using optical interference does not disturb a measurement target because of noncontact measurement, and has been used for a long time as a high-accuracy measuring method. Recently, attempts have been made to use a semiconductor laser as a light measurement light source to achieve a reduction in apparatus size. A typical example of such an apparatus is an apparatus using an FM heterodyne interferometer. This apparatus can measure a relatively long distance with high accuracy, but has a drawback of a complicated optical system because of the use of an interferometer outside a semiconductor laser.

In contrast to this, measuring instruments have been proposed, which use the interference between output light from a semiconductor laser and return light from a measurement target inside the laser (self-mixing effect) in, for example, reference 1 (Tadashi Ueda, Jun Yamada, and Susumu Shitoh, "Distance Meter Using Self-Coupled Effect of Semiconductor Laser", Papers for 1994 Tokai-Section Joint Conference of the 8 Institutes of Electrical and Related Engineers), reference 2 (Jun Yamada, Susumu Shitoh, Norio Tuda, and Tadashi Ueda, "Study of Compact Distance Meter by Self-Coupled Effect of Laser Diode", Bulletin of Aichi Institute of Technology, Vol. 31B, pp. 35-42, 1996), and reference 3 (Guido Giuliani, Michele Norgia, Silvano Donati and Thierry Bosch, "Laser diode self-mixing technique for sensing applications", JOURNAL OF OPTICS A: PURE AND APPLIED OPTICS, pp. 283-294, 2002).

In such a self-mixing type laser measuring instrument, a photodiode built-in semiconductor laser has light-emitting, interference, and light-receiving functions at the same time, and hence allows great simplification of an external interference optical system. A sensor unit therefore comprises only a semiconductor laser and a lens, and becomes smaller than conventional sensor units. This instrument also has a characteristic feature that its distance measurement range is wider than that of triangulation.

FIG. 39 shows a complex cavity model of an FP type (Fabry-Perot type) semiconductor laser. Part of reflected light from a measurement target 104 tends to return into an oscillation area. Slight return light mixes with laser light inside a semiconductor laser cavity 101, resulting in unstable operation and noise (complex cavity noise or return light noise). Even a very small amount of return light relative to output light causes a noticeable change in the characteristics of the semiconductor laser. Such a phenomenon is not limited to a Fabry-Perot type (to be referred to as an FP type) semiconductor laser, and also occurs in other types of semiconductor lasers such as a vertical cavity surface emitting laser (to be referred to as a VCSEL type hereinafter) and a distributed feedback laser type (to be referred to as a DFB laser type).

Let λ be the oscillation wavelength of the laser and L be the distance from a cleavage plane 102 near the measurement target 104 to the measurement target 104. In this case, when the following resonance condition is satisfied, return light and laser light in the cavity 101 strengthen each other. Consequently, the laser power slightly increases.

$$L = q\lambda/2 \qquad (1)$$

where q is an integer. This phenomenon can be sufficiently observed even with very weak scattered light from the measurement target 104 when an amplifying action occurs as the apparent reflectance inside the semiconductor laser cavity 101 increases.

A semiconductor laser emits laser light having different frequencies in accordance with the magnitude of injection current. This laser therefore allows direct modulation of the oscillation frequency by using an injection current without requiring any external modulator when an oscillation frequency is modulated. FIG. 40 shows the relationship between the oscillation wavelength and the output waveform of a photodiode 103 when the oscillation wavelength of the semiconductor laser is changed at a predetermined rate. When $L = q\lambda/2$ indicated in equation (1) is satisfied, the phase difference between return light and laser light inside the cavity 101 becomes 0° (in phase), and the return light and the laser light inside the cavity 101 strengthen each other most. When $L = q\lambda/2 + \lambda/4$, the phase difference becomes 180° (in opposite phase), and the return light and the laser light inside the cavity 101 weaken each other most. As the oscillation wavelength of the semiconductor laser is changed, therefore, the laser power increases and decreases alternately and repeatedly. When the laser power is detected at this time by the photodiode 103 provided in the cavity 101, a stepwise waveform having a constant period like that shown in FIG. 40 is obtained. Such a waveform is generally called an interference fringe.

Each of the elements of this stepwise waveform, i.e., the interference fringe, is called a mode hop pulse (to be referred to as an MHP hereinafter). MHP is a phenomenon different from a mode hopping phenomenon. Assume that the distance to the measurement target 104 is represented by L1, and the number of MHPs is 10. In this case, as the distance decreases to L2 which is ½ of L1, the number of MHPs becomes five. That is, as the oscillation wavelength of the semiconductor laser changes in a predetermined time, the number of MHPs changes in proportion to the measurement distance. Therefore, detecting MHPs by the photodiode 103 and measuring the frequency of MHPs can easily measure the distance.

A self-mixing type laser measuring instrument allows great simplification of an external interference optical system outside a cavity, and hence can achieve downsizing. In addition, this instrument requires no high-speed circuit and is robust against disturbance light. In addition, the instrument can operate even with very weak return light from a measurement target, and hence is not influenced by the reflectance of the measurement target. That is, the instrument can be used for any types of measurement targets. However, conventional interference type distance meters including self-mixing type distance meters cannot measure distances to moving measurement targets, even though they can measure distances to stationary measurement targets.

The present inventor has therefore proposed a distance/speed meter which can measure the speed of a measurement target as well as the distance to a stationary measurement target, as disclosed in reference 4 (Japanese Patent Laid-Open No. 2006-313080). FIG. 41 shows the arrangement of this distance/speed meter. The distance/speed meter in FIG. 41 includes a semiconductor laser 201 which applies a laser beam to a measurement target, a photodiode 202 which converts an optical output from the semiconductor laser 201 into an electrical signal, a lens 203 which focuses light from the semiconductor laser 201 to apply it to a measurement target 210 and also focuses return light from the measurement target 210 to make it strike the semiconductor laser 201, a laser driver 204 which causes the semiconductor laser 201 to alternately repeat the first oscillation interval in which the oscillation wavelength of the semiconductor laser 201 continuously increases and the second oscillation interval in which the oscillation wavelength continuously decreases, a current/voltage conversion amplifier 205 which converts an output current from the photodiode 202 into a voltage and amplifies it, a signal extraction circuit 206 which calculates the second-order differential of an output voltage from the current/voltage conversion amplifier 205, a counting circuit 207 which counts the number of MHPs contained in an output voltage from the signal extraction circuit 206, a computing device 208 which calculates the distance to the measurement target 210 and the speed of the measurement target 210, and a display device 209 which displays the calculation result obtained by the computing device 208.

The laser driver 204 supplies a triangular wave driving current, which repeatedly increases and decreases at a constant change rate with respect to time, as an injection current and supplies it to the semiconductor laser 201. With this operation, the semiconductor laser 201 is driven to alternately repeat the first oscillation interval in which the oscillation wavelength continuously increases at a constant change rate and the second oscillation interval in which the oscillation wavelength continuously decreases at a constant change rate. FIG. 42 shows a temporal change in the oscillation wavelength of the semiconductor laser 201. Referring to FIG. 42, reference symbol P1 denotes the first oscillation interval; P2, the second oscillation interval; $\lambda a$, the minimum value of the oscillation wavelength in each interval; $\lambda b$, the maximum value of the oscillation wavelength in each interval; and T, the period of a rectangular wave.

The laser light emitted from the semiconductor laser 201 is focused by the lens 203 and strikes the measurement target 210. The light reflected by the measurement target 210 is focused by the lens 203 and strikes the semiconductor laser 201. The photodiode 202 converts an optical output from the semiconductor laser 201 into a current. The current/voltage conversion amplifier 205 converts an output current from the photodiode 202 into a voltage. The signal extraction circuit 206 calculates the second-order differential of the output voltage from the current/voltage conversion amplifier 205. The counting circuit 207 counts the number of MHPs contained in the output voltage from the signal extraction circuit 206 in each of first and second oscillation intervals P1 and P2. The computing device 208 calculates the distance to the measurement target 210 and the speed of the measurement target 210 on the basis of the minimum oscillation wavelength $\lambda a$ and maximum oscillation wavelength $\lambda b$ of the semiconductor laser 201, the number of MHPs in the first oscillation interval P1, and the number of MHPs in the second oscillation interval P2.

The distance/speed meter disclosed in reference 4 can simultaneously measure the distance to a measurement target and the speed of the measurement target. In order to measure a distance and a speed, this distance/speed meter, however, needs to count the number of MHPs at least three times in, for example, a first oscillation interval t−1, second oscillation interval t, and first oscillation interval t+1. This meter requires a long period of time for measurement.

SUMMARY OF THE INVENTION

The present invention has been made to solve the above problem, and has as its object to shorten the measurement time in a distance/speed meter and distance/speed measuring method which can measure the speed of a measurement target as well as the distance to a stationary measurement target by using optical interference.

In order to achieve the above object, according to the present invention, there is provided a distance/speed meter comprising a first semiconductor laser which emits first laser light to a measurement target, a second semiconductor laser which emits second laser light to the measurement target parallelly to the first laser light, a first laser driver which drives the first semiconductor laser such that an oscillation interval in which at least an oscillation wavelength monotonically increases repeatedly exists, a second laser driver which drives the second semiconductor laser such that an oscillation wavelength increases/decreases inversely to the oscillation wavelength of the first semiconductor laser, a first light-receiving device which converts at least an optical output from the first semiconductor laser into an electrical signal, a second light-receiving device which converts at least an optical output from the second semiconductor laser into an electrical signal, counting means for counting the number of interference waveforms generated by the first laser light and return light of the laser light from the measurement target and contained in an output signal from the first light-receiving device, and the number of interference waveforms generated by the second laser light and return light of the laser light from the measurement target and contained in an output signal from the second light-receiving device, and computing means for calculating at least one of a distance to the measurement target and a speed of the measurement target from a minimum oscillation wavelength and a maximum oscillation wavelength of the first semiconductor laser and the second semiconductor laser and a count result obtained by the counting means.

In addition, according to the present invention, there is provided a distance/speed measuring method comprising the steps of driving a first semiconductor laser which emits first laser light to a measurement target such that an oscillation interval in which at least an oscillation wavelength continuously monotonically increases repeatedly exists, driving a second semiconductor laser which emits second laser light to the measurement target parallelly to the first laser light such that an oscillation wavelength increases/decreases inversely to an oscillation wavelength of the first semiconductor laser, counting the number of interference waveforms generated by the first laser light and return light of the laser light from the measurement target and contained in an output signal from a first light-receiving device, and the number of interference waveforms generated by the second laser light and return light of the laser light from the measurement target and contained in an output signal from a second light-receiving device, and calculating at least one of a distance to the measurement target and a speed of the measurement target from a minimum oscillation wavelength and a maximum oscillation wavelength of the first semiconductor laser and the second semiconductor laser and the numbers of interference waveforms of the first laser light and the second laser light.

BRIEF DESCRIPTION OF THE DRAWINGS

FIG. 14 is a block diagram showing an example of the arrangement of a count result correction unit in the counting device in FIG. 12;

FIGS. 15A to 15F are timing charts for explaining the operation of the counting device in FIG. 12;

FIG. 32 is a block diagram showing an example of the arrangement of a count result correction unit in the counting device in FIG. 30;

FIG. 33 is a block diagram showing an example of the arrangement of a computing device in the fourth embodiment of the present invention;

DESCRIPTION OF THE PREFERRED EMBODIMENTS

The present invention is a technique of measuring a distance on the basis of the interference signal of a wave emitted at the time of sensing using wavelength modulation and a wave reflected by a target. This technique can therefore be applied to optical interferometers other than self-mixing type interferometers and to interferometers other than optical interferometers. A case in which the self-mixing of a semiconductor laser is used will be described in more detail. When the oscillation wavelength of the semiconductor laser is changed while laser light is applied from the laser to a measurement target, the displacement of the measurement target is reflected in the number of MHPs while the oscillation wavelength changes from the minimum oscillation wavelength to the maximum oscillation wavelength (or changes from the maximum oscillation wavelength to the minimum oscillation wavelength). Therefore, checking the number of MHPs as the oscillation wavelength is changed makes it possible to detect the state of a measurement target. The above description has been made about the basic principle of the interferometer.

First Embodiment

Figure 1:
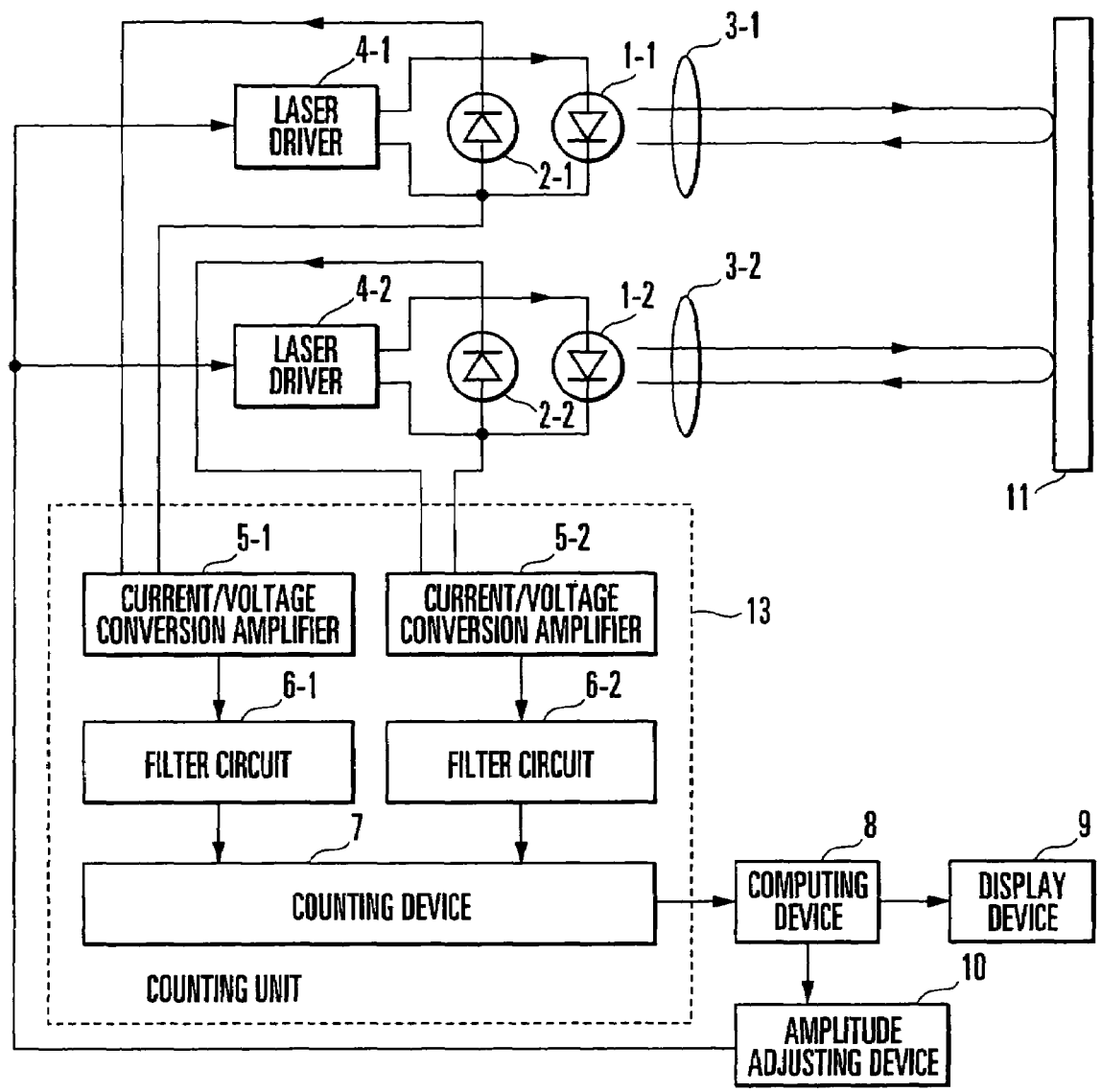
FIG. 1 is a block diagram showing the arrangement of a distance/speed meter according to the first embodiment of the present invention.

The first embodiment of the present invention will be described below with reference to the accompanying drawings. FIG. 1 shows the arrangement of a distance/speed meter according to the first embodiment of the present invention. The distance meter in FIG. 1 includes first and second semiconductor lasers 1-1 and 1-2 which emit laser light beams to a measurement target 11, photodiodes 2-1 and 2-2 serving as first and second light-receiving devices which respectively convert optical outputs from the semiconductor lasers 1-1 and 1-2 into electrical signals, lenses 3-1 and 3-2 which focus light beams from the semiconductor lasers 1-1 and 1-2 to apply them to the measurement target 11 and also focus return light beams from the measurement target 11 to make them strike the semiconductor lasers 1-1 and 1-2, first and second laser drivers 4-1 and 4-2 which cause the semiconductor lasers 1-1 and 1-2 to alternately repeat the first oscillation interval in which the oscillation wavelengths of the semiconductor lasers 1-1 and 1-2 continuously increase and the second oscillation interval in which the oscillation wavelengths continuously decrease, current/voltage conversion amplifiers 5-1 and 5-2 which convert output currents from the photodiodes 2-1 and 2-2 into voltages and amplifies them, filter circuits 6-1 and 6-2 which remove carrier waves from output voltages from the current/voltage conversion amplifiers 5-1 and 5-2, a counting device 7 which counts the numbers of MHPs contained in output voltages from the filter circuits 6-1 and 6-2, a computing device 8 which calculates the distance to the measurement target 11 and the speed of the measurement target 11, a display device 9 which displays the calculation result obtained by the computing device 8, and an amplitude adjusting device 10 which controls the laser drivers 4-1 and 4-2 to properly adjust the amplitudes of driving currents for the semiconductor lasers 1-1 and 1-2. The current/voltage conversion amplifiers 5-1 and 5-2, filter circuits 6-1 and 6-2, and counting device 7 constitute a counting unit 13.

For easy description, assume that as the semiconductor lasers 1-1 and 1-2, lasers of a type (VCSEL type or DFB laser type) that have no mode hopping phenomenon are used.

The laser drivers 4-1 and 4-2 supply triangular wave driving currents, which repeatedly increase and decrease at constant change rates with respect to time, as injection currents and supply them to the semiconductor lasers 1-1 and 1-2. With this operation, each of the semiconductor lasers 1-1 and 1-2 is driven to alternately repeat the first oscillation interval in which the oscillation wavelength continuously increases at a constant change rate in proportion to the magnitude of an injection current and the second oscillation interval in which the oscillation wavelength continuously decreases at a constant change rate. At this time, the laser drivers 4-1 and 4-2 supply driving currents to the semiconductor lasers 1-1 and 1-2 so as to change their oscillation wavelengths in a reverse manner. That is, the change rates of the oscillation wavelengths of the semiconductor lasers 1-1 and 1-2 are equal in absolute value and opposite in polarity. Therefore, when the oscillation wavelength of the semiconductor laser 1-1 becomes the maximum value, the oscillation wavelength of the semiconductor laser 1-2 becomes the minimum value, and vice versa.

Figure 2:
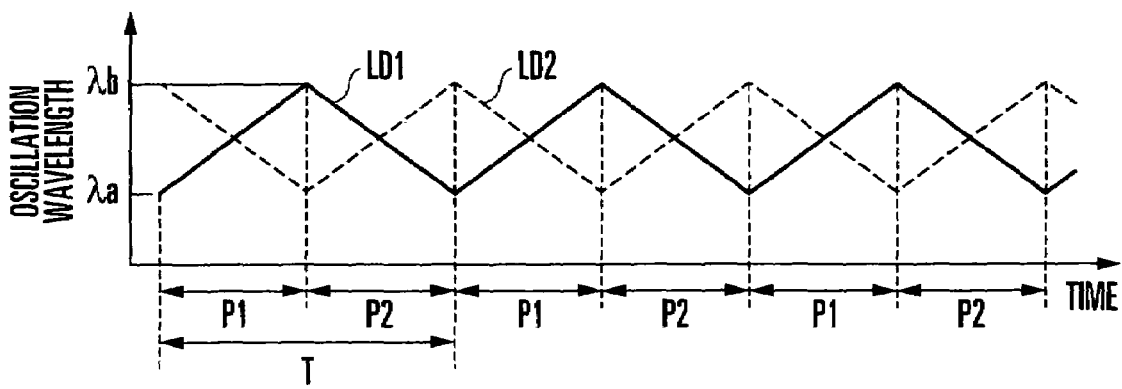
FIG. 2 is a timing chart showing an example of a temporal change in the oscillation wavelength of a semiconductor laser according to the first embodiment of the present invention.

FIG. 2 shows temporal changes in the oscillation wavelengths of the semiconductor lasers 1-1 and 1-2. Referring to FIG. 2, reference symbol LD1 denotes the oscillation wavelength of the semiconductor laser 1-1; LD2, the oscillation wavelength of the semiconductor laser 1-2; P1, the first oscillation interval; P2, the second oscillation interval; $\lambda a$, the minimum value of the oscillation wavelength in each interval; $\lambda b$, the maximum value of the oscillation wavelength in each interval; and T, the period of a rectangular wave. In this embodiment, the maximum value $\lambda b$ and minimum value $\lambda a$ of the oscillation wavelength are kept constant, and a difference $\lambda b - \lambda a$ between them is also kept constant.

The laser light beams emitted from the semiconductor lasers 1-1 and 1-2 are focused by the lenses 3-1 and 3-2 and strike the measurement target 11. At this time, the laser light beams emitted from the semiconductor lasers 1-1 and 1-2 are parallel to each other and strike the measurement target 11. The light beams reflected by the measurement target 11 are focused by the lenses 3-1 and 3-2 and strike the semiconductor lasers 1-1 and 1-2. It is not, however, essential that the lenses 3-1 and 3-2 focus light. The photodiodes 2-1 and 2-2 convert optical outputs from the semiconductor lasers 1-1 and 1-2 into currents. The current/voltage conversion amplifiers 5-1 and 5-2 convert output currents from the photodiodes 2-1 and 2-2 into voltages and amplifies them.

Figures 3A, 3B, 3C, 3D:
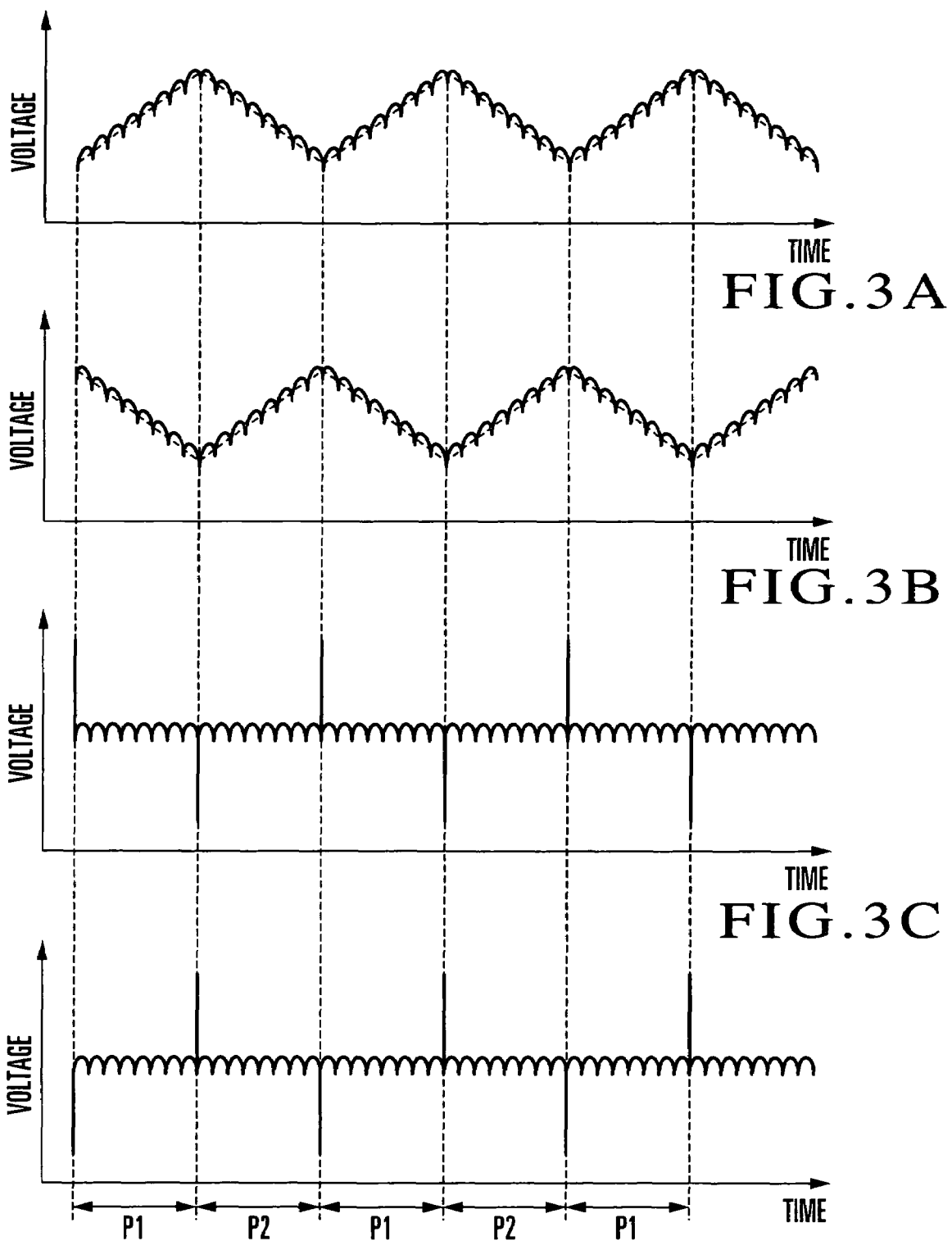
FIGS. 3A and 3B are timing charts each schematically showing the output voltage waveform of each of two current/voltage conversion amplifiers in the first embodiment of the present invention.
FIGS. 3C and 3D are timing charts each schematically showing the output voltage waveform of each of two filter circuits.

Each of the filter circuits 6-1 and 6-2 has a function of extracting a superimposed signal from a modulated wave. FIGS. 3A and 3B schematically show the output voltage waveforms of the current/voltage conversion amplifiers 5-1 and 5-2. FIGS. 3C and 3D schematically show the output voltage waveforms of the filter circuits 6-1 and 6-2. FIGS. 3A to 3D show the process of extracting the MHP waveforms (superimposed waves) in FIGS. 3C and 3D by removing the oscillation waveforms (carrier waves) of the semiconductor lasers 1-1 and 1-2 in FIG. 2 from the waveforms (modulated waves) in FIGS. 3A and 3B which correspond outputs from the photodiodes 2-1 an 2-2.

Figure 4:
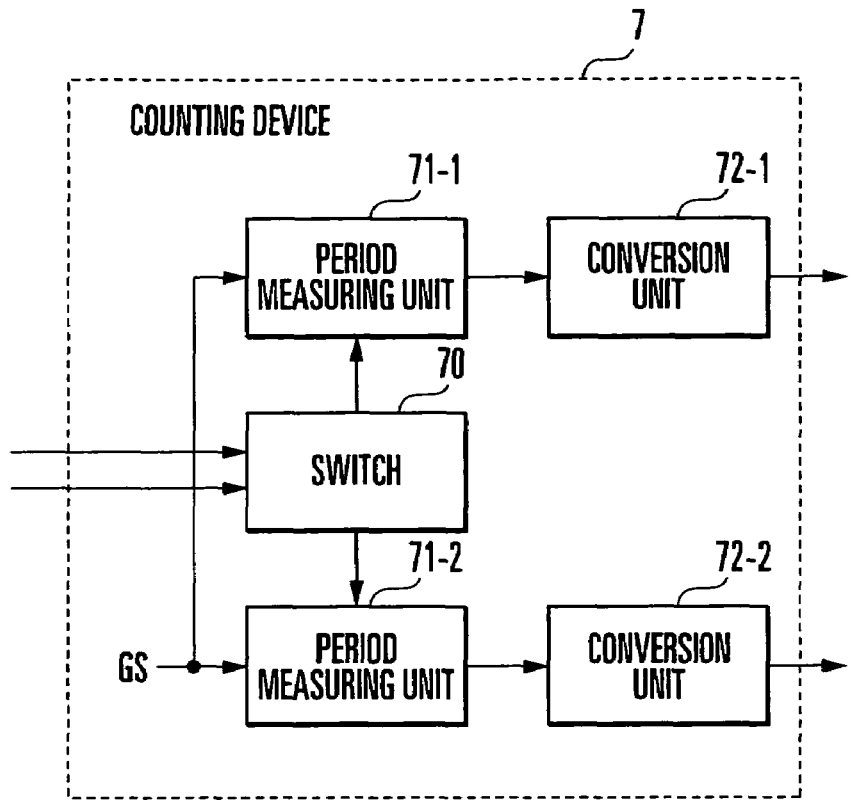
FIG. 4 is a block diagram showing an example of the arrangement of a counting device in the first embodiment of the present invention.
Figure 5:
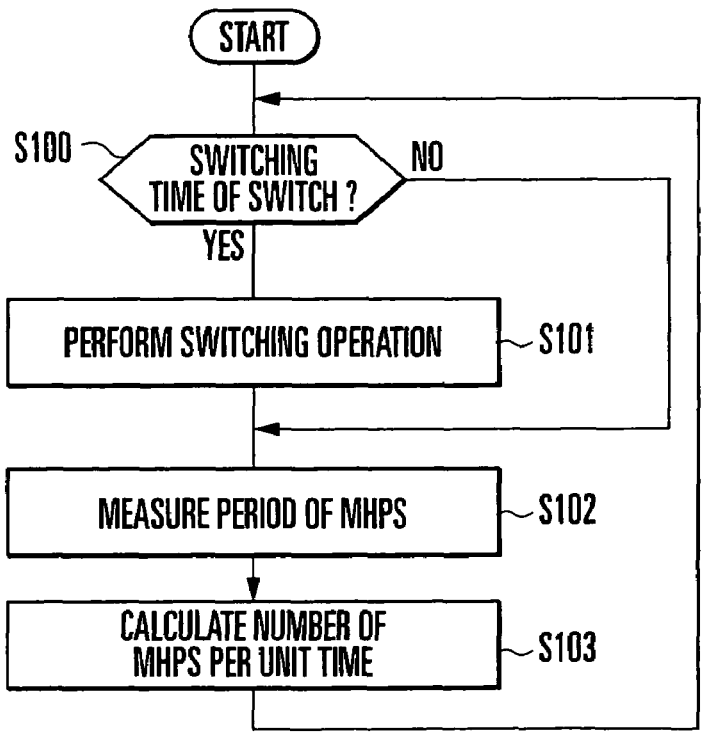
FIG. 5 is a flowchart showing the operation of the counting device in FIG. 4.

The counting device 7 sequentially counts the numbers of MHPs contained in outputs from the filter circuits 6-1 and 6-2 per unit time for each of the filter circuits 6-1 and 6-2. FIG. 4 shows an example of the arrangement of the counting device 7. FIG. 5 is a flowchart showing the operation of the counting device 7. The counting device 7 comprises a switch 70, period measuring units 71-1 and 71-2, and conversion units 72-1 and 72-2.

The switch 70 of the counting device 7 determines whether the switching timing has come (step S100 in FIG. 5). If the switching timing has come, the switch 70 switches the connection between the outputs of the filter circuits 6-1 and 6-2 and the period measuring units 71-1 and 71-2 (step S101). The switching timing of the switch 70 occurs at intervals of ½ a triangular wave period T. That is, in the first oscillation interval P1, the switch 70 connects the output of the filter circuit 6-1 to the input of the period measuring unit 71-1, and connects the output of the filter circuit 6-2 to the period measuring unit 71-2. In the second oscillation interval P2, the switch 70 connects the output of the filter circuit 6-2 to the input of the period measuring unit 71-1, and connects the output of the filter circuit 6-1 to the period measuring unit 71-2 (step S101).

That is, one of outputs from the filter circuits 6-1 and 6-2 which corresponds to one of the semiconductor lasers 1-1 and 1-2 whose oscillation wavelength has increased is always input to the period measuring unit 71-1, and one of outputs from the filter circuits 6-1 and 6-2 which corresponds to one of the semiconductor lasers 1-1 and 1-2 whose oscillation wavelength has decreased is always input to the period measuring unit 71-2. The laser drivers 4-1 and 4-2 notify that the current time corresponds to the first oscillation interval P1 or the second oscillation interval P2. The switch 70 performs switching in accordance with notifications from the laser drivers 4-1 and 4-2.

The period measuring unit 71-1 measures the period of a leading edge of an input from the switch 70 during the first counting interval (i.e., the period of an MHP) every time a leading edge is generated in the input from the switch 70 (step S102 in FIG. 5). Likewise, the period measuring unit 71-2 measures the period of a leading edge of an input from the switch 70 during the second counting interval (i.e., the period of an MHP) every time a leading edge is generated in the input from the switch 70 (step S102).

Figure 6:
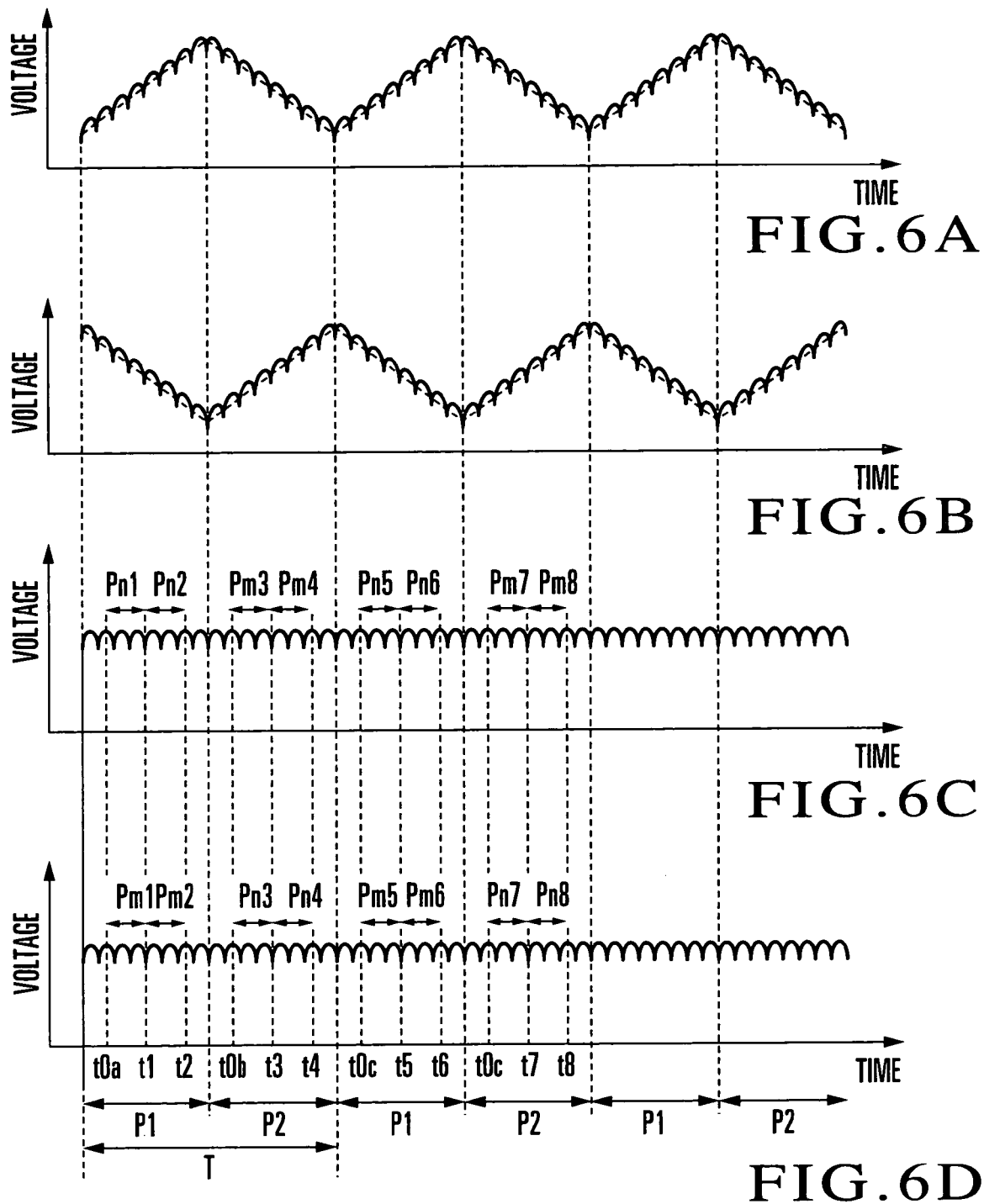
FIGS. 6A to 6D are timing charts each showing a counting interval of the counting device in FIG. 4.

The first and second counting intervals will be described with reference to FIGS. 6A to 6D. FIGS. 6A and 6B schematically show the output voltage waveforms of the current/voltage conversion amplifiers 5-1 and 5-2. FIGS. 6C and 6D schematically show the output voltage waveforms of the filter circuits 6-1 and 6-2. Reference symbols Pn1, Pn2, Pn3, Pn4, Pn5, Pn6, Pn7, and Pn8 denote the first counting intervals; Pm1, Pm2, Pm3, Pm4, Pm5, Pm6, Pm7, and Pm8, the second counting intervals; and t0$a$, t1, t2, t0$b$, t3, t4, t0$c$, t5, t6, t0$d$, t7, and t8, the start or end times of the first counting intervals Pn (Pn1, Pn2, Pn3, Pn4, Pn5, Pn6, Pn7, and Pn8) and second counting intervals Pm (Pm1, Pm2, Pm3, Pm4, Pm5, Pm6, Pm7, and Pm8).

As shown in FIGS. 6C and 6D, a first counting interval Pn (Pn1, Pn2, Pn3, Pn4, Pn5, Pn6, Pn7, and Pn8) is set for one of outputs from the filter circuits 6-1 and 6-2 which corresponds to one of the semiconductor lasers 1-1 or 1-2 whose oscillation wavelength has increased, and a second counting interval Pm (Pm1, Pm2, Pm3, Pm4, Pm5, Pm6, Pm7, and Pm8) is set for one of outputs from the filter circuits 6-1 and 6-2 which corresponds to one of the semiconductor lasers 1-1 and 1-2 whose oscillation wavelength has decreased.

The first and second counting intervals Pn and Pm are preferably shorter than the first and second oscillation intervals P1 and P2, i.e., a time ½ the period T of a triangular wave. In addition, the first counting interval Pn and the corresponding second counting interval Pm need to start and end at the same time. Note however that the first counting intervals Pn can partially overlap each other, and the second counting intervals Pm can partially overlap each other.

Gate signals GS input to the period measuring units 71-1 and 71-2 are signals which rise at the start of the first counting interval Pn and second counting interval Pm, respectively, and fall at the end of the first counting interval Pn and second counting interval Pm, respectively. Note that the first counting interval Pn and second counting interval Pm are set in the interval excluding portions in which triangular wave driving currents become maximum (portions in which the oscillation interval P1 switches to the oscillation interval P2 or vice versa).

The conversion unit 72-1 of the counting device 7 converts the average of the periods of MHPs measured by the period measuring unit 71-1 into an MHP count X per unit time in the first counting interval Pn (the number of interference waveforms from the semiconductor laser whose oscillation wavelength has increased). The conversion unit 72-2 converts the average of the periods of MHPs measured by the period measuring unit 71-2 into an MHP count Y per unit time in the second counting interval Pm (the number of interference waveforms from the semiconductor laser whose oscillation wavelength has decreased) (step S103 in FIG. 5). Letting Ts be the average period of MHPs and f be the frequency of a triangular wave, the number of MHPs per unit time can be calculated by {2/(f×Ts)}. This unit time is a time ½ the period T of a triangular wave.

The counting device 7 performs the above processing in each of the first counting intervals Pn and each of the second counting intervals Pm. The period measuring unit 71-1 and the conversion unit 72-1 operate to calculate the MHP count X. At the same time, the period measuring unit 71-2 and the conversion unit 72-2 operate to calculate the MHP count Y. In this manner, the MHP counts X and Y are simultaneously obtained.

Figure 7:
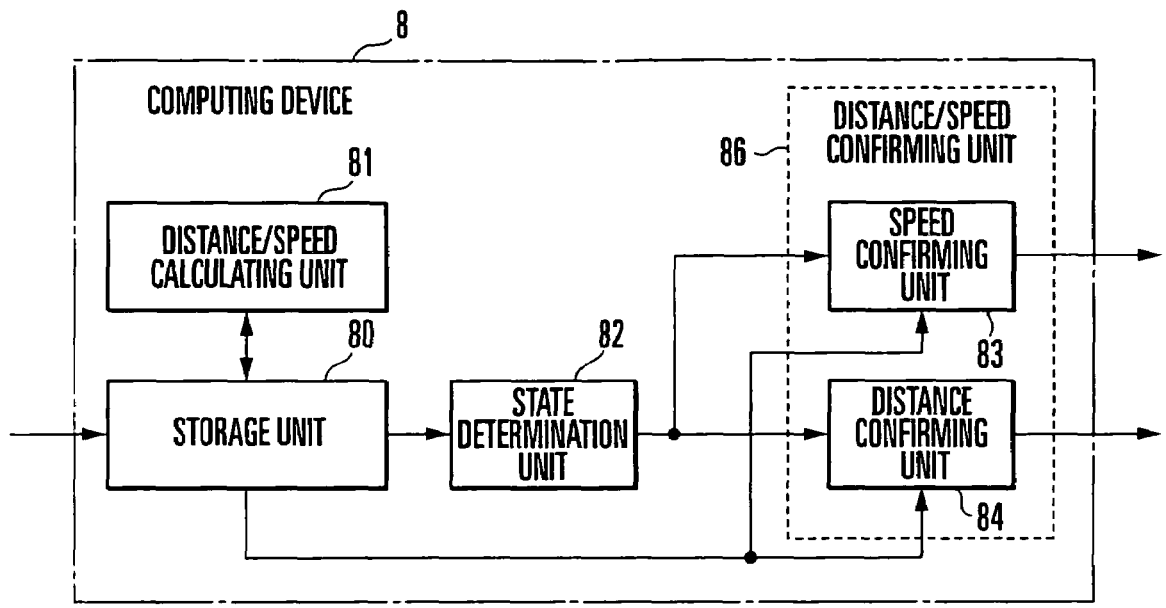
FIG. 7 is a block diagram showing an example of the arrangement of a computing device in the first embodiment of the present invention.
Figure 8:
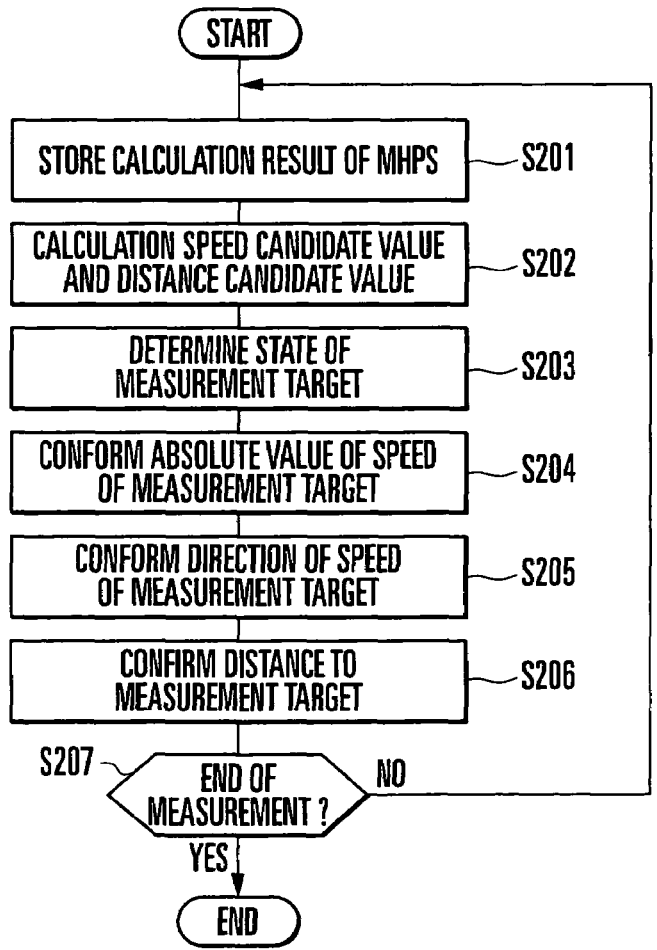
FIG. 8 is a flowchart showing the operation of the computing device in FIG. 7.

The computing device 8 then calculates the distance to the measurement target 11 and the speed of the measurement target 11 on the basis of the minimum oscillation wavelength $\lambda a$ and maximum oscillation wavelength $\lambda b$ of the semiconductor lasers 1-1 and 1-2 and the counts X and Y of MHPs. FIG. 7 shows an example of the arrangement of the computing device 8. FIG. 8 shows the operation of the computing device 8. The computing device 8 comprises a storage unit 80 which stores MHP counts X and Y calculated by the counting device 7 and the calculation results obtained by the computing device 8, a distance/speed calculating unit 81 which calculates a candidate value of the distance to the measurement target 11 and a candidate value of the speed of the measurement target 11 on the basis of the minimum oscillation wavelength $\lambda a$ and maximum oscillation wavelength $\lambda b$ of the semiconductor lasers 1-1 and 1-2 and the counts X and Y of MHPs, a state determination unit 82 which determines the state of the measurement target 11 on the basis of the calculation results obtained by the distance/speed calculating unit 81, a speed confirming unit 83 which confirms the speed of the measurement target 11 on the basis of the determination result obtained by the state determination unit 82, and a distance confirming unit 84 which confirms the distance to the measurement target 11 on the basis of the determination result obtained by the state determination unit 82. The speed confirming unit 83 and distance confirming unit 84 constitute a distance/speed confirming unit 86.

Assume that the state of the measurement target 11 is either a minute displacement state satisfying a predetermined condition or a displacement state indicating movement larger than that of the minute displacement state. Letting V be the average displacement of the measurement target 11 per period of the counting interval Pn and counting interval Pm, the minute displacement state is a state which satisfies $(\lambda b - \lambda a)/\lambda b > V/Lb$, and the displacement state is a state which satisfies $(\lambda b - \lambda a)/\lambda b \leq V/Lb$. Lb represents a distance to the measurement target 11 at the intermediate times of the first and second counting intervals Pn and Pm.

First of all, the storage unit 80 of the computing device 8 stores the MHP counts X and Y calculated by the counting device 7 (step S201 in FIG. 8).

The distance/speed calculating unit 81 of the computing device 8 calculates a candidate value of the speed of the measurement target 11 and a candidate value of the distance to the measurement target 11 and stores the calculated values in the storage unit 80 (step S202 in FIG. 8).

The distance/speed calculating unit 81 calculates a first candidate value V$\alpha$1(t, t+1) of the speed in the interval from time t to time t+1 on the basis of an MHP count X(t) in the first counting interval Pn and an MHP count Y(t+1) in a second counting interval Pm+1 following the first counting interval Pn, a second candidate value V$\alpha$2(t, t+1) of the speed in the interval from time t to time t+1 on the basis of an MHP count Y(t) in the second counting interval Pm and an MHP count X(t+1) in the first counting interval Pn+1 following the second counting interval Pm, a third candidate value V$\beta$3(t, t+1) of the speed in the interval from time t to time t+1 on the basis of the MHP counts X(t) and Y(t+1), and a fourth candidate value V$\beta$4(t, t+1) of the speed in the interval from time t to time t+1 on the basis of the MHP counts Y(t) and X(t+1), and stores the calculated values in the storage unit 80 (step S202).

$$V\alpha 1(t, t+1) = (X(t) - Y(t+1)) \times \lambda b / 4 \quad (2)$$

$$V\alpha 2(t, t+1) = (Y(t) - X(t+1)) \times \lambda a / 4 \quad (3)$$

$$V\beta 3(t, t+1) = (X(t) + Y(t+1)) \times \lambda b / 4 \quad (4)$$

$$V\beta 4(t, t+1) = (Y(t) + X(t+1)) \times \lambda a / 4 \quad (5)$$

The distance/speed calculating unit 81 also calculates fifth and sixth candidate values V$\alpha$5(t) and V$\beta$6(t) of the speed in the interval from time t−1 to time t on the basis of the MHP count X(t) in the first counting interval Pn and the MHP count Y(t) in the second counting interval Pm starting and ending at the same time as the first counting interval Pn as follows, and stores the calculated values in the storage unit 80 (step S202).

$$V\alpha5(t)=(X(t)-Y(t))\times(\lambda a+\lambda b)/8 \quad (6)$$

$$V\beta6(t)=(X(t)+Y(t))\times(\lambda a+\lambda b)/8 \quad (7)$$

The distance/speed calculating unit 81 calculates a first candidate value $L\alpha1(t, t+1)$ of the distance in the interval from time t to time t+1 on the basis of the MHP count X(t) in the first counting interval Pn and the MHP count Y(t+1) in the second counting interval Pm+1 following the first counting interval Pn, a second candidate value $L\alpha2(t, t+1)$ of the distance in the interval from time t to time t+1 on the basis of the MHP count Y(t) in the second counting interval Pm and the MHP count X(t+1) in the first counting interval Pn+1 following the second counting interval Pm, a third candidate value $L\beta3(t, t+1)$ of the distance in the interval from time t to time t+1 on the basis of the MHP counts X(t) and Y(t+1), and a fourth candidate value $L\beta4(t, t+1)$ of the distance in the interval from time t to time t+1 on the basis of the MHP counts Y(t) and X(t+1), and stores the calculated values in the storage unit 80 (step S202).

$$L\alpha1(t,t+1)=\lambda a\times\lambda b(X(t)+Y(t+1))/(4\times(\lambda a-\lambda b)) \quad (8)$$

$$L\alpha2(t,t+1)=\lambda a\times\lambda b(Y(t)+X(t+1))/(4\times(\lambda a-\lambda b)) \quad (9)$$

$$L\beta3(t,t+1)=\lambda a\times\lambda b(X(t)-Y(t+1))/(4\times(\lambda a-\lambda b)) \quad (10)$$

$$L\beta4(t,t+1)=\lambda a\times\lambda b(Y(t)-X(t+1))/(4\times(\lambda a-\lambda b)) \quad (11)$$

The distance/speed calculating unit 81 also calculates fifth and sixth candidate values $L\alpha5(t)$ and $L\beta6(t)$ of the distance to the measurement target 11 in the interval from time t−1 to time t on the basis of the MHP count X(t) in the first counting interval Pn and the MHP count Y(t) in the second counting interval Pm starting and ending at the same time as the first counting interval Pn as follows, and stores the calculated values in the storage unit 80 (step S202).

$$L\alpha5(t)=\lambda a\times\lambda b(X(t)+Y(t))/(4\times(\lambda a-\lambda b)) \quad (12)$$

$$L\beta6(t)=\lambda a\times\lambda b(X(t)-Y(t))/(4\times(\lambda a-\lambda b)) \quad (13)$$

In equations (2) to (13), the candidate values $V\alpha1(t, t+1)$, $V\alpha2(t, t+1)$, $V\alpha5(t)$, $L\alpha1(t, t+1)$, $L\alpha2(t, t+1)$, and $L\alpha5(t)$ are values calculated on the assumption that the measurement target 11 is in the minute displacement state, and the candidate values $V\beta3(t, t+1)$, $V\beta4(t, t+1)$, $V\beta6(t)$, $L\beta3(t, t+1)$, $L\beta4(t, t+1)$, and $L\beta6(t)$ are values calculated on the assumption that the measurement target 11 is in the displacement state.

Time t+1 is the end time of the first counting interval Pn+1 and second counting interval Pm+1, time t is the end time of the first counting interval Pn and second counting interval Pm immediately preceding the intervals Pn+1 and Pm+1, and time t−1 is the end time of the first counting interval Pn−1 and second counting interval Pm−1 two intervals preceding the intervals Pn+1 and Pm+1. X(t+1) represents the number of MHPs in the first counting interval Pn+1, X(t) represents the number of MHPs in the first counting interval Pn, Y(t+1) represents the number of MHPs in the second counting interval Pm+1, and Y(t) represents the number of MHPs in the second counting interval Pm.

If, for example, the current time is t+1=t2, the first counting interval Pn+1 corresponds to Pn2 in FIG. 6C, the first counting interval Pn immediately preceding the interval Pn+1 corresponds to Pn1, the second counting interval Pm+1 corresponds to Pm2 in FIG. 6D, and the second counting interval Pm immediately preceding the interval Pm+1 corresponds to Pm1. If, for example, the current time is t+1=t3, the first counting interval Pn+1 corresponds to Pn3, the first counting interval Pn immediately preceding the interval Pn+1 corresponds to Pn2, the second counting interval Pm+1 corresponds to Pm3, and the second counting interval Pm immediately preceding the interval Pm+1 corresponds to Pm2. The computing device 8 calculates equations (2) to (13) every time the counting device 7 calculates the number of MHPs.

The state determination unit 82 of the computing device 8 determines the state of the measurement target 11 by using the computation results on equations (2) to (5) stored in the storage unit 80 (step S203 in FIG. 8). If $V\alpha1(t, t+1)=V\alpha2(t, t+1)$, i.e., calculation results on equations (2) and (3) are equal to each other, the state determination unit 82 determines that the measurement target 11 is in the minute displacement state. If $V\beta3(t, t+1)=V\beta4(t, t+1)$, i.e., calculation results on equations (4) and (5) are equal to each other, the state determination unit 82 determines that the measurement target 11 is in the displacement state. If the error between a calculation result on equation (2) and a calculation result on equation (3) falls within a predetermined error range, the state determination unit 82 determines that they are equal to each other. Whether calculation results on equations (4) and (5) are equal to each other can be determined in the same manner.

The speed confirming unit 83 of the computing device 8 confirms the absolute value of the speed of the measurement target 11 on the basis of the determination result obtained by the state determination unit 82 (step S204 in FIG. 8). If it is determined that the measurement target 11 is in the minute displacement state, the speed confirming unit 83 confirms the average value of the speed candidate values $V\alpha1(t, t+1)$ and $V\alpha2(t, t+1)$ stored in the storage unit 80 as the absolute value of the speed of the measurement target 11 in the interval from time t−1 to time t+1 (step S204).

If it is determined that the measurement target 11 is in the displacement state, the speed confirming unit 83 confirms the average value of the speed candidate values $V\beta3(t, t+1)$ and $V\beta4(t, t+1)$ stored in the storage unit 80 as the absolute value of the speed of the measurement target 11 in the interval from time t−1 to time t+1 (step S204).

Using average value of calculation results on equations (2) and (3) or the average value of calculation results on equations (4) and (5) in this manner can improve noise resistance. Although inferior in noise resistance to the above operation, the speed confirming unit 83 may confirm one of the speed candidate values $V\alpha1(t, t+1)$ and $V\alpha2(t, t+1)$ as the absolute value of the speed of the measurement target 11 when it is determined that the measurement target 11 is in the minute displacement state, and may confirm one of the speed candidate values $V\beta3(t, t+1)$ and $V\beta4(t, t+1)$ as the absolute value of the speed of the measurement target 11 when it is determined that the measurement target 11 is in the displacement state.

Note that if it is determined that the measurement target 11 is in the minute displacement state, the speed confirming unit 83 can confirm the speed candidate value $V\alpha5(t)$ stored in the storage unit 80 as the absolute value of the speed of the measurement target 11 in the interval from time t−1 to time t (step S204). In addition, if it is determined that the measurement target 11 is in the displacement state, the speed confirming unit 83 can confirm the speed candidate value $V\beta6(t)$ stored in the storage unit 80 as the absolute value of the speed of the measurement target 11 in the interval from time t−1 to time t (step S204).

Using equation (6) or (7) can calculate a more accurate speed than using calculation results on equations (2) to (5).

The speed confirming unit 83 then calculates equations (14) and (15) given below and confirms the direction of the speed of the measurement target 11 (step S205 in FIG. 8).

$$\Sigma X = X(t) + X(t+1) \quad (14)$$

$$\Sigma Y = Y(t) + Y(t+1) \quad (15)$$

The speed confirming unit 83 compares $\Sigma X$ given by equation (14) with $\Sigma Y$ given by equation (15). If $\Sigma X$ is larger than $\Sigma Y$, the speed confirming unit 83 determines that the measurement target 11 is approaching the distance/speed meter. If $\Sigma Y$ is larger than $\Sigma X$, the measurement target 11 determines that the measurement target 11 is moving away from the distance/speed meter.

When confirming the absolute value of the speed by using a calculation result on equation (6) or (7) instead of using calculation results on equations (2) to (5) in step S204, the speed confirming unit 83 compares the MHP count X(t) with the MHP count Y(t). If X(t) is larger than Y(t), the speed confirming unit 83 determines that the measurement target 11 is approaching the distance/speed meter. If Y(t) is larger than X(t), the speed confirming unit 83 determines that the measurement target 11 is moving away from the distance/speed meter (step S205).

The distance confirming unit 84 confirms the distance to the measurement target 11 on the basis of the determination result obtained by the state determination unit 82 (step S206 in FIG. 8). That is, if it is determined that the measurement target 11 is in the minute displacement state, the distance confirming unit 84 confirms the average value of the distance candidate values $L\alpha1(t, t+1)$ and $L\alpha2(t, t+1)$ stored in the storage unit 80 as the average distance to the measurement target 11 in the interval from time t−1 and time t+1 (step S206).

If it is determined that the measurement target 11 is in the displacement state, the distance confirming unit 84 confirms the average value of the distance candidate values $L\beta3(t, t+1)$ and $L\beta4(t, t+1)$ stored in the storage unit 80 as the average distance to the measurement target 11 in the interval from time t−1 to time t+1 (step S206). Although inferior in noise resistance to the above operation, the measurement target 11 may confirm one of the distance candidate values $L\alpha1(t, t+1)$ and $L\alpha2(t, t+1)$ as the distance to the measurement target 11 when it is determined that the measurement target 11 is in the minute displacement state, and may confirm one of the distance candidate values $L\beta3(t, t+1)$ and $L\beta4(t, t+1)$ as the distance to the measurement target 11 when it is determined that the measurement target 11 is in the displacement state.

If it is determined that the measurement target 11 is in the minute displacement state, the distance confirming unit 84 can confirm a distance candidate value $L\alpha5(t)$ stored in the storage unit 80 as the average distance to the measurement target 11 in the interval from time t−1 to time t (step S206). If it is determined that the measurement target 11 is in the displacement state, the distance confirming unit 84 can confirm a distance candidate value $L\beta6(t)$ stored in the storage unit 80 as the average distance to the measurement target 11 in the interval from time t−1 to time t (step S206).

Using equation (12) or (13) can calculate a more accurate distance than using calculation results on equations (8) to (11).

The computing device 8 performs the above processing in steps S201 to S206 until, for example, the user issues a measurement end instruction (YES in step S207 in FIG. 8) every time the counting device 7 calculates an MHP count.

The internal bus 9 displays the distance to the measurement target 11 and the speed of the measurement target 11, which are calculated by the computing device 8, in real time.

The amplitude adjusting device 10 controls the laser drivers 4-1 and 4-2 to properly adjust the amplitudes of triangular wave driving currents for the semiconductor lasers 1-1 and 1-2 by using the determination result obtained by the state determination unit 82 of the computing device 8.

Figure 9A:
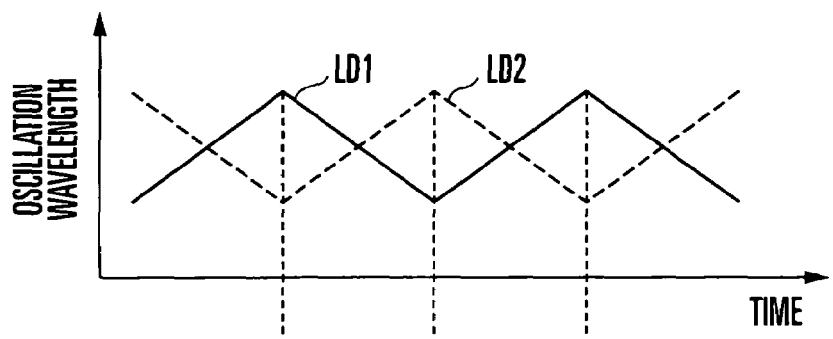
FIGS. 9A to 9C are graphs for explaining changes in mode hop pulse counts as the wavelengths of the semiconductor lasers are switched.
Figure 9B:
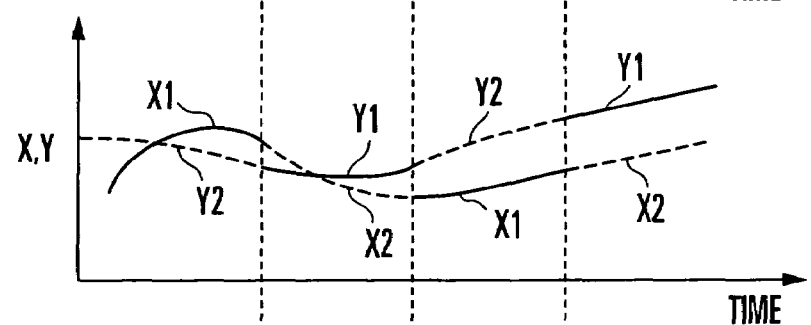
Figure 9C:
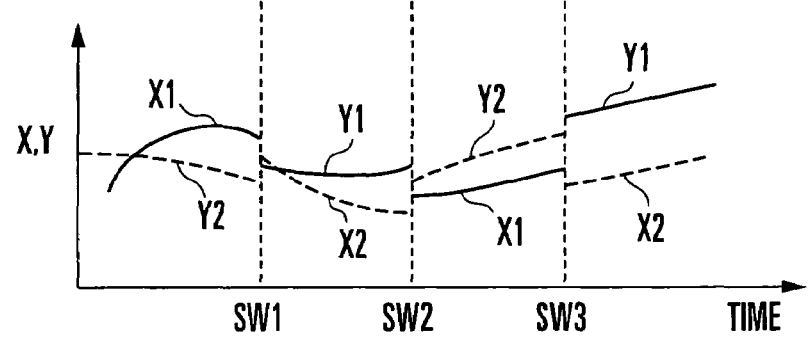

In the distance/speed meter using the plurality of semiconductor lasers 1-1 and 1-2 as in this embodiment, the difference between the absolute values of the wavelength change amounts in the semiconductor lasers 1-1 and 1-2 will cause an error in a measurement value. FIGS. 9A to 9C explain changes in the MHP counts X and Y as the wavelengths of the semiconductor lasers 1-1 and 1-2 are switched. FIG. 9A shows temporal changes in the oscillation wavelengths of the semiconductor lasers 1-1 and 1-2. FIG. 9B shows changes in the MHP counts X and Y when the absolute values of the wavelength change amounts in the semiconductor lasers 1-1 and 1-2 are equal to each other. FIG. 9C shows changes in the MHP counts X and Y when the absolute values of the wavelength change amounts in the semiconductor lasers 1-1 and 1-2 are different from each other. Referring to FIGS. 9A to 9C, reference symbol LD1 denotes the oscillation waveform of the semiconductor laser 1-1; LD2, the oscillation waveform of the semiconductor laser 1-2; X1 and X2, the MHP counts of the semiconductor lasers 1-1 and 1-2 when their oscillation wavelengths increase; and Y1 and Y2, the MHP counts of the semiconductor lasers 1-1 and 1-2 when their oscillation wavelengths decrease.

If the absolute values of the wavelength change amounts in the semiconductor lasers 1-1 and 1-2 are equal to each other, the MHP counts X and Y keep their continuity before and after switching timings SW1, SW2, and SW3 at which the oscillation wavelengths of the semiconductor lasers 1-1 and 1-2 change from increases to decreases or from decreases to increases, as shown in FIG. 9B. If, however, the absolute values of the wavelength change amounts in the semiconductor lasers 1-1 and 1-2 are different from each other, the MHP counts X and Y lose their continuity, as shown in FIG. 9C.

The amplitude adjusting device 10 of this embodiment, therefore, performs amplitude adjustment by using speed candidate values of the speed candidate values $V\alpha1(t, t+1)$, $V\alpha2(t, t+1)$, $V\beta3(t, t+1)$, and $V\beta4(t, t+1)$ calculated by the distance/speed calculating unit 81 of the computing device 8, which are not selected upon not being determined as true values by the speed confirming unit 83 from the determination result obtained by the state determination unit 82. When it is determined that the measurement target 11 is in the minute displacement state, the speed candidate value which is not selected by the speed confirming unit 83 is the average value of $V\beta3(t, t+1)$ and $V\beta4(t, t+1)$. When it is determined that the measurement target 11 is in the displacement state, the speed candidate value which is not selected by the speed confirming unit 83 is the average value of $V\alpha1(t, t+1)$ and $V\alpha2(t, t+1)$.

The amplitude adjusting device 10 adjusts the amplitudes of triangular wave driving currents through the laser drivers 4-1 and 4-2 to make one of the average values of the speed candidate values $V\alpha1(t, t+1)$ and $V\alpha2(t, t+1)$ and of the speed candidate values $V\beta3(t, t+1)$ and $V\beta4(t, t+1)$ which are not selected by the speed confirming unit 83 become almost equal to the value obtained by multiplying the average value of the distance candidate values $L\alpha1(t, t+1)$ and $L\alpha2(t, t+1)$ or of the distance candidate values $L\beta3(t, t+1)$ and $L\beta4(t, t+1)$, selected upon being determined as true values by the distance confirming unit 84, by the wavelength change rate $(\lambda b - \lambda a)/$ λb of the semiconductor lasers 1-1 and 1-2. At this time, the amplitude adjusting device 10 can adjust both or one of the amplitude of the driving current supplied from the laser driver 4-1 to the semiconductor laser 1-1 and the amplitude of the driving current supplied from the laser driver 4-2 to the semiconductor laser 1-2. When it is determined that the measurement target 11 is in the minute displacement state, the distance candidate value which is selected by the distance confirming unit 84 is the average value of $L\alpha 1(t, t+1)$ and $L\alpha 2(t, t+1)$. When it is determined that the measurement target 11 is in the displacement state, the speed candidate value which is selected by the distance confirming unit 84 is the average value of $L\beta 3(t, t+1)$ and $L\beta 4(t, t+1)$.

Figure 10:
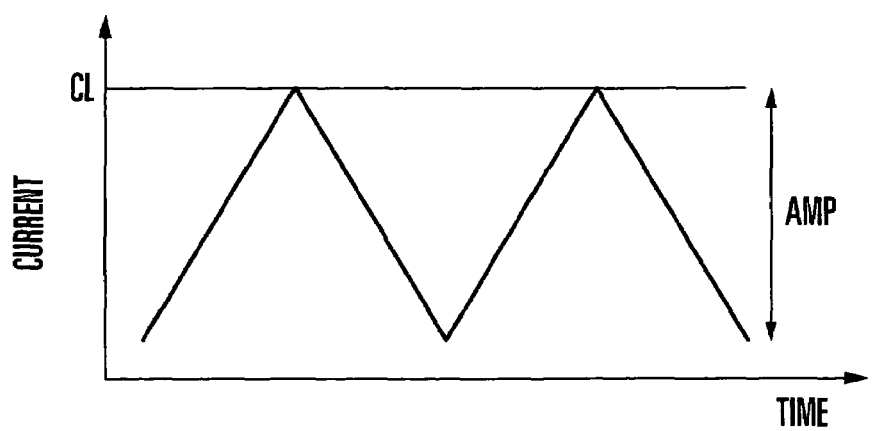
FIG. 10 is a timing chart for explaining a method of adjusting the amplitude of a triangular wave driving current supplied from a laser driver to the semiconductor laser in the first embodiment of the present invention.

FIG. 10 explains a method of adjusting the amplitudes of the triangular wave driving currents supplied from the laser drivers 4-1 and 4-2 to the semiconductor lasers 1-1 and 1-2. The laser drivers 4-1 and 4-2 adjust amplitudes AMP of driving currents by increasing or decreasing the minimum values of driving currents while fixing the maximum values of driving currents to a predetermined value (fixed to an upper limit value CL defined by the semiconductor lasers 1-1 and 1-2 in the case shown in FIG. 10) in accordance with an instruction from the amplitude adjusting device 10. This makes it possible to set the amplitude of each driving current to a proper value.

As in this embodiment, therefore, adjusting the amplitudes of triangular wave driving currents can make the absolute values of the wavelength change amounts in the semiconductor lasers 1-1 and 1-2 equal to each other, thereby reducing distance and speed measurement errors.

When the speed confirming unit 83 confirms the absolute value of the speed by using a calculation result on equation (6) or (7) instead of using calculation results on equations (2) to (5), the amplitude adjusting device 10 adjusts the amplitudes of triangular wave driving currents to make one of the speed candidate values $V\alpha 5(t)$ and $V\beta 6(t)$ which is not selected upon not being determined as a true value by the speed confirming unit 83 become almost equal to the value obtained by multiplying one of the distance candidate values $L\alpha 5(t)$ and $L\beta 6(t)$, which is selected upon being determined as a true value by the distance confirming unit 84, by the wavelength change rate $(\lambda b - \lambda a)/\lambda b$ of the semiconductor lasers 1-1 and 1-2. When it is determined that the measurement target 11 is in the minute displacement state, the speed candidate value which is not selected by the speed confirming unit 83 is $V\beta 6(t)$. When it is determined that the measurement target 11 is in the displacement state, the speed candidate value which is not selected by the speed confirming unit 83 is $V\alpha 5(t)$. When it is determined that the measurement target 11 is in the minute displacement state, the distance candidate value which is selected by the distance confirming unit 84 is $L\alpha 5(t)$. When it is determined that the measurement target 11 is in the displacement state, the distance candidate value which is selected by the distance confirming unit 84 is $L\beta 6(t)$.

The amplitude adjusting device 10 can adjust the amplitudes of triangular wave driving currents through the laser drivers 4-1 and 4-2 to make one of the average values of the speed candidate values $V\alpha 1(t, t+1)$ and $V\alpha 2(t, t+1)$ and of the speed candidate values $V\beta 3(t, t+1)$ and $V\beta 4(t, t+1)$ which are selected upon being determined as true values by the speed confirming unit 83 on the basis of the determination result obtained by the state determination unit 82 keep continuity before and after the switching timings of the wavelength changes of the semiconductor lasers 1-1 and 1-2. When the speed confirming unit 83 confirms the absolute value of the speed by using a calculation result on equation (6) or (7) instead of using calculation results on equations (2) to (5), the amplitude adjusting device 10 can adjust the amplitudes of triangular wave driving currents to make one of the speed candidate values $V\alpha 5(t)$ and $V\alpha 6(t)$ which is selected upon being determined as a true value by the speed confirming unit 83 keep continuity before and after the switching timings of the wavelength changes of the semiconductor lasers 1-1 and 1-2.

The laser drivers 4-1 and 4-2 notify that the current time corresponds to the first oscillation interval P1 or the second oscillation interval P2. The laser drivers 4-1 and 4-2 also notify the switching timings of the wavelength changes of the semiconductor lasers 1-1 and 1-2. The amplitude adjusting device 10 operates in accordance with notifications from the laser drivers 4-1 and 4-2.

The amplitude adjusting device 10 can adjust the amplitudes of triangular wave driving currents to make one of the average values of the distance candidate values $L\alpha 1(t, t+1)$ and $L\alpha 2(t, t+1)$ and of the distance candidate values $L\beta 3(t, t+1)$ and $L\beta 4(t, t+1)$ which are selected upon being determined as true values by the distance confirming unit 84 on the basis of the determination result obtained by the state determination unit 82 keep continuity before and after the switching timings of the wavelength changes of the semiconductor lasers 1-1 and 1-2. When the distance confirming unit 84 confirms the absolute value of the distance by using a calculation result on equation (12) or (13) instead of using calculation results on equations (8) to (11), the amplitude adjusting device 10 can adjust the amplitudes of triangular wave driving currents to make one of the distance candidate values $L\alpha 5(t)$ and $L\beta 6(t)$ which is selected upon being determined as a true value by the distance confirming unit 84 keep continuity before and after the switching timings of the wavelength changes of the semiconductor lasers 1-1 and 1-2.

Figure 11:
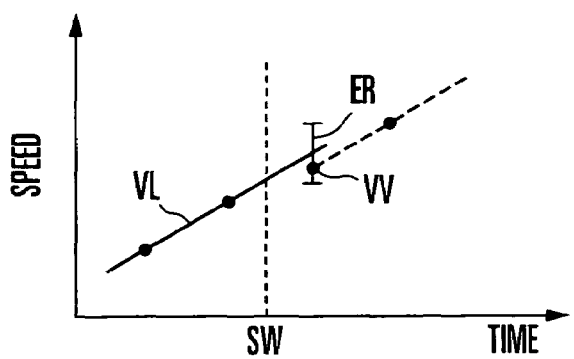
FIG. 11 is a graph for explaining how to make speed or distance calculation results have continuity before and after the switching timings of the wavelength changes of the semiconductor lasers.

It suffices to use, for example, the least squares method to make speed or distance calculation results have continuity before and after the switching timings of the wavelength changes of the semiconductor lasers 1-1 and 1-2. In addition, as shown in FIG. 11, the amplitude adjusting device 10 can adjust the amplitudes of triangular wave driving currents such that a first speed (or distance) calculation result VV after the switching timing SW of the wavelength changes of the semiconductor lasers 1-1 and 1-2 falls within a predetermined range ER of an extension line of a characteristic line VL connecting speed (or distance) calculation results, which is extended to a point after the switching timing SW.

As described above, in this embodiment, the semiconductor lasers 1-1 and 1-2 are made to alternately repeat the first oscillation interval in which the oscillation wavelengths of the semiconductor lasers 1-1 and 1-2 continuously increase and the second oscillation interval in which the oscillation wavelengths continuously decrease, and the numbers of MHPs contained in output signals from the photodiodes 2-1 and 2-2 are counted in each of the first oscillation interval and the second oscillation interval. The embodiment then can calculate the distance to the measurement target 11 and the speed of the measurement target 11 from the minimum oscillation wavelength λa and the maximum oscillation wavelength λb of the semiconductor lasers 1-1 and 1-2. As a result, this embodiment can measure not only the distance to the measurement target 11 but also the speed of the measurement target 11 while making the most of the advantages of a conventional self-mixing laser measurement instrument, i.e., (a) capability of downsizing the apparatus, (b) unnecessity of a high-speed circuit, (c) robustness against disturbance light, and (d) capability of being applied to any type of measurement target. In addition, this embodiment can determine whether the measurement target 11 is in uniform motion or in motion other than uniform motion.

In addition, this embodiment causes the semiconductor lasers 1-1 and 1-2, whose oscillation wavelengths increase and decrease inversely to each other, to simultaneously emit parallel laser light beams to the measurement target 11, obtains the MHP count X in an output from the photodiode 2-1 or 2-2 in the first counting interval Pn shorter than the first oscillation interval and the second oscillation interval, and obtains the MHP count Y in an output from the photodiode 2-2 or 2-1 in the second counting interval Pm that starts and ends at the same time as the first counting interval Pn. This makes it possible to measure a distance and a speed in a period of time shorter than that in the distance/speed meter disclosed in reference 4. The distance/speed meter disclosed in reference 4 needs to count the number of MHPs at least three times in, for example, a first oscillation interval t−1, second oscillation interval t, and first oscillation interval t+1. In this embodiment, it suffices to count the MHP count X or Y once, for example, in the first counting interval Pn1 or the second counting interval Pm1, and further count the MHP count X or Y once in the first counting interval Pn2 or the second counting interval Pm2. Therefore, it is possible to obtain a distance and a speed by counting the numbers of MHPs twice in total.

In this embodiment, equalizing the absolute values of the oscillation change amounts of the semiconductor lasers 1-1 and 1-2 can improve the measurement accuracy of distances and speeds.

Second Embodiment

Figure 12:
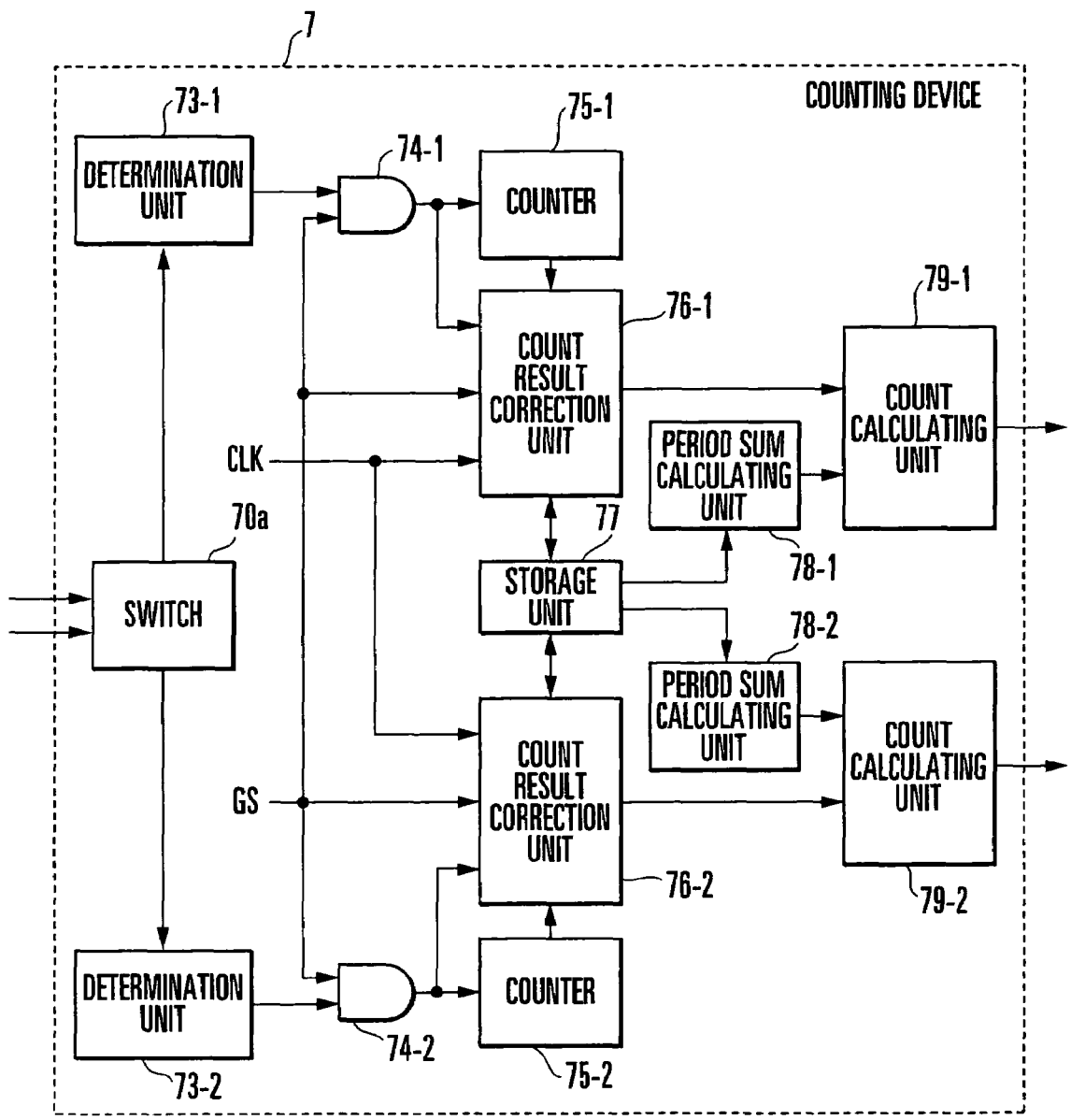
FIG. 12 is a block diagram showing an example of the arrangement of a counting device in the second embodiment of the present invention.
Figure 13:
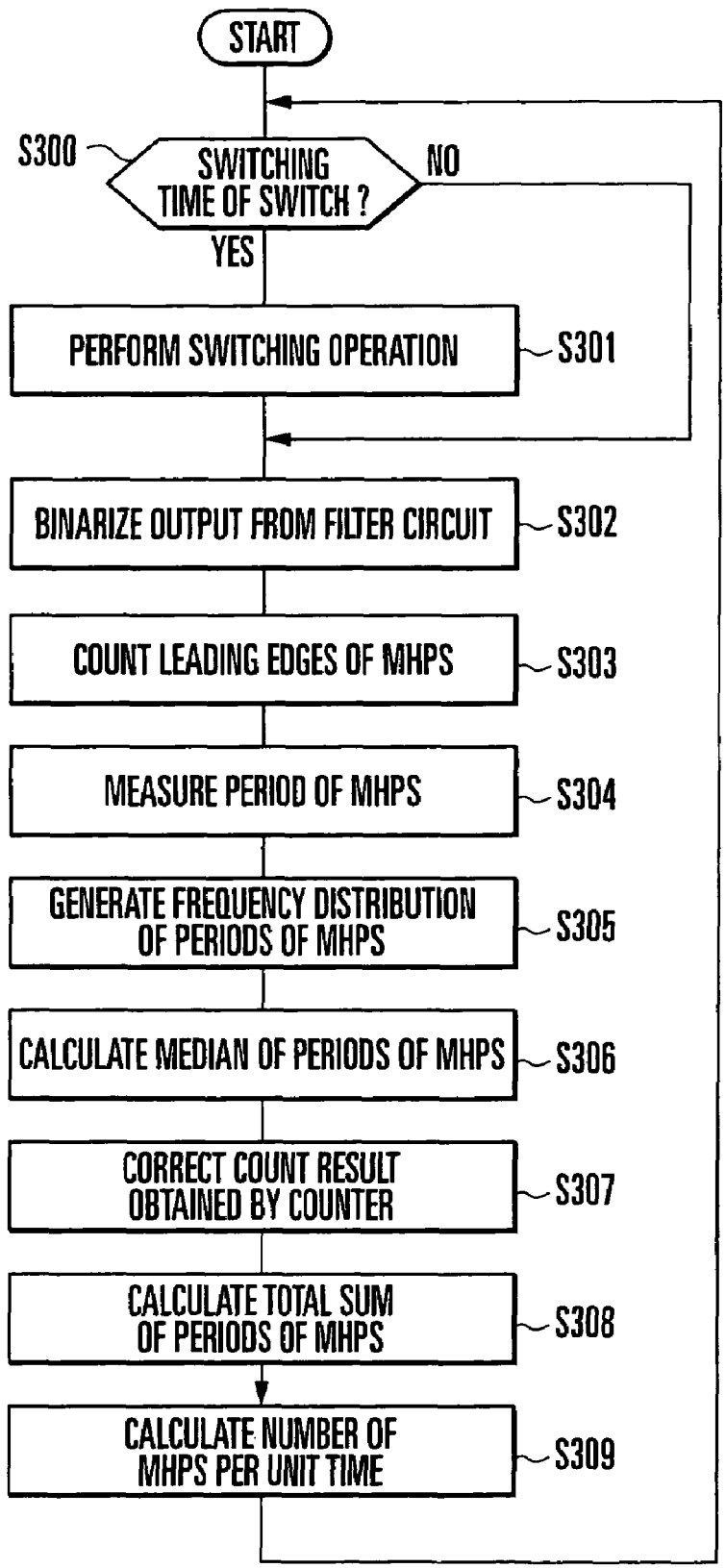
FIG. 13 is a flowchart showing the operation of the counting device in FIG. 12.

The second embodiment of the present invention will be described next. Since the overall arrangement of a distance/speed meter in the second embodiment is the same as in the first embodiment, it will be described using reference numerals in FIG. 1. FIG. 12 shows an example of the arrangement of a counting device 7 in the second embodiment of the present invention. FIG. 13 is a flowchart showing the operation of the counting device 7. The counting device 7 in this embodiment comprises a switch 70a, determination units 73-1 and 73-2, AND operation units (AND) 74-1 and 74-2, counters 75-1 and 75-2, count result correction units 76-1 and 76-2, a storage unit 77, period sum calculating units 78-1 and 78-2, and count calculating units 79-1 and 79-2.

FIG. 14 shows an example of the arrangement of the count result correction unit 76-1. The count result correction unit 76-1 comprises a period measuring unit 760, a frequency distribution generating unit 761, a median calculating unit 762, and a correction value calculating unit 763. The arrangement of the count result correction unit 76-2 is the same as that of the count result correction unit 76-1, and hence a repetitive description will be omitted.

FIGS. 15A to 15F explain the operation of the counting device 7 of this embodiment. FIG. 15A shows the waveform of an output voltage from each of filter circuits 6-1 and 6-2, i.e., an MHP waveform. FIG. 15B shows an output from each of the determination unit 73-1 and 73-2 which corresponds to FIG. 15A. FIG. 15C shows a gate signal GS input to the counting device 7. FIG. 15D shows the count result obtained by the counter 75-1 which corresponds to FIG. 15B. FIG. 15E shows a clock signal CLK input to the counting device 7. FIG. 15F shows the measurement result obtained by the period measuring unit 760 of the count result correction unit 76-1 which corresponds to FIG. 15B. Note that FIGS. 15A to 15F show the operation in a first oscillation interval P1 in which the oscillation wavelength of a semiconductor laser 1-1 increases and the oscillation wavelength of a semiconductor laser 1-2 decreases.

First of all, the switch 70a of the counting device 7 determines whether the switching timing has come (step S300 in FIG. 13). If the switching timing has come, the switch 70a switches the connection between the outputs of the filter circuits 6-1 and 6-2 and the determination units 73-1 and 73-2 (step S301). The switching timing of the switch 70a occurs at intervals of ½ a triangular wave period T. That is, in the first oscillation interval P1, the switch 70a connects the output of the filter circuit 6-1 to the input of the determination unit 73-1, and connects the output of the filter circuit 6-2 to the determination unit 73-2. In the second oscillation interval P2, the switch 70a connects the output of the filter circuit 6-2 to the input of the determination unit 73-1, and connects the output of the filter circuit 6-1 to the determination unit 73-2 (step S301).

That is, one of outputs from the filter circuits 6-1 and 6-2 which corresponds to one of the semiconductor lasers 1-1 and 1-2 whose oscillation wavelength has increased is always input to the determination unit 73-1, and one of outputs from the filter circuits 6-1 and 6-2 which corresponds to one of the semiconductor lasers 1-1 and 1-2 whose oscillation wavelength has decreased is always input to the determination unit 73-2. Laser drivers 4-1 and 4-2 notify that the current time corresponds to the first oscillation interval P1 or the second oscillation interval P2. The switch 70 performs switching in accordance with notifications from the laser drivers 4-1 and 4-2.

The determination unit 73-1 of the counting device 7 determines whether an output voltage from the filter circuit 6-1 or 6-2 shown in FIG. 15A is at high level (H) or low level (L), and outputs a determination result like that shown in FIG. 15B. The determination unit 73-1 binarizes an output from the filter circuit 6-1 or 6-2 by determining that the output voltage from the filter circuit 6-1 or 6-2 is at high level when it increases to a threshold TH1 or more, and determining that the output voltage from the filter circuit 6-1 or 6-2 is at low level when it decreases to a threshold TH2 (TH2<TH1) or less (step S302 in FIG. 13). Likewise, the determination unit 73-2 binarizes an output from the filter circuit 6-1 or 6-2 (step S302).

The AND 74-1 outputs the result of AND operation between an output from the determination unit 73-1 and the gate signal GS like that shown in FIG. 15C. The counter 75-1 counts leading edges of an output from the AND 74-1 as shown in FIG. 15D (S303 in FIG. 13). Likewise, the AND 74-2 outputs the result of AND operation between an output from the determination unit 73-2 and the gate signal GS. The counter 75-2 counts leading edges of an output from the AND 74-2 (step S303). The gate signal GS is a signal which rises at the start of the first and second oscillation intervals Pn and Pm, and falls at the end of the first and second counting intervals Pn and Pm. The counters 75-1 and 75-2 count the numbers of leading edges of outputs from the ANDs 74-1 and 74-2 during the first and second counting intervals Pn and Pm (i.e., the numbers of leading edges of MHPs). The first and second counting intervals Pn and Pm have been defined as described using FIGS. 6A to 6D.

The period measuring unit 760 of the count result correction unit 76-1 measures the period of a leading edge of the output from the AND 74-1 during the first counting interval Pn (i.e., the period of an MHP) every time a leading edge is generated in the output from the AND 74-1 (step S304 in FIG. 13). At this time, the period measuring unit 760 measures the period of an MHP with the period of the clock signal CLK shown in FIG. 15E being regarded as one unit. In the case shown in FIG. 15F, the period measuring unit 760 sequentially measures Tα, Tβ, and Tγ as the periods of MHPs. As is obvious from FIGS. 15E and 15F, the magnitudes of the periods Tα, Tβ, and Tγ are five clocks, four clocks, and two clocks, respectively. The frequency of the clock signal CLK is much higher than the maximum frequency which MHPs can take.

Likewise, the period measuring unit 760 of the count result correction unit 76-2 measures the period of a leading edge of the output from the AND 74-2 during the second counting interval Pm (i.e., the period of an MHP) every time a leading edge is generated in the output from the AND 74-2 (step S304).

The storage unit 77 stores the count results obtained by the counters 75-1 and 75-2 and the measurement results obtained by the respective period measuring units 760 of the count result correction units 76-1 and 76-2.

After the gate signal GS falls and the first counting interval Pn finishes, the frequency distribution generating unit 761 of the count result correction unit 76-1 generates the frequency distribution of the periods of the MHPs during the first counting interval Pn from the measurement result obtained by the period measuring unit 760 of the count result correction unit 76-1 stored in the storage unit 77 (step S305 in FIG. 13). Likewise, after the second counting interval Pm finishes, the frequency distribution generating unit 761 of the count result correction unit 76-2 generates the frequency distribution of the periods of the MHPs during the second counting interval Pm from the measurement result obtained by the period measuring unit 760 of the count result correction unit 76-2 (step S305). When n is small, the number of frequencies used to obtain the median is small so that the accuracy in obtaining a median decreases. Accordingly, the resistance against continuous noise improves when the periods before the first counting interval Pn are also used to generate the frequency distribution to be used when the median of the periods of the MHPs during the first counting interval Pn is obtained.

Subsequently, the median calculating unit 762 of the count result correction unit 76-1 calculates a median T0 of the periods of the MHPs during the first counting interval Pn from the frequency distribution generated by the frequency distribution generating unit 761 of the count result correction unit 76-1 (step S306 in FIG. 13). Likewise, the median calculating unit 762 of the count result correction unit 76-2 calculates the median T0 of the periods of the MHPs during the second counting interval Pm from the frequency distribution generated by the frequency distribution generating unit 761 of the count result correction unit 76-2 (step S306).

The correction value calculating unit 763 of the count result correction unit 76-1 obtains a total sum Ns of frequencies in a class equal to or less than 0.5 times the median T0 of the periods during the first counting interval Pn and a total sum Nw of frequencies in a class equal to or more than 1.5 times the median T0 of the periods during the first counting interval Pn from the frequency distribution generated by the frequency distribution generating unit 761 of the count result correction unit 76-1, and corrects the count result obtained by the counter 75-1 as follows (step S307 in FIG. 13):

$$N' = N + Nw - Ns \qquad (16)$$

where N is the number of MHPs as the count result obtained by the counter 75-1, and N' is the count result after correction.

Likewise, the correction value calculating unit 763 of the count result correction unit 76-2 obtains the total sum Ns of frequencies in a class equal to or less than 0.5 times the median T0 of the periods during the second counting interval Pm and the total sum Nw of frequencies in a class equal to or more than 1.5 times the median T0 of the periods the second counting interval Pm from the frequency distribution generated by the frequency distribution generating unit 761 of the count result correction unit 76-2, and corrects the count result N obtained by the counter 75-2 as equation (16) (step S307).

Figure 16:
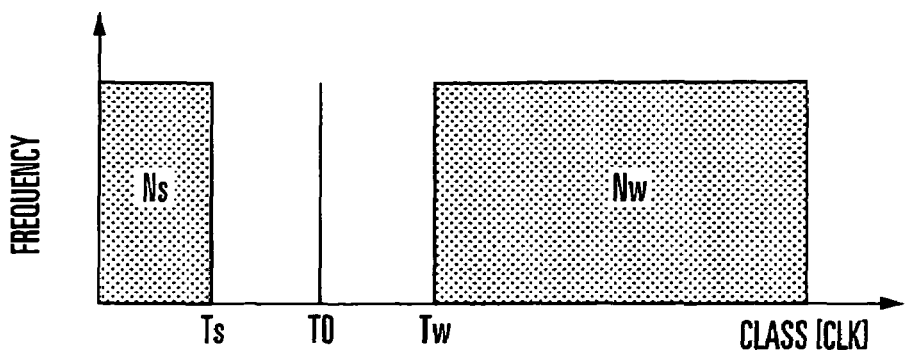
FIG. 16 is a graph showing an example of the frequency distribution of the periods of mode hop pulses.

FIG. 16 shows an example of the frequency distribution of the periods of the MHPs. Referring to FIG. 16, reference symbol Ts denotes a class value 0.5 times the median T0 of the periods of the MHPs; and Tw, a class value 1.5 times the median T0 of the periods. Obviously, the classes in FIG. 16 are the representative values of the periods of the MHPs. For simplicity, FIG. 16 does not illustrate the frequency distributions between the median T0 and Ts and between the median T0 and Tw.

Figure 17A:
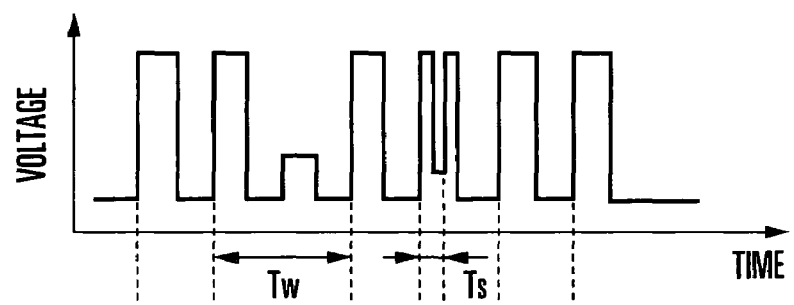
FIGS. 17A and 17B are views for explaining the principle of correcting the count result of a counter in the second embodiment of the present invention.
Figure 17B:
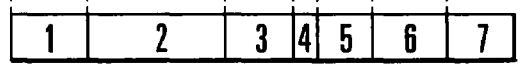

FIGS. 17A and 17B explain the principle of correcting the count result obtained by each of the counters 75-1 and 75-2. FIG. 17A schematically shows the waveform of an output voltage from the filter circuit 6-1, i.e., an MHP waveform. FIG. 17B shows the count result obtained by the counter 75-1 which corresponds to FIG. 17A.

The period of MHPs normally varies depending on the distance to the measurement target 11. If, however, the distance to the measurement target 11 is invariable, MHPs appear at the same period. Due to noise, however, an omission occurs in the MHP waveform or a waveform which should not be counted as a signal is generated, resulting in an error in the number of MHPs.

When an omission occurs in a signal, a period Tw of an MHP at the position where the omission has occurred becomes about twice the proper period. That is, when the period of an MHP is about twice the median T0 or more, it can be determined that an omission has occurred in the signal. Therefore, omissions in the signal can be corrected by regarding the total sum Nw of the frequencies in the class equal to or more than the period Tw as the number of omissions in the signal and adding Nw to the count result N of the counter 75-1.

In addition, the period Ts of the MHP at the position where noise is counted becomes about 0.5 times the proper period. That is, when the period of an MHP is equal to or less than about 0.5 times the median, it can be determined that signals are excessively counted. Therefore, noise which has been erroneously counted can be corrected by regarding the total sum Ns of the frequencies in the class equal to or less than the period Ts as the number of times a signal has been counted and subtracting Ns from the count result N obtained by the counter 75-1.

The above is the principle of correcting a count result, which is indicated by equation (16). The count result obtained by the counter 75-2 can be corrected based on the same principle. In this embodiment, Ts is set to the value 0.5 times the median T0 of the periods, and Tw is set to the value 1.5 times the median T0 instead of 2 times the median T0. The reason why Tw is set to the value 1.5 times the median T0 will be described later.

The period sum calculating unit 78-1 of the counting device 7 calculates a total sum Sum of the periods of the MHPs during the first counting interval Pn from the measurement result obtained by the period measuring unit 760 of the count result correction unit 76-1 stored in the storage unit 77 (step S308 in FIG. 13). Likewise, the period sum calculating unit 78-2 calculates the total sum Sum of the periods of the MHPs during the second counting interval Pm from the measurement result obtained by the period measuring unit 760 of the count result correction unit 76-2 (step S308).

The count calculating unit 79-1 of the counting device 7 calculates an MHP count X per unit time in the first counting interval Pn (the number of interference waveforms from the semiconductor laser whose oscillation wavelength has increased), and the count calculating unit 79-2 calculates an MHP count Y per unit time in the second counting interval Pm (the number of interference waveforms from the semiconductor laser whose oscillation wavelength has decreased) (step S309 in FIG. 13). The count calculating unit 79-1 divides the count result N' after correction calculated by the correction value calculating unit 763 of the count result correction unit 76-1 by the total sum Sum of the periods of the MHPs during the first counting interval calculated by the period sum calculating unit 78-1, so as to calculate the MHP count X per unit time in the first counting interval Pn as follows:

$$X = N'/Sum \quad (17)$$

Likewise, the count calculating unit 79-2 divides the count result N' after correction calculated by the correction value calculating unit 763 of the count result correction unit 76-2 by the total sum Sum of the periods of the MHPs during the second counting interval Pm calculated by the period sum calculating unit 78-2, so as to calculate the MHP count Y per unit time in the second counting interval Pm.

The counting device 7 performs the above processing in each of the first counting intervals Pn and each of the second counting intervals Pm. The determination unit 73-1, AND 74-1, counter 75-1, count result correction unit 76-1, storage unit 77, period sum calculating unit 78-1, and count calculating unit 79-1 operate to calculate the MHP count X. At the same time, the determination unit 73-2, AND 74-2, counter 75-2, count result correction unit 76-2, storage unit 77, period sum calculating unit 78-2, and count calculating unit 79-2 operate to calculate the MHP count Y. That is, the MHP counts X and Y are simultaneously obtained.

The arrangement other than the counting device 7 in this embodiment is the same as in the first embodiment. This embodiment measures the periods of MHPs in a counting interval and generates the frequency distribution of the periods of the MHPs in the counting interval from the measurement result. The embodiment then calculates the median of the periods of the MHPs from the frequency distribution, and obtains the total sum Ns of the frequencies in the class equal to or less than 0.5 times the median and the total sum Nw of the frequencies in the class equal to more than 1.5 times the median from the frequency distribution. The embodiment can correct an MHP count error by correcting the count result obtained by the counter on the basis of the total sums Ns and Nw, thereby improving the measurement accuracy of distances and speeds as compared to the first embodiment.

The reason why the median of the frequency distribution of periods is used as a reference period of MHPs in this embodiment will be described next, together with the reason why the period threshold to be set when the frequency Nw is obtained is 1.5 times the median.

Figure 18:
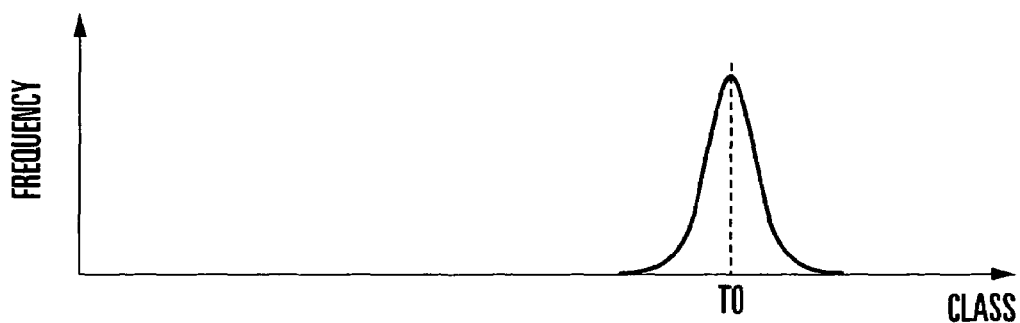
FIG. 18 is a graph showing the frequency distribution of the periods of mode hop pulses.

Correction of the count result obtained in a case in which the periods of MHPs are divided by two because of erroneous counting of noise will be described first. If the oscillation wavelength of the semiconductor laser linearly changes, periods of MHPs exhibit a normal distribution centered on T0 obtained by dividing a measurement period by a count N of MHPs (FIG. 18).

Figure 19:
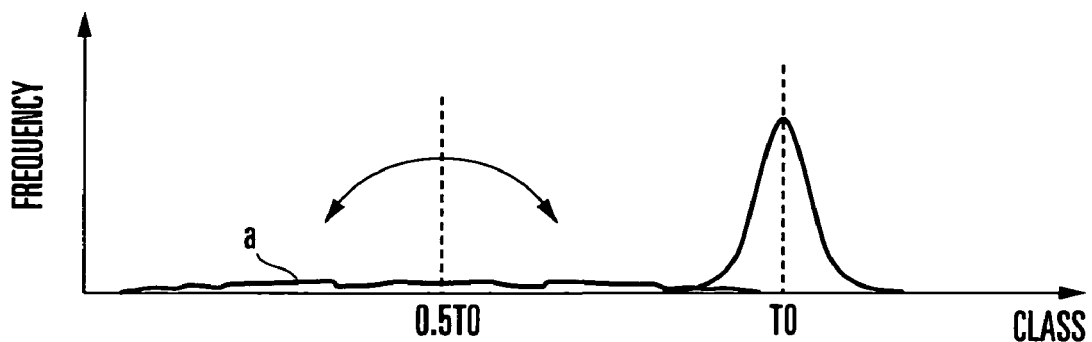
FIG. 19 is a graph showing the frequency distribution of the periods of mode hop pulses containing noise.

Consider next the periods of MHPs which are divided by two due to noise. The periods of MHPs which are divided by two as a result of excessively counting noise are the periods divided at a random ratio. However, the periods before division have a normal distribution centered on T0, and hence the periods of the MHPs divided by two exhibit a frequency distribution symmetrical with respect to 0.5T0. (a in FIG. 19).

With regard to the frequency distribution of the periods of k% of MHPs containing noise, the average and median of the periods of the MHPs are calculated assuming that the periods of k% of MHPs are divided by two due to noise.

The sum of all periods is always a counting interval and does not change. If, however, the periods of MHPs are divided by two due to noise, since the integral value of frequencies becomes (1+k[%]) N, the average of the periods of the MHPs becomes (1/(1+k[%])) T0.

Figure 20:
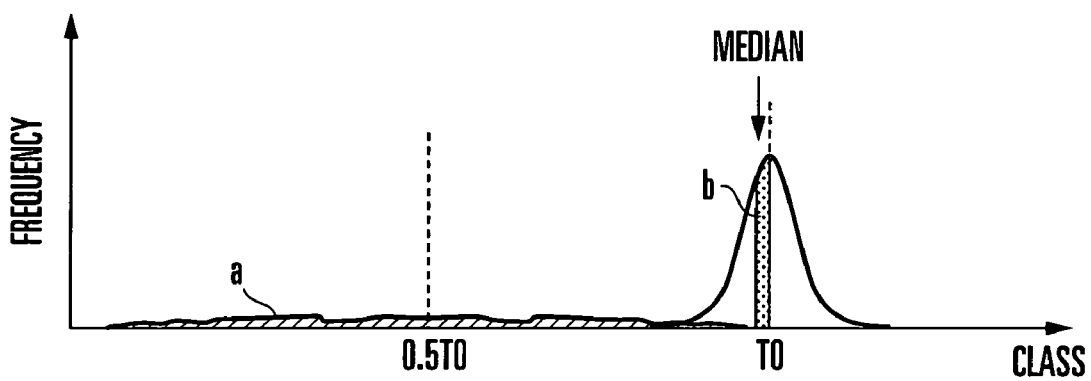
FIG. 20 is a graph showing the median of the periods of the mode hop pulses containing noise.

If a portion of a noise distribution which is superimposed on a normal distribution is neglected, the cumulative frequency of noise divided by two is twice the frequency included in the class between the median and T0. Therefore, the median of the periods of MHPs is located at a position where an area b is twice an area a in FIG. 20.

Excel (registered trademark) which is software available from Microsoft includes a function termed NORMSDIST( ) which can express the internal ratio between the both side values in the interval between the average of a normal distribution and ασ by "(1−(1−NORMSDIST(α))*2)*100[%]". Using this function makes it possible to express the median of the periods of MHPs as follows:

$$(1-(1-\text{NORMSDIST}((median-T0)/\sigma))*2)*(100-k)/2 = k[\%] \quad (18)$$

According to the above description, if a standard deviation σ is set to 0.02T0, an average T0' and median T0' of MHPs are calculated as follows when the periods of 10% of the MHPs are divided by two due to noise.

$$T0' = (1/(1+0.1))T0 = 0.91T0 \quad (19)$$

$$T0' = 0.995T0 \quad (20)$$

Assume that in this case, both the average and the median are represented by T0'. The counter value (the integral value of frequencies) is 1.1N, and the count error is 10%.

Figure 21:
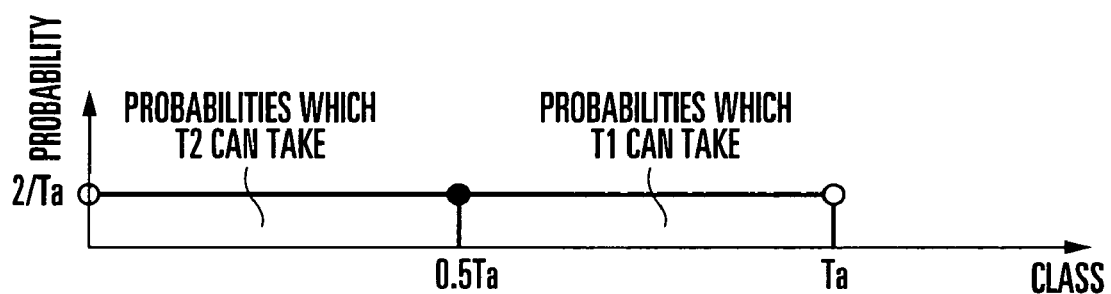
FIG. 21 is a graph showing the probability distribution of the periods of mode hop pulses whose periods are divided by two.

Consider the probabilities of intervals which two periods T1 and T2 (T1≧T2) after division of an MHP with a given period Ta by two can take. Assume that noise is randomly generated. As shown in FIG. 21, T2 can take the value defined by 0<T2≦Ta/2 at the same probability. Likewise, T1 can take the value defined by T/2≦T1<Ta at the same probability. The area of the probability distribution which T1 in FIG. 21 can take and the area of the probability distribution which T2 can take are both 1.

The periods Ta have a normal distribution centered on T0. If, therefore, Ta is regarded as a set, the frequency distribution of probabilities which T2 can take has the same shape as the cumulative frequency distribution of normal distributions with an average of 0.5T0 and a standard deviation of 0.5σ.

Figure 22:
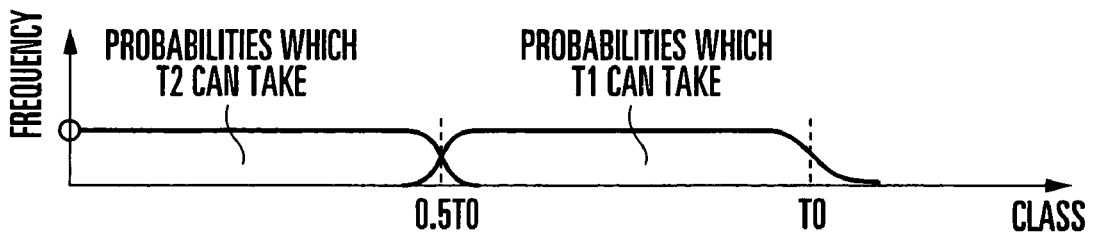
FIG. 22 is a graph showing the frequency distribution of the periods of mode hop pulses whose periods are divided by two.

As shown in FIG. 22, the frequency distribution of probabilities which T1 can take has a shape similar to the shape obtained by overlapping the cumulative frequency distribution of normal distribution with an average of 0.5T0 and a standard deviation of 0.5σ on the cumulative frequency distribution of normal distributions with an average of T0 and a standard deviation of σ. In this case, each of the numbers of T1 and T2 is equal to a count k[%]-N of MHPs whose periods are divided by two.

If a count k[%]-N of MHPs whose periods are divided by two due to noise can be counted, a count N of MHPs can be derived by $$N = N' - k[\%] \cdot N \quad (21)$$

Figure 23:
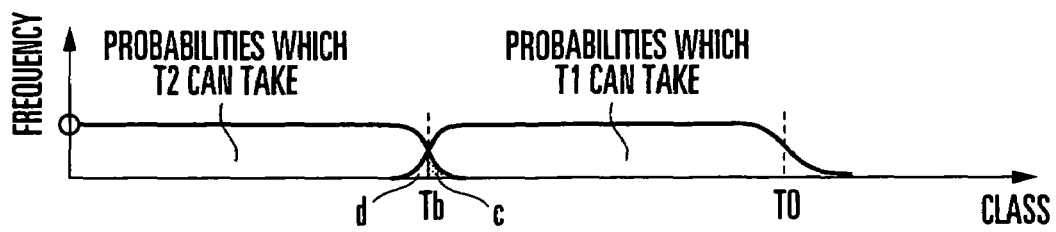
FIG. 23 is a graph showing the frequency distribution of the periods of mode hop pulses whose periods are divided by two.

If Tb can be set such that a count Ns of MHPs having periods equal to or less than Tb is equal to the count k[%]·N of MHPs whose periods are divided by two, as shown in FIG. 23, the count k[%]·N of MHPs whose periods are divided by two can be indirectly counted by counting the count Ns of MHPs having periods equal to or less than Tb.

Referring to FIG. 23, when the frequency (c in FIG. 23) of the period T2 of MHPs having periods equal to or more than Tb is equal to the frequency (d in FIG. 23) of the period T1 of MHPs having periods less than Tb, the number of MHPs having periods equal to or less than Tb becomes equal to the number of T2, i.e., the count Ns (=k[%]·N) of MHPs whose periods are divided by two. That is, the count N of MHPs can be expressed by $$N = N' - k[\%] \cdot N = N' - Ns \quad (22)$$

Since the frequency shapes of T1 and T2 are symmetrical with respect to 0.5Ta, performing determination by using 0.5Ta as a threshold makes it possible to accurately count the frequency Ns (=k[%]·N) of MHPs whose periods are divided by two.

Although the count k[%]·N of MHPs whose periods are divided by two can be indirectly counted by counting the number of MHPs having periods equal to or less than 0.5T0, T0 cannot be calculated from the frequency distribution (FIG. 19) of the periods of MHPs containing noise. If the parent population of MHPs is so ideal as to make the mode become equal to T0 and has a large modulus like the frequency distribution in FIG. 19, the mode can be used as T0'.

Figure 24:
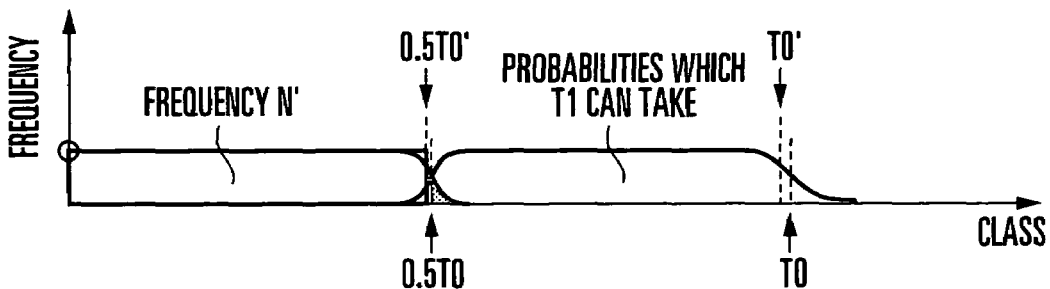
FIG. 24 is a graph showing the frequency distribution of the periods of mode hop pulses whose periods are divided by two.

In this case, counting of the count k[%]·N of MHPs using an average or a median T0' will be described. If T0'=y·T0 is set, and Ns is obtained by substituting T0' instead of T0, a frequency Ns' of periods smaller than 0.5T0' determined as the number of MHPs whose periods are divided by two is expressed by y·k[%]·N (FIG. 24).

If the average or median T0' is used, a count value Nt after correction is expressed by $$\begin{aligned} Nt &= N' - Ns' \quad (23) \\ &= (1 + k[\%])N - yk[\%]N \\ &= (1 + (1-y)k[\%])N \\ &= N + (1-y)k[\%]N \end{aligned}$$

Figure 25:
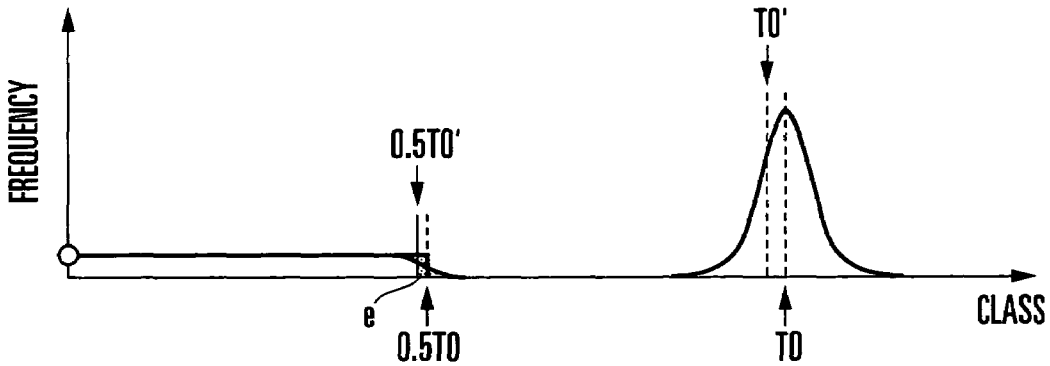
FIG. 25 is a graph showing errors after the correction of counter values.

Note that (1−y)k[%]N which is an error after correction represents the frequency of a portion e in FIG. 25.

An example of correction of the count result obtained by each of the counters 75-1 and 75-2 by using the average or median T0' will be described below.

If a standard deviation is expressed by a σ=0.02T0 and the periods of 10% of MHPs are divided by two due to noise (the count result includes an error of 10%), the average T0' of the periods of the MHPs is 0.91T0, and the median T0' is 0.9949T0. Therefore, when the average T0' is used, y is 0.91. When the median T0' is used, y is 0.9949. A count result N' after correction is calculated as follows:

$$N'=(1+0.1(1-0.91))N=1.009N \quad (24)$$

$$N'=(1+0.1(1-0.995))N=1.0005N \quad (25)$$

Equation (24) represents the count result N' after correction when the average T0' is used. Equation (25) represents the count result N' after correction when the median T0' is used. An error in the count result N' obtained when the average T0' is used is 0.9%. An error in the count result N' obtained when the median T0' is used is 0.05%.

Assume that a standard deviation is expressed by σ=0.05T0 and the periods of 20% of MHPs are divided by two due to noise (the count result includes an error of 20%). In this case, the average T0' of the periods of the MHPs is 0.83T0, and the median T0' is 0.9682T0. Therefore, when the average T0' is used, y is 0.83. When the median T0' is used, y is 0.968. The count result N' after correction is calculated as follows:

$$N'=(1+0.2(1-0.83))N=1.034N \quad (26)$$

$$N'=(1+0.2(1-0.968))N=1.0064N \quad (27)$$

Equation (26) represents the count result N' after correction when the average T0' is used. Equation (27) represents the count result N' after correction when the median T0' is used. An error in the count result N' obtained when the average T0' is used is 3.4%. An error in the count result N' obtained when the median T0' is used is 0.64%.

It is obvious from the above description that the error in the count result N' after correction can be reduced by correcting the count result N by using the median of the periods of the MHPs.

Figure 26:
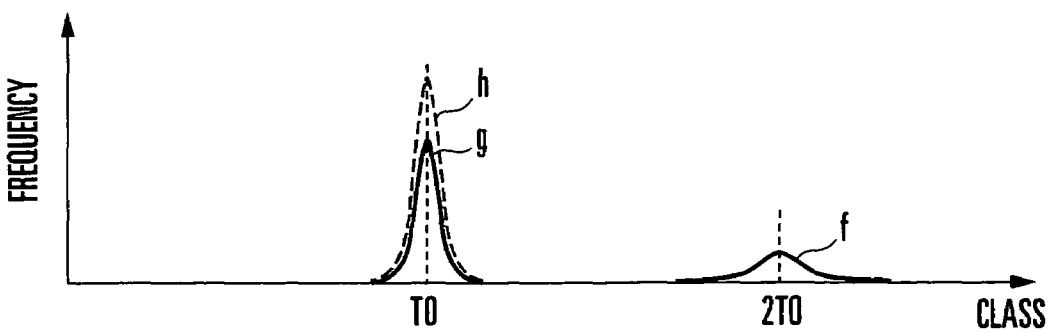
FIG. 26 is a graph showing the frequency distribution of the periods of mode hop pulses whose periods are doubled.

Correction of a count result in a case in which an omission has occurred in an MHP waveform will be described next. The periods of MHPs in a case in which an omission has occurred at the time of counting because of the low intensity of the MHP exhibit a normal distribution (f in FIG. 26) with an average of 2T0 and a standard deviation of 2σ because the proper periods of the MHPs exhibit a normal distribution centered on T0. If j[%] of the MHPs have been omitted, the frequency of the periods of the MHPs whose periods are doubled due to the omissions is represented by Nw (=j[%]·N). In addition, the frequency of periods of almost T0 after a reduction in the number of MHPs at the time of counting due to the omissions is represented by g in FIG. 26. A reduction in frequency represented by h in FIG. 26 is 2Nw (=2 j[%]). Therefore, a proper count N' of MHPs without any omissions of MHPs at the time of counting can be expressed by $$N'=N+j[\%]=N+Nw \quad (28)$$

Figure 27:
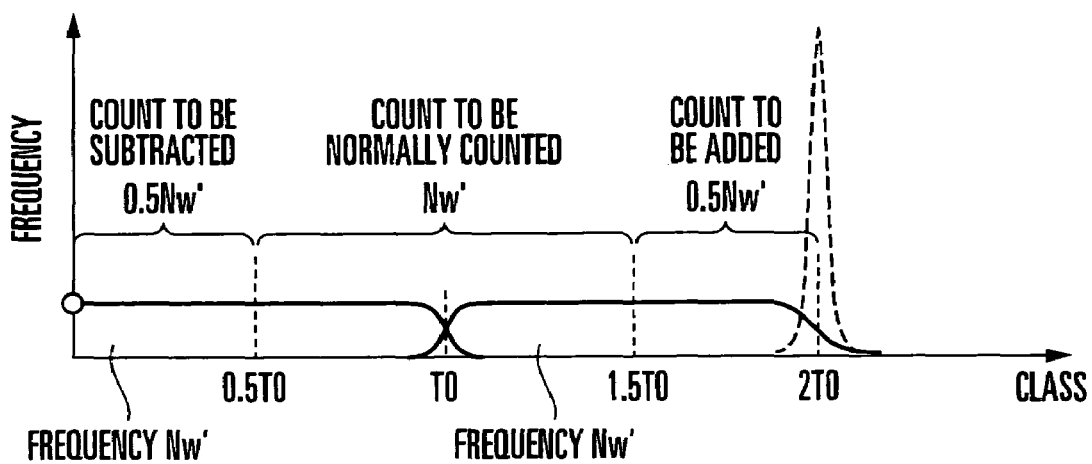
FIG. 27 is a graph showing the frequency distribution of the periods of mode hop pulses, of mode hop pulses omitted at the time of counting, whose periods are divided by two.

Consider next a threshold for periods at the time of counting Nw for the correction of a count result. Assume that p[%] of the frequency Nw of the periods of MHPs whose periods are doubled due to omissions at the time of counting are divided by two due to noise. The frequency of the periods of the MHP of the omitted MHPs which are divided by two is represented by Nw' (=j·p[%]·N). FIG. 27 shows the frequency distribution of the periods of the MHPs which are divided by two again. Assume that a threshold for periods to be regarded as Nw is set to 1.5T0. In this case, the frequency of the periods of MHPs whose periods are equal to or less than 0.5T0 is 0.5Nw' (=0.5p[%]·Nw), the frequency of the periods of MHPs whose periods range from 0.5T0 to 1.5T0 is Nw' (=p[%]·Nw), and the frequency of the periods of MHPs whose periods are equal to or more than 1.5T0 is 0.5Nw' (=0.5p[%]·Nw).

Figure 28:
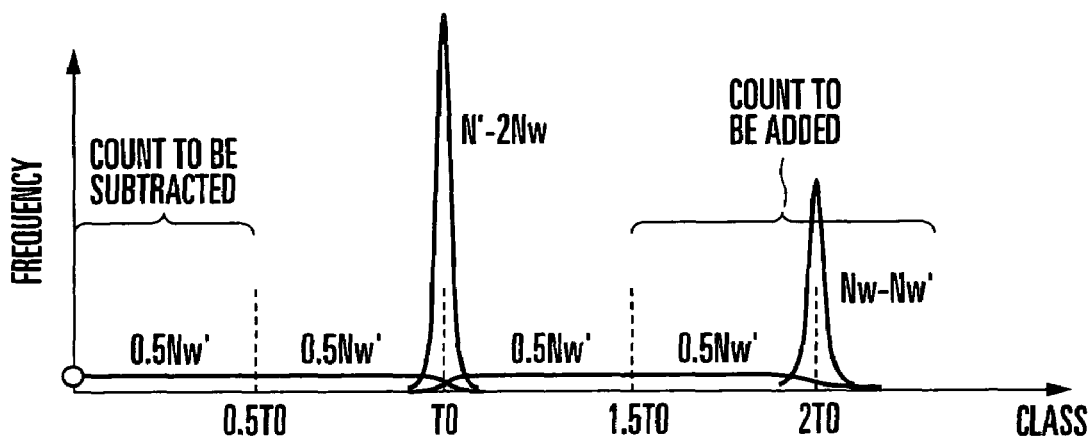
FIG. 28 is a graph showing the frequency distribution of the periods of mode hop pulses, of mode hop pulses omitted at the time of counting, whose periods are divided by two.

Therefore, the frequency distribution of the periods of all the MHPs becomes the one shown in FIG. 28. If a threshold for Ns is 0.5T0 and a threshold for Nw is 1.5T0, a count result N can be expressed by $$N=(N'-2Nw)+(Nw-Nw')+2Nw'=N'-Nw+Nw' \quad (29)$$

The following is the result obtained by correction using equation (29). Obviously, the proper count N' of the MHPs is calculated in a case in which no MHP omission has occurred at the time of counting.

$$N - 0.5Nw' + (0.5Nw' + (Nw - Nw')) = \qquad (30)$$
$$(N - Nw + Nw') + (0.5Nw' + (Nw - Nw')) = N'$$

It is obvious from the above description that the count result N can be corrected by setting a threshold for periods to 1.5 times the median when the frequency Nw is to be obtained. Note that as in the case in which the periods of MHPs are divided by two due to noise, since correction is performed by using the median instead of T0, a similar error occurs.

Figure 29:
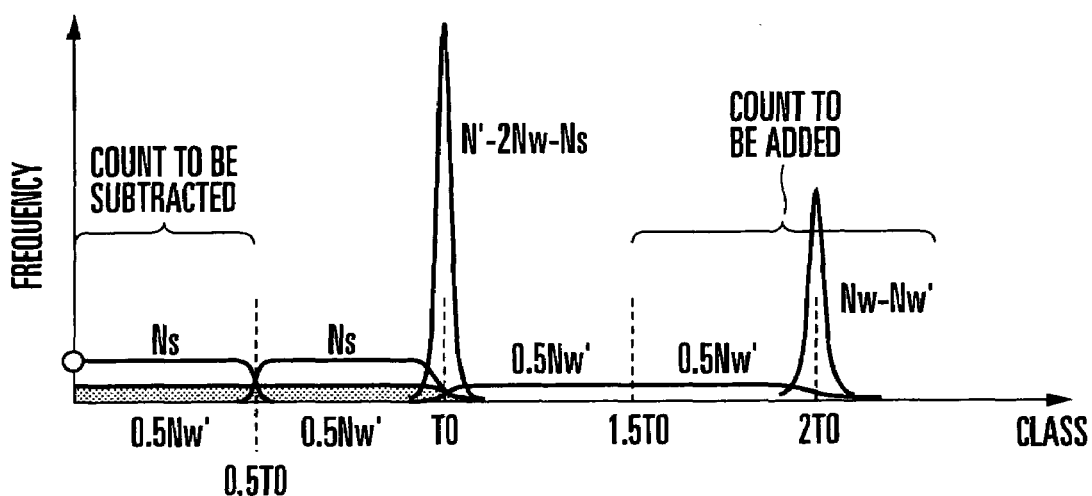
FIG. 29 is a graph showing the frequency distribution of the periods of mode hop pulses when omission and excessive counting of mode hop pulses occur simultaneously at the time of counting.

The above description has separately exemplified the case in which the periods of MHPs are divided by two as a result of excessively counting noise and the case in which the periods of MHPs are doubled due to omissions. Since these cases occur independently, they are expressed by one frequency distribution as shown in FIG. 29. If a threshold for Ns is 0.5T0 and a threshold for Nw is 1.5T0, the count result N can be expressed by $$N = (N' - 2Nw - Ns) + (Nw - Nw') + 2Nw' + 2Ns \qquad (31)$$
$$= N' - Nw + Nw' + Ns$$

The following is the result corrected by equation (31). Obviously, the proper count N' of the MHPs is calculated without any omission or excessive counting at the time of counting.

$$N - \{0.5Nw' + Ns\} + (0.5Nw' + (Nw - Nw')) = \qquad (32)$$
$$\{N - Nw + Nw' + Ns\} -$$
$$\{0.5Nw' + Ns\} + \{0.5Nw' + (Nw - Nw')\} = N'$$

This embodiment has exemplified the case in which correction for an MHP omission is performed when the periods of MHPs become almost twice the proper periods due to one omission. However, the present invention can also be applied to a case in which two or more MHPs are continuously omitted. When two MHPs are continuously omitted, a period three times a median can be regarded as the sum of the periods of three MHPs. In this case, obtaining a frequency in a class almost equal to or more than three times the median of periods and doubling the frequency can correct MHP omissions. When such an idea is generalized, it suffices to use the following equation instead of equation (16).

$$N' = N + Nw1 + Nw2 + Nw3 + \ldots - Ns \qquad (33)$$

where Nw1 is the total sum of periods in a class equal to or more than 1.5 times the median of the periods, Nw2 is the total sum of periods in a class equal to or more than 2.5 times the median of the periods, and Nw3 is the total sum of periods in a class equal to or more than 3.5 times the median of the periods.

Third Embodiment

The third embodiment of the present invention will be described next. The second embodiment obtains the numbers of MHPs in the first and second counting intervals Pn and Pm having fixed lengths. However, the first and second counting intervals Pn and Pm can have variable lengths. The arrangement of a distance/speed meter in the third embodiment is the same as that in the first embodiment, and hence will be described by using the reference numerals in FIG. 1.

Figure 30:
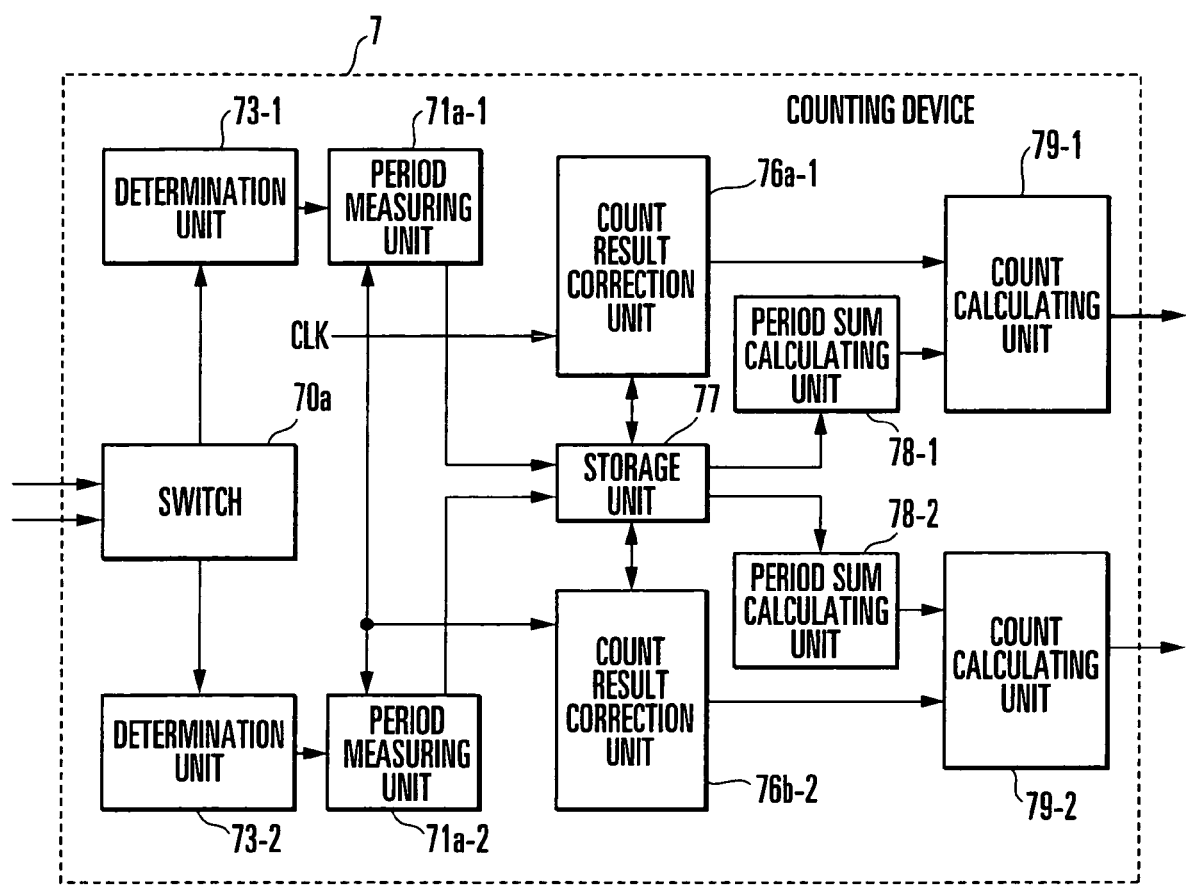
FIG. 30 is a block diagram showing an example of the arrangement of a counting device in the third embodiment of the present invention.
Figure 31:
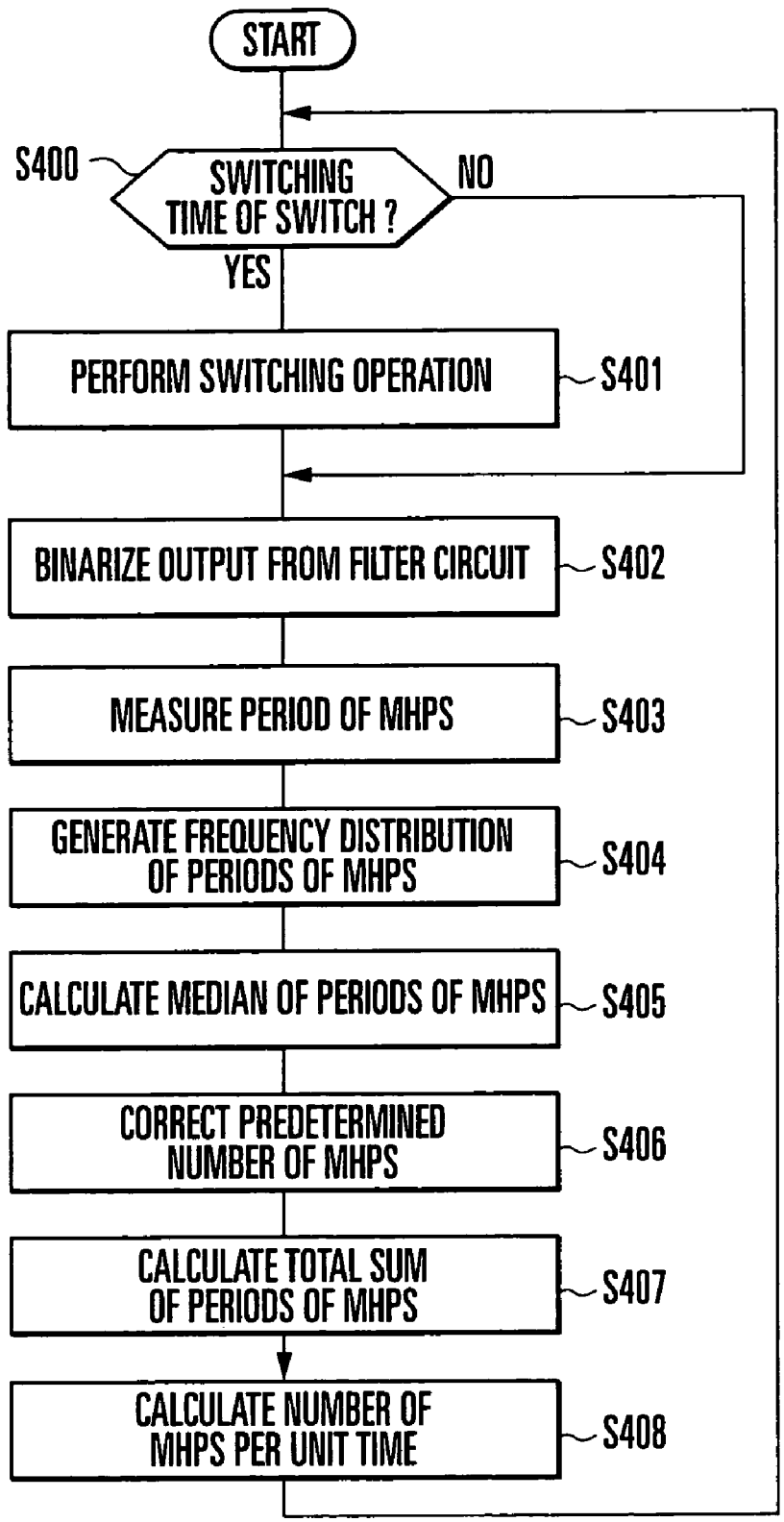
FIG. 31 is a flowchart showing the operation of the counting device in FIG. 30.

FIG. 30 shows an example of the arrangement of a counting device 7 according to this embodiment. FIG. 31 shows the operation of the counting device 7. The counting device 7 of this embodiment comprises a switch 70a, period measuring units 71a-1 and 71a-2, determination units 73-1 and 73-2, count result correction units 76a-1 and 76a-2, a storage unit 77, period sum calculating units 78-1 and 78-2, and count calculating units 79-1 and 79-2.

FIG. 32 shows an example of the arrangement of the count result correction unit 76a-1. The count result correction unit 76a-1 comprises a frequency distribution generating unit 761a, a median calculating unit 762a, and a correction value calculating unit 763a. The arrangement of the count result correction unit 76a-2 is the same as that of the count result correction unit 76a-1, and hence a repetitive description will be omitted.

The operation of the switch 70a is the same as that in steps S300 and S301 in FIG. 13 (steps S400 and S401 in FIG. 31). The operation of the determination units 73-1 and 73-2 is the same as that in step S302 in FIG. 13 (step S402 in FIG. 31).

The period measuring unit 71a-1 measures the period of each of a predetermined number N (N is a natural number equal to or larger than 2) of MHPs in an output from the determination unit 73-1 shown in FIG. 15B (step S403 in FIG. 31). Likewise, the period measuring unit 71a-2 measures the period of each of the predetermined number N of MHPs in an output from the determination unit 73-2 (step S403 in FIG. 31). At this time, the period measuring units 71a-1 and 71a-2 measure the periods of MHPs with the period of a clock signal CLK being regarded as one unit. The storage unit 77 stores the measurement results obtained by the period measuring units 71a-1 and 71a-2.

After measurement by the period measuring unit 71a-1, the frequency distribution generating unit 761a of the count result correction unit 76a-1 generates the frequency distribution of the periods of the MHPs from the measurement result obtained by the period measuring unit 71a-1 and stored in the storage unit 77 (step S404 in FIG. 31). Likewise, after measurement by the period measuring unit 71a-1, the frequency distribution generating unit 761a of the count result correction unit 76a-2 generates the frequency distribution of the periods of the MHPs from the measurement result obtained by the period measuring unit 71a-2 (step S404).

Subsequently, the median calculating unit 762a of the count result correction unit 76a-1 calculates a median T0 of the periods of MHPs from the frequency distribution generated by the frequency distribution generating unit 761a of the count result correction unit 76a-1 (step S405 in FIG. 31). Likewise, the median calculating unit 762a of the count result correction unit 76a-2 calculates the median T0 of the periods of MHPs from the frequency distribution generated by the frequency distribution generating unit 761a of the count result correction unit 76a-2 (step S405).

The correction value calculating unit 763a of the count result correction unit 76a-1 obtains a total sum Ns of frequencies in a class equal to or less than 0.5 times the median T0 of the periods calculated by the median calculating unit 762a of the count result correction unit 76a-1 and a total sum Nw of frequencies in a class equal to or more than 1.5 times the median T0 of the periods from the frequency distribution generated by the frequency distribution generating unit 761a of the count result correction unit 76a-1, and corrects the predetermined number N according to equation (16) (step S406 in FIG. 31). Likewise, the correction value calculating unit 763a of the count result correction unit 76a-2 obtains the total sum Ns of frequencies in a class equal to or less than 0.5 times the median T0 of the periods calculated by the median calculating unit 762a of the count result correction unit 76a-2 and the total sum Nw of frequencies in a class equal to or more than 1.5 times the median T0 of the periods from the frequency distribution generated by the frequency distribution generating unit 762a of the count result correction unit 76a-2, and corrects the predetermined number N according to equation (16) (step S406).

The period sum calculating unit 78-1 calculates a total sum Sum of the periods of MHPs from the measurement result obtained by the period measuring unit 71a-1 and stored in the storage unit 77 (step S407 in FIG. 31). Likewise, the period sum calculating unit 78-2 calculates the total sum Sum of the periods of MHPs from the measurement result obtained by the period measuring unit 71a-2 (step S407).

The count calculating unit 79-1 calculates a number X of MHPs per unit time in a first counting interval Pn by dividing a count result N' after correction, calculated by the correction value calculating unit 763a of the count result correction unit 76a-1, by the total sum Sum of the periods of MHPs calculated by the period sum calculating unit 78-1 (step S408 in FIG. 31). Likewise, the count calculating unit 79-2 calculates a number Y of MHPs per unit time in a second counting interval Pm by dividing the count result N' after correction, calculated by the correction value calculating unit 763a of the count result correction unit 76a-2, by the total sum Sum of the periods of MHPs calculated by the period sum calculating unit 78-2 (step S408).

The counting device 7 performs the above processing for each of the first and second counting intervals Pn and Pm. The MHP counts X and Y are simultaneously calculated as in the first and second embodiments. As described above, in this embodiment, the first counting interval Pn and the second counting interval Pm have variable lengths. That is, the total sum of the periods of MHPs calculated by the period sum calculating unit 78-1 corresponds to the length of the first counting interval Pn, and the total sum of the periods of MHPs calculated by the period sum calculating unit 78-2 corresponds to the length of the second counting interval Pm. Values corresponding to the count results N obtained by the counters 75-1 and 75-2 in the second embodiment are the predetermined numbers N which are fixed values in this embodiment.

Other arrangements are the same as those in the second embodiment. In the second embodiment, since the first counting interval Pn and the second counting interval Pm have fixed lengths, the total sum of the periods of MHPs calculated by the period sum calculating unit 78-1 may differ from the length of the first counting interval Pn in some cases. Likewise, the total sum of the periods of MHPs calculated by the period sum calculating unit 78-2 may differ from the length of the second counting interval Pm in some cases. For this reason, in the second embodiment, measurement errors may occur in MHP counts n and m obtained by the counting device 7, and hence distance and speed measurement errors may occur.

In contrast to this, in this embodiment, the total sums of the periods of MHPs calculated by the period sum calculating units 78-1 and 78-2 are equal to the lengths of the first counting interval Pn and second counting interval Pm. This can reduce measurement errors in the MHP counts n and m. This embodiment can therefore further improve the distance and speed measurement accuracy as well as obtaining the same effects as those of the second embodiment.

Fourth Embodiment

The fourth embodiment of the present invention will be described next. In the first to third embodiments, the state determination unit 82 determines that the measurement target 11 is in the minute displacement state, if calculation results on equations (2) and (3) are equal to each other, and determines that the measurement target 11 is in the displacement state, if calculation results on equations (4) and (5) are equal to each other. If calculation results on equations (2) and (3) are equal to each other and calculation results on equations (4) and (5) are equal to each other due to the influences of noise and the like, the state determination unit 82 cannot determine the state of the measurement target 11. In addition, if calculation results on equations (2) and (3) are different from each other and calculation results on equations (4) and (5) are different from each other, the state determination unit 82 cannot determine the state of the measurement target 11, either. In the fourth embodiment, even if a state determination unit 82 cannot determine the state of a measurement target 11, the distance to the measurement target 11 and the speed of the measurement target 11 can be calculated.

Figure 34:
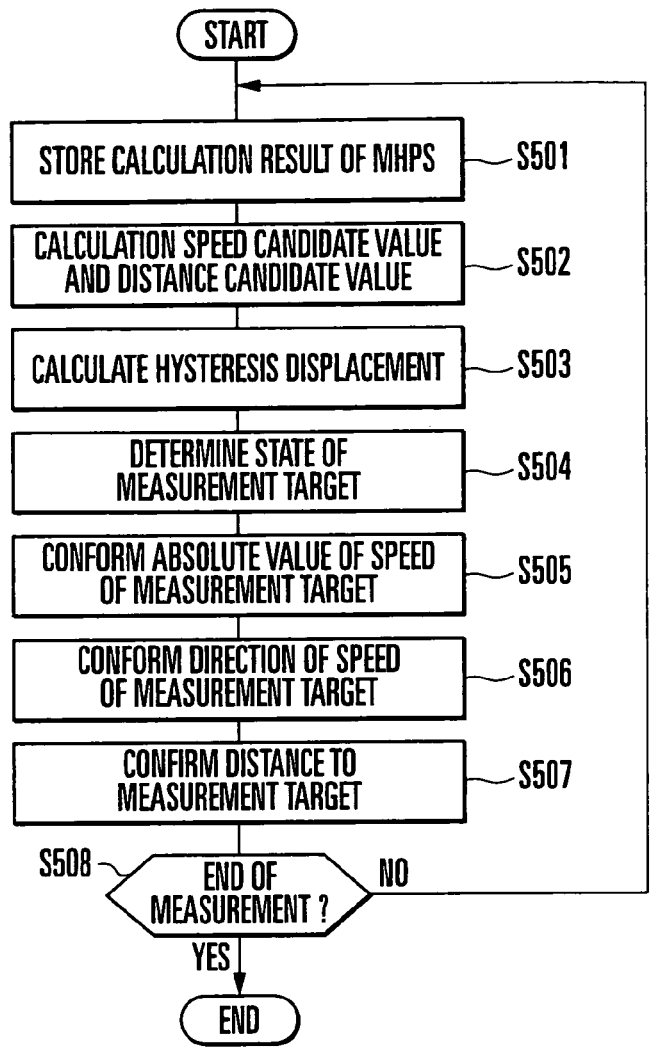
FIG. 34 is a flowchart showing the operation of the computing device in FIG. 33.

In this embodiment, the arrangement of a distance/speed meter is the same as that in the first embodiment, and hence will be described by using the reference numerals in FIG. 1. FIG. 33 shows an example of the arrangement of a computing device 8 in this embodiment. FIG. 34 shows the operation of the computing device 8. The computing device 8 of this embodiment comprises a storage unit 80, a distance/speed calculating unit 81, a state determination unit 82a which determines the state of the measurement target 11 on the basis of the calculation results obtained by the distance/speed calculating unit 81 and a hysteresis displacement calculating unit (to be described later), a speed confirming unit 83a which confirms the speed of the measurement target 11 on the basis of the determination result obtained by the state determination unit 82a, a distance confirming unit 84a which confirms the distance to the measurement target 11 on the basis of the determination result obtained by the state determination unit 82a, and a hysteresis displacement calculating unit 85 which calculates a hysteresis displacement which is the difference between the distance candidate value calculated by the distance/speed calculating unit 81 and the immediately preceding calculated distance candidate value. The speed confirming unit 83a and the distance confirming unit 84a constitute a distance/speed confirming unit 86a.

The operation of the storage unit 80 of the computing device 8 is the same as that in step S201 in FIG. 8 (step S501 in FIG. 34). The operation of the distance/speed calculating unit 81 is the same as that in step S202 in FIG. 8 (step S502 in FIG. 34).

The hysteresis displacement calculating unit 85 of the computing device 8 calculates a hysteresis displacement $Vcal\alpha1(t-2, t)$ as the difference between a second candidate value $L\alpha2(t-1, t)$ of the distance in the interval from time t−1 to time t and a first candidate value $L\alpha1(t-2, t-1)$ of the distance in the interval from time t−2 to time t−1, a hysteresis displacement $Vcal\alpha2(t-1, t+1)$ as the difference between a first candidate value $L\alpha1(t, t+1)$ of the distance in the interval from time t to time t+1 and a second candidate value $L\alpha2(t-1, t)$ of the distance in the interval from time t−1 to time t, a hysteresis displacement $Vcal\alpha3(t-2, t)$ as the difference between a first candidate value $L\alpha1(t-1, t)$ of the distance in the interval from time t−1 to time t and a second candidate value $L\alpha2(t-2, t-1)$ of the distance in the interval from time t−2 to time t−1, a hysteresis displacement $Vcal\alpha4(t-1, t+1)$ as the difference between a second candidate value $L\alpha2(t, t+1)$ of the distance in the interval from time t to time t+1 and a first candidate value Lα1(t−1, t) of the distance in the interval from time t−1 to time t, a hysteresis displacement Vcalβ1(t−2, t) as the difference between a fourth candidate value Lβ4(t−1, t) of the distance in the interval from time t−1 to time t and a third candidate value Lβ3(t−2, t−1) of the distance in the interval from time t−2 to time t−1, a hysteresis displacement Vcalβ2(t−1, t+1) as the difference between a third candidate value Lβ3(t, t+1) of the distance in the interval from time t to time t+1 and a fourth candidate value Lβ4(t−1, t) of the distance in the interval from time t−1 to time t, a hysteresis displacement Vcalβ3(t−2, t) as the difference between a third candidate value Lβ3(t−1, t) of the distance in the interval from time t−1 to time t and a fourth candidate value Lβ4(t−2, t−1) of the distance in the interval from time t−2 to time t−1, and a hysteresis displacement Vcalβ4(t−1, t+1) as the difference between a fourth candidate value Lβ4(t, t+1) of the distance in the interval from time t to time t+1 and a third candidate value Lβ3(t−1, t) of the distance in the interval from time t−1 to time t according to the following equations, and stores the calculated values in the storage unit 80 (step S503 in FIG. 34).

$$Vcal\alpha 1(t-2, t) = L\alpha 2(t-1, t) - L\alpha 1(t-2, t-1) \quad (34)$$

$$Vcal\alpha 2(t-1, t+1) = L\alpha 1(t, t+1) - L\alpha 2(t-1, t) \quad (35)$$

$$Vcal\alpha 3(t-2, t) = L\alpha (t-1, t) - L\alpha 2(t-2, t-1) \quad (36)$$

$$Vcal\alpha 4(t-1, t+1) = L\alpha 2(t, t+1) - L\alpha 1(t-1, t) \quad (37)$$

$$Vcal\beta 1(t-2, t) = L\beta 4(t-1, t) - L\beta 3(t-2, t-1) \quad (38)$$

$$Vcal\beta 2(t-1, t+1) = L\beta 3(t, t+1) - L\beta 4(t-1, t) \quad (39)$$

$$Vcal\beta 3(t-2, t) = L\beta 3(t-1, t) - L\beta 4(t-2, t-1) \quad (40)$$

$$Vcal\beta 4(t-1, t+1) = L\beta 4(t, t+1) - L\beta 3(t-1, t) \quad (41)$$

The hysteresis displacements Vcalα1(t−2, t), Vcalα2(t−1, t+1), Vcalα3(t−2, t), and Vcalα4(t−1, t+1) are values calculated on the assumption that the measurement target 11 is in the minute displacement state, and Vcalβ1(t−2, t), Vcalβ2(t−1, t+1), Vcalβ3(t−2, t), and Vcalβ4(t−1, t+1) are values calculated on the assumption that the measurement target 11 is in the displacement state.

The hysteresis displacement calculating unit 85 calculates equations (34) to (41) every time the counting device 7 calculates an MHP count. Note that in equations (34) to (41), the direction in which the measurement target 11 approaches the distance/speed meter is defined as a positive speed, and the direction in which the measurement target 11 moves away from the meter is defined as a negative speed.

Figure 35:
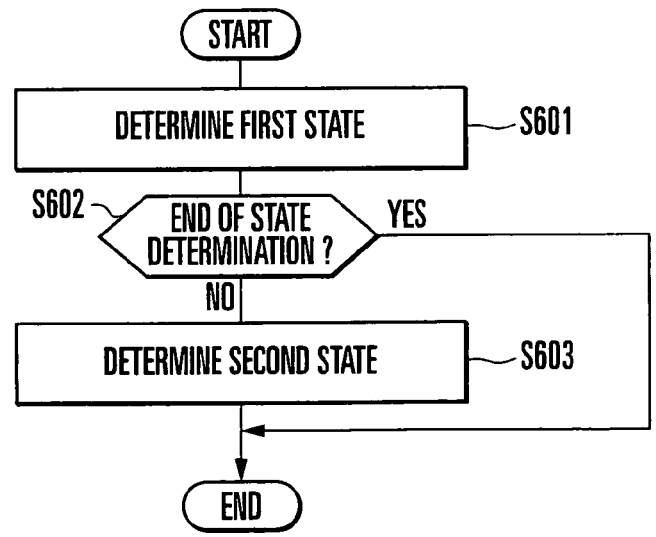
FIG. 35 is a flowchart showing the operation of a state determination unit in the computing device in FIG. 33.

The state determination unit 82a of the computing device 8 determines the state of the measurement target 11 by using calculation results on equations (34) to (41) stored in the storage unit 80 (step S34 in FIG. 34). FIG. 35 shows the operation of the state determination unit 82a.

First of all, the state determination unit 82a determines the state of the measurement target 11 by using calculation results on equations (2) to (5) like the state determination unit 82 in the first embodiment (step S601 in FIG. 35).

The state determination unit 82a determines that the measurement target 11 is in the minute displacement state, when calculation results on equations (2) and (3) are equal to each other, and determines that the measurement target 11 is in the displacement state, when calculation results on equations (4) and (5) are equal to each other (YES in step S602). The processing in step S504 is then terminated. The state determination unit 82a cannot perform state determination when calculation results on equations (2) and (3) are equal to each other and calculation results on equations (4) and (5) are equal to each other, or when calculation results on equations (2) and (3) are different from each other and calculation results on equations (4) and (5) are different from each other. The process therefore advances to step S603.

In step S603, the state determination unit 82a determines the state of the measurement target 11 by using the calculation results on equations (2) to (5) and the calculation results on equations (34) to (41).

As disclosed in reference 4, when the measurement target 11 moves in the minute displacement state (uniform motion), the hysteresis displacement Vcalα calculated on the assumption that the measurement target 11 is in the minute displacement state is constant in sign, and the speed candidate value Vα calculated on the assumption that the measurement target 11 is in the minute displacement is equal to the absolute average value of the hysteresis displacement Vcalα. When the measurement target 11 moves at a uniform speed in the minute displacement state, the hysteresis displacement Vcalβ calculated on the assumption that the measurement target 11 is in the displacement state is inverted every time the number of MHPs is calculated.

The state determination unit 82a therefore determines that the measurement target 11 is in the minute displacement state and in uniform motion, if the sign of the hysteresis displacement Vcalα1(t−2, t) given by equation (34) coincides with the sign of the hysteresis displacement Vcalα2(t−1, t+1) given by equation (35), both given on the assumption that the measurement target 11 is in the minute displacement state, and the average of the speed candidate values Vα1(t, t+1) and Vα2(t, t+1) calculated on the assumption that the measurement target 11 is in the minute displacement state is equal to the average of the absolute value of the hysteresis displacement Vcalα1(t−2, t) and the absolute value of the hysteresis displacement Vcalα2(t−1, t+1).

Alternatively, the state determination unit 82a determines that the measurement target 11 is in the minute displacement state and in uniform motion, if the sign of the hysteresis displacement Vcalα3(t−2, t) given by equation (36) coincides with the sign of the hysteresis displacement Vcalα4(t−1, t+1) given by equation (37), both given on the assumption that the measurement target 11 is in the minute displacement state, and the average of the speed candidate values Vα1(t, t+1) and Vα2(t, t+1) calculated on the assumption that the measurement target 11 is in the minute displacement state is equal to the average of the absolute value of the hysteresis displacement Vcalα3(t−2, t) and the absolute value of the hysteresis displacement Vcalα4(t−1, t+1).

As disclosed in reference 4, when the measurement target 11 moves in the displacement state (uniform motion), the hysteresis displacement Vcalβ calculated on the assumption that the measurement target 11 in the displacement state is constant in sign, and the speed candidate value Vβ calculated on the assumption that the measurement target 11 is in the displacement is equal to the absolute average value of the hysteresis displacement Vcalβ. When the measurement target 11 is moving at a uniform speed in the displacement state, the hysteresis displacement Vcalα calculated on the assumption that the measurement target 11 is in the minute displacement state is inverted every time the number of MHPs is calculated.

The state determination unit 82a therefore determines that the measurement target 11 is in the displacement state and in uniform motion, if the sign of the hysteresis displacement Vcalβ1(t−2, t) given by equation (38) coincides with the sign of the hysteresis displacement Vcalβ2(t−1, t+1) given by equation (39), both given on the assumption that the measurement target 11 is in the displacement state, and the average of the speed candidate values $V\beta3(t, t+1)$ and $V\beta4(t, t+1)$ calculated on the assumption that the measurement target 11 is in the displacement state is equal to the average of the absolute value of the hysteresis displacement $Vcal\beta1(t-2, t)$ and the absolute value of the hysteresis displacement $Vcal\beta2(t-1, t+1)$.

Alternatively, the state determination unit 82a determines that the measurement target 11 is in the displacement state and in uniform motion, if the sign of the hysteresis displacement $Vcal\beta3(t-2, t)$ given by equation (40) coincides with the sign of the hysteresis displacement $Vcal\beta4(t-1, t+1)$ given by equation (41), both given on the assumption that the measurement target 11 is in the displacement state, and the average of the speed candidate values $V\beta3(t, t+1)$ and $V\beta4(t, t+1)$ calculated on the assumption that the measurement target 11 is in the displacement state is equal to the average of the absolute value of the hysteresis displacement $Vcal\beta3(t-2, t)$ and the absolute value of the hysteresis displacement $Vcal\beta4(t-1, t+1)$.

As disclosed in reference 4, when the measurement target 11 is in the minute displacement state and in motion other than uniform motion, the speed candidate value $V\alpha$ calculated on the assumption that the measurement target 11 in the minute displacement state is not equal to the absolute average value of the hysteresis displacement $Vcal\alpha$ calculated on the assumption that the measurement target 11 is in the minute displacement. Likewise, the speed candidate value $V\beta$ calculated on the assumption that the measurement target 11 in the displacement state is not equal to the absolute average value of the hysteresis displacement $Vcal\beta$ calculated on the assumption that the measurement target 11 is in the displacement state.

When the measurement target 11 is in the minute displacement state and in motion other than uniform motion, the sign of the hysteresis displacement $Vcal\alpha$ calculated on the assumption that the measurement target 11 is in the minute displacement state is inverted every time the number of MHPs is calculated. In this case, although the sign of the hysteresis displacement $Vcal\beta$ calculated on the assumption that the measurement target 11 is in the displacement state changes, the change does not occur every time the number of MHPs is calculated.

The state determination unit 82a therefore determines that the measurement target 11 is in the minute displacement state and in motion other than uniform motion, if the sign of the hysteresis displacement $Vcal\alpha1(t-2, t)$ given by equation (34) differs from the sign of the hysteresis displacement $Vcal\alpha2(t-1, t+1)$ given by equation (35), both given on the assumption that the measurement target 11 is in the minute displacement state, and the average of the speed candidate values $V\alpha1(t, t+1)$ and $V\alpha2(t, t+1)$ calculated on the assumption that the measurement target 11 is in the minute displacement state is not equal to the average of the absolute value of the hysteresis displacement $Vcal\alpha1(t-2, t)$ and the absolute value of the hysteresis displacement $Vcal\alpha2(t-1, t+1)$.

Alternatively, the state determination unit 82a determines that the measurement target 11 is in the minute displacement state and in motion other than uniform motion, if the sign of the hysteresis displacement $Vcal\alpha3(t-2, t)$ given by equation (36) differs from the hysteresis displacement $Vcal\alpha4(t-1, t+1)$ given by equation (37), both given on the assumption that the measurement target 11 is in the minute displacement state, and the average of the speed candidate values $V\alpha1(t, t+1)$ and $V\alpha2(t, t+1)$ calculated on the assumption that the measurement target 11 is in the minute displacement state is not equal to the average of the absolute value of the hysteresis displacement $Vcal\alpha3(t-2, t)$ and the absolute value of the hysteresis displacement $Vcal\alpha4(t-1, t+1)$.

Consider the speed candidate value $V\beta$. Each of the absolute value of $V\beta3(t, t+1)$ and the absolute value of $V\beta4(t, t+1)$ is a constant and equal to the value obtained by multiplying the average of the distance candidate values $L\alpha1(t, t+1)$ and $L\alpha2(t, t+1)$ calculated on the assumption that the measurement target 11 is in the minute displacement state by a wavelength change rate $(\lambda b-\lambda a)/\lambda b$ of the semiconductor lasers 1-1 and 1-2. The state determination unit 82a therefore can determine that the measurement target 11 is in the minute displacement state and in motion other than uniform motion, if each of the absolute values of the speed candidate values $V\beta3(t, t+1)$ and $V\beta4(t, t+1)$ calculated on the assumption that the measurement target 11 is in the displacement state is equal to the value obtained by multiplying the average of the distance candidate values $L\alpha1(t, t+1)$ and $L\alpha2(t, t+1)$ by the wavelength change rate $(\lambda b-\lambda a)/\lambda b$, and the average of the speed candidate values $V\alpha1(t, t+1)$ and $V\alpha2(t, t+1)$ calculated on the assumption that the measurement target 11 is in the minute displacement state is not equal to the average of the absolute value of the hysteresis displacement $Vcal\alpha1(t-2, t)$ and the absolute value of the hysteresis displacement $Vcal\alpha2(t-1, t+1)$.

Alternatively, the state determination unit 82a can determine that the measurement target 11 is in the minute displacement state and in motion other than uniform motion, if each of the absolute values of the speed candidate values $V\beta3(t, t+1)$ and $V\beta4(t, t+1)$ calculated on the assumption that the measurement target 11 is in the displacement state is equal to the value obtained by multiplying the average of the distance candidate values $L\alpha1(t, t+1)$ and $L\alpha2(t, t+1)$ by the wavelength change rate $(\lambda b-\lambda a)/\lambda b$, and the average of the speed candidate values $V\alpha1(t, t+1)$ and $V\alpha2(t, t+1)$ calculated on the assumption that the measurement target 11 is in the minute displacement state is not equal to the average of the absolute value of the hysteresis displacement $Vcal\alpha3(t-2, t)$ and the absolute value of the hysteresis displacement $Vcal\alpha4(t-1, t+1)$.

As disclosed in reference 4, when the measurement target 11 is in the displacement state and in motion other than uniform motion, the speed candidate value $V\alpha$ calculated on the assumption that the measurement target 11 is in the minute displacement state is not equal to the absolute average value of the hysteresis displacement $Vcal\alpha$ calculated on the assumption that the measurement target 11 is in the minute displacement state, and the speed candidate value $V\beta$ calculated on the assumption that the measurement target 11 is in the displacement state is not equal to the absolute average value of the hysteresis displacement $Vcal\beta$ calculated on the assumption that the measurement target 11 is in the displacement state. In addition, when the measurement target 11 is in the displacement state and in motion other than uniform motion, the sign of the hysteresis displacement $Vcal\beta$ calculated on the assumption that the measurement target 11 is in the displacement state is inverted every time the number of MHPs is calculated. In this case, although the sign of the hysteresis displacement $Vcal\alpha$ calculated on the assumption that the measurement target 11 is in the minute displacement state changes, the change does not occur every time the number of MHPs is calculated.

The state determination unit 82a therefore determines that the measurement target 11 is in the displacement state and in motion other than uniform motion, if the sign of the hysteresis displacement $Vcal\beta1(t-2, t)$ given by equation (38) differs from the sign of the hysteresis displacement $Vcal\beta2(t-1, t+1)$ given by equation (39), both given on the assumption that the measurement target 11 is in the displacement state, and the average of the speed candidate values Vβ3(t, t+1) and Vβ4(t, t+1) calculated on the assumption that the measurement target 11 is in the displacement state is not equal to the average of the absolute value of the hysteresis displacement Vcalβ1(t−2, t) and the absolute value of the hysteresis displacement Vcalβ2 (t−1, t+1).

Alternatively, the state determination unit 82a determines that the measurement target 11 is in the displacement state and in motion other than uniform motion, if the sign of the hysteresis displacement Vcalβ3(t−2, t) given by equation (40) differs from the sign of the hysteresis displacement Vcalβ4 (t−1, t+1) given by equation (41), both given on the assumption that the measurement target 11 is in the displacement state, and the average of the speed candidate values Vβ3(t, t+1) and Vβ4(t, t+1) calculated on the assumption that the measurement target 11 is in the displacement state is not equal to the average of the absolute value of the hysteresis displacement Vcalβ3(t−2, t) and the absolute value of the hysteresis displacement Vcalβ4(t−1, t+1).

Consider the speed candidate value Va. Each of the absolute value of Vα1(t, t+1) and the absolute value of Vα2(t, t+1) is a constant and equal to the value obtained by multiplying the average of the distance candidate values Lβ3(t, t+1) and Lβ4(t, t+1) calculated on the assumption that the measurement target 11 is in the displacement state by a wavelength change rate (λb−λa)/λb of the semiconductor lasers 1-1 and 1-2. The state determination unit 82a therefore can determine that the measurement target 11 is in the displacement state and in motion other than uniform motion, if each of the absolute values of the speed candidate values Vα1(t, t+1) and Vα2(t, t+1) calculated on the assumption that the measurement target 11 is in the minute displacement state is equal to the value obtained by multiplying the average of the distance candidate values Lβ3(t, t+1) and Lβ4(t, t+1) by the wavelength change rate (λb−λa)/λb, and the average of the speed candidate values Vβ3(t, t+1) and Vβ4(t, t+1) calculated on the assumption that the measurement target 11 is in the displacement state is not equal to the average of the absolute value of the hysteresis displacement Vcalβ1(t−2, t) and the absolute value of the hysteresis displacement Vcalβ2(t−1, t+1).

Alternatively, the state determination unit 82a can determine that the measurement target 11 is in the displacement state and in motion other than uniform motion, if each of the absolute values of the speed candidate values Vα1(t, t+1) and Vα2(t, t+1) calculated on the assumption that the measurement target 11 is in the minute displacement state is equal to the value obtained by multiplying the average of the distance candidate values Lβ3(t, t+1) and Lβ4(t, t+1) by the wavelength change rate (λb−λa)/λb, and the average of the speed candidate values Vβ3(t, t+1) and Vβ4(t, t+1) calculated on the assumption that the measurement target 11 is in the displacement state is not equal to the average of the absolute value of the hysteresis displacement Vcalβ3(t−2, t) and the absolute value of the hysteresis displacement Vcalβ4(t−1, t+1).

The processing in step S603 ends as described above. Table 1 shows the determining operation of the state determination unit 82a in step S603.

TABLE 1

| | | Hysteresis Displacement | | Speed Candidate Value | |
|---|---|---|---|---|---|
| | | Vcalα | Vcalβ | Vα | Vβ |
| Movement | Minute Displacement State | sign is constant speed candidate value is equal to absolute average value of hysteresis displacement | inverted at every sign period | — | — |
| | Displacement State | inverted at every sign period | sign is constant speed candidate value is equal to absolute average value of hysteresis displacement | — | — |
| Vibration | Minute Displacement State | inverted at every sign period speed candidate value is not equal to absolute average value of hysteresis displacement | — | — | absolute speed candidate value is equal to value obtained by multiplying distance candidate value calculated on assumption that measurement target is in minute displacement state by wavelength change rate |

TABLE 1-continued

| | Hysteresis Displacement | | Speed Candidate Value | |
|---|---|---|---|---|
| | Vcalα | Vcalβ | Vα | Vβ |
| Displacement State | — | inverted at every sign period speed candidate value is not equal to absolute average value of hysteresis displacement | absolute speed candidate value is equal to value obtained by multiplying distance candidate value calculated on assumption that measurement target is in displacement state by wavelength change rate | |

The speed confirming unit 83a of the computing device 8 then confirms the absolute value of the speed of the measurement target 11 on the basis of the determination result obtained by the state determination unit 82a (step S505 in FIG. 34). That is, if it is determined that the measurement target 11 is in the minute displacement state and in uniform motion or motion other than uniform motion, the speed confirming unit 83a confirms the average value of the speed candidate values Vα1(t, t+1) and Vα2(t, t+1) stored in the storage unit 80 as the absolute value of the speed of the measurement target 11 in the interval from time t−1 to time t+1 (step S505).

If it is determined that the measurement target 11 is in the displacement state and in uniform motion or motion other than uniform motion, the speed confirming unit 83a confirms the average value of the speed candidate values Vβ3(t, t+1) and Vβ4(t, t+1) stored in the storage unit 80 as the absolute value of the speed of the measurement target 11 in the interval from time t−1 to time t+1 (step S505).

Note that if it is determined that the measurement target 11 is in the minute displacement state and in uniform motion or motion other than uniform motion, the speed confirming unit 83a may confirm the speed candidate value Vα5(t) stored in the storage unit 80 as the absolute value of the speed of the measurement target 11 in the interval from time t−1 to time t (step S505). In addition, if it is determined that the measurement target 11 is in the displacement state and in uniform motion or motion other than uniform motion, the speed confirming unit 83a may confirm the speed candidate value Vβ6(t) stored in the storage unit 80 as the absolute value of the speed of the measurement target 11 in the interval from time t−1 to time t (step S505).

The speed confirming unit 83a then calculates equations (14) and (15) in the same manner as in step S205 in FIG. 8, and confirms the direction of the speed of the measurement target 11 (step S506 in FIG. 34). When confirming the absolute value of the speed by using a calculation result on equation (6) or (7) instead of using calculation results on equations (2) to (5) in step S505, the speed confirming unit 83a compares the MHP counts X(t) and Y(t). If X(t) is larger than Y(t), the speed confirming unit 83a determines that the measurement target 11 is approaching the distance/speed meter. If Y(t) is larger than X(t), the speed confirming unit 83a determines that the measurement target 11 is moving away from the distance/speed meter (step S506).

The distance confirming unit 84a then confirms the distance to the measurement target 11 on the basis of the determination result obtained by the state determination unit 82a (step S507 in FIG. 34). That is, if it is determined that the measurement target 11 is in the minute displacement state and in uniform motion or motion other than uniform motion, the distance confirming unit 84a confirms the average value of the distance candidate values Lα1(t, t+1) and Lα2(t, t+1) stored in the storage unit 80 as an average distance to the measurement target 11 in the interval from time t−1 to time t+1 (step S507).

If it is determined that the measurement target 11 is in the displacement state and in uniform motion or motion other than uniform motion, the distance confirming unit 84a confirms the average value of the distance candidate values Lβ3 (t, t+1) and Lβ4(t, t+1) stored in the storage unit 80 as an average distance to the measurement target 11 in the interval from time t−1 to time t+1 (step S507).

Note that if it is determined that the measurement target 11 is in the minute displacement state and in uniform motion or motion other than uniform motion, the distance confirming unit 84a may confirm the distance candidate value Lα5(t) stored in the storage unit 80 as an average distance to the measurement target 11 in the interval from time t−1 to time t (step S507). In addition, if it is determined that the measurement target 11 is in the displacement state and in uniform motion or motion other than uniform motion, the distance confirming unit 84a may confirm the distance candidate value Lβ6(t) stored in the storage unit 80 as an average distance to the measurement target 11 in the interval from time t−1 to time t (step S507).

The computing device 8 performs the processing in steps S501 to S507 described above every time the counting device 7 calculates the number of MHPs until, for example, the user issues a measurement end instruction (YES in step S508 in FIG. 34). The arrangement of the fourth embodiment is the same as that of the first embodiment except for the computing device 8.

Even if the state of the measurement target 11 cannot be determined due to the influences of noise and the like in the first embodiment, the fourth embodiment can calculate the distance to the measurement target 11 and the speed of the measurement target 11 upon determining the state of the measurement target 11.

Fifth Embodiment

The fifth embodiment of the present invention will be described next. When a measurement target 11 is in motion other than uniform motion, the sign of a mathematical expression irrelevant to a region corresponding to the motion state is inverted as the sign of the acceleration of the measurement target 11 changes. This causes a determination error. In the fourth embodiment, therefore, a state determination unit 82*a* of a computing device 8 can determine that the measurement target 11 is uniform motion, when the sign of a hysteresis displacement Vcalα2(t−1, t+1) given by equation (35) coincides with the sign of a hysteresis displacement Vcalα4(t−1, t+1) given by equation (37), and can determine that the measurement target 11 is in motion other than uniform motion, when the sign of a hysteresis displacement Vcalβ2(t−1, t+1) given by equation (39) differs from the sign of a hysteresis displacement Vcalβ4(t−1, t+1) given by equation (41).

Sixth Embodiment

Figure 36:
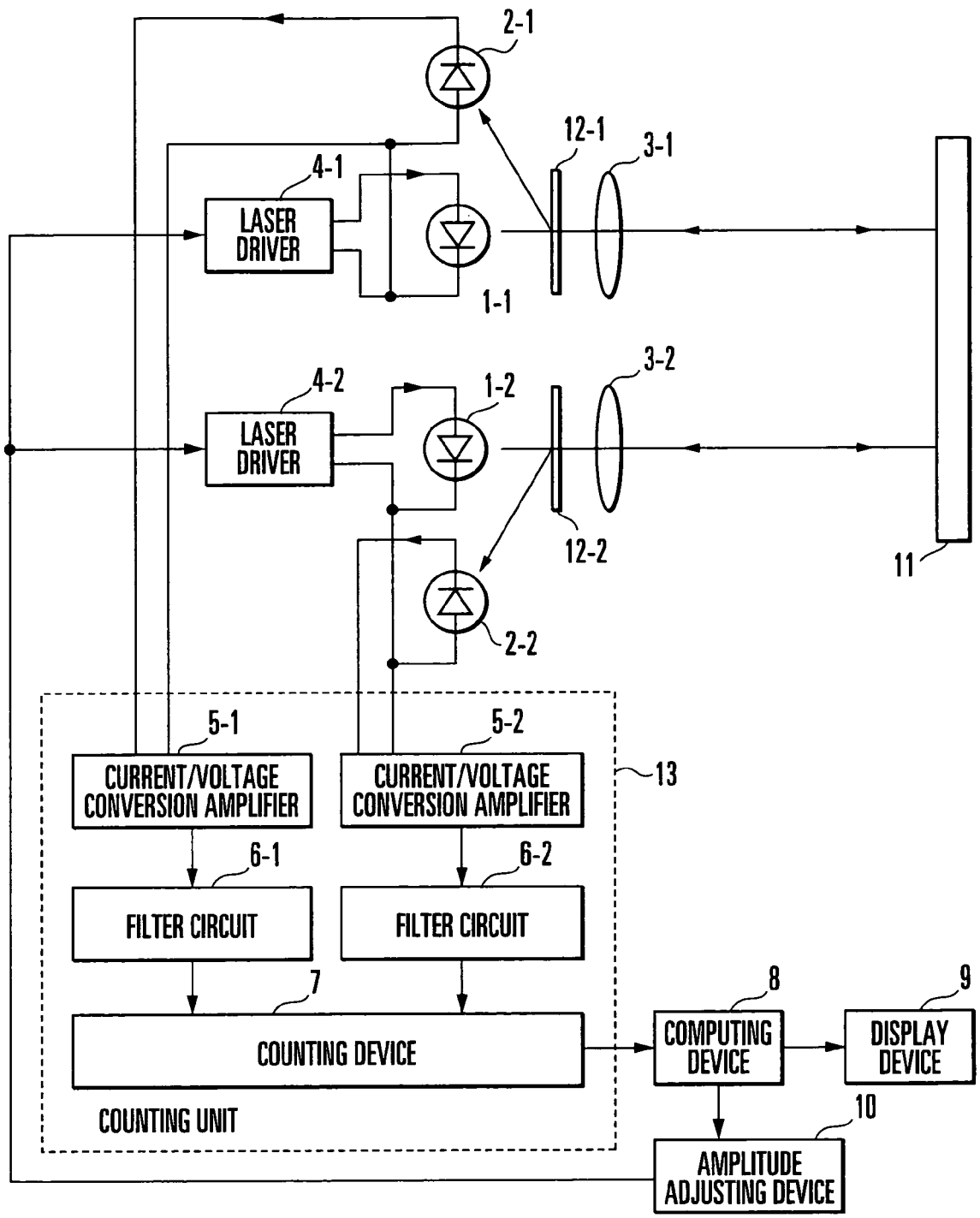
FIG. 36 is a block diagram showing the arrangement of a distance/speed meter according to the sixth embodiment of the present invention.

The first to fifth embodiments have exemplified the case in which the present invention is applied to a self-mixing type interferometer. However, the present invention can also be applied to interferometers other than self-mixing type interferometers. FIG. 36 shows the arrangement of a distance/speed meter according to the sixth embodiment of the present invention. The same reference numerals as in FIG. 1 denote the same components in FIG. 36. Referring to FIG. 36, reference numerals 12-1 and 12-2 denote beam splitters which split incident light and reflected light.

As in the first embodiment, laser light beams from semiconductor lasers 1-1 and 1-2 are applied parallel to a measurement target 11. The laser beams passing through the beam splitters 12-1 and 12-2 and lenses 3-1 and 3-2 strike the measurement target 11. In this embodiment, light beams from the semiconductor lasers 1-1 and 1-2 which are reflected by the measurement target 11 are split from incident light beams to the measurement target 11 by the beam splitters 12-1 and 12-2, respectively, and guided to photodiodes 2-1 and 2-2.

Since the arrangement comprising the photodiodes 2-1 and 2-2 and subsequent components is the same as that in the first to fifth embodiments, a description of the arrangement will be omitted. In this manner, with an interferometer other than the self-mixing type, the same effects as those of the first to fifth embodiments can be obtained.

Note that the counting device 7 and the computing unit 8 in the first to sixth embodiments can be implemented by, for example, a computer including a CPU, storage device, and interface and programs which control these hardware resources. Programs for operating such a computer are provided while being recorded on a recording medium such as a flexible disk, CD-ROM, DVD-ROM, or memory card. The CPU writes a read program in the storage device, and executes processing described in the first to sixth embodiments in accordance with the program.

In the first to sixth embodiments, when the measurement target 11 is vibrating (at, for example, a maximum speed of 2 nm) with a very small displacement, although a change (amplitude) in actual distance is several nm, since the resolution of distance calculation is lower than the displacement resolution, a large error occurs. When, therefore, a measurement target is in motion with a very small displacement, an improvement in accuracy can be achieved by setting, as a change in distance, the value obtained by integrating displacements (speeds), instead of a calculation result.

Figure 37:
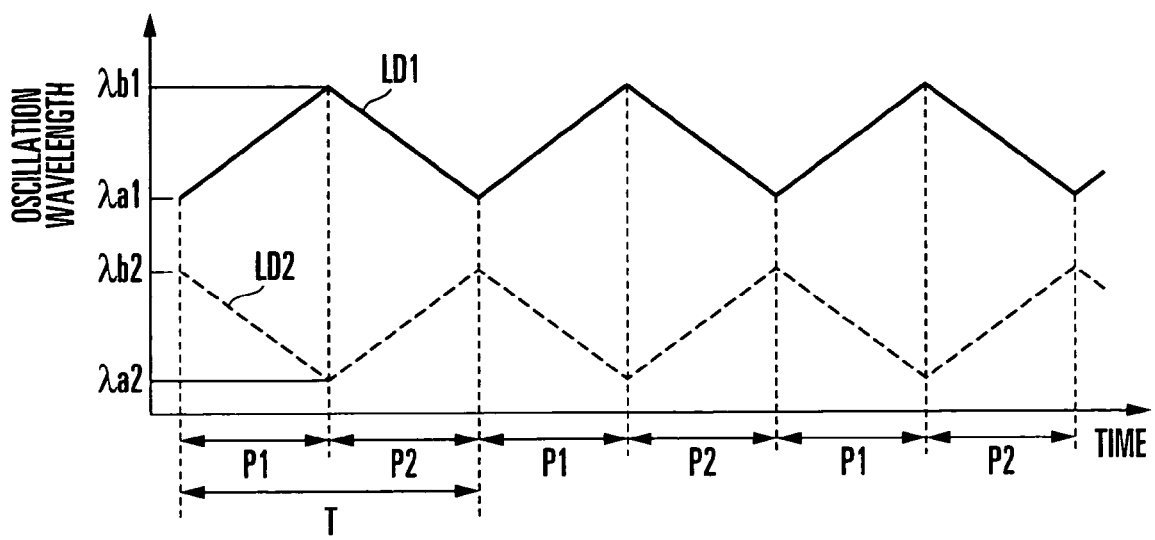
FIG. 37 is a timing chart showing another example of a temporal change in the oscillation wavelength of each of the semiconductor lasers in the first to sixth embodiments of the present invention.

The first to sixth embodiments have exemplified the case in which the semiconductor lasers 1-1 and 1-2 have the same minimum oscillation wavelength $\lambda a$ and the same minimum oscillation wavelength $\lambda b$. However, the present invention is not limited to this. As shown in FIG. 37, the semiconductor lasers 1-1 and 1-2 may have different minimum oscillation wavelengths $\lambda a$ and different maximum oscillation wavelengths $\lambda b$. Referring to FIG. 37, reference symbols $\lambda a1$ and $\lambda b1$ denote the minimum and maximum oscillation wavelengths of the semiconductor laser 1-1; and $\lambda a2$ and $\lambda b2$ denote the minimum and maximum oscillation wavelengths of the semiconductor laser 1-2. In this case, it suffices if $\lambda a1 \times \lambda b1/\{4\times(\lambda b1-\lambda a1)\}$ and $\lambda a2 \times \lambda b2/\{4\times(\lambda b2-\lambda a2)\}$ are always the same fixed value. In this case, as $\lambda a$ and $\lambda b$ in equations (2) to (13), either $\lambda a1$ and $\lambda b1$ or $\lambda a2$ and $\lambda b2$ can be used.

Figure 38:
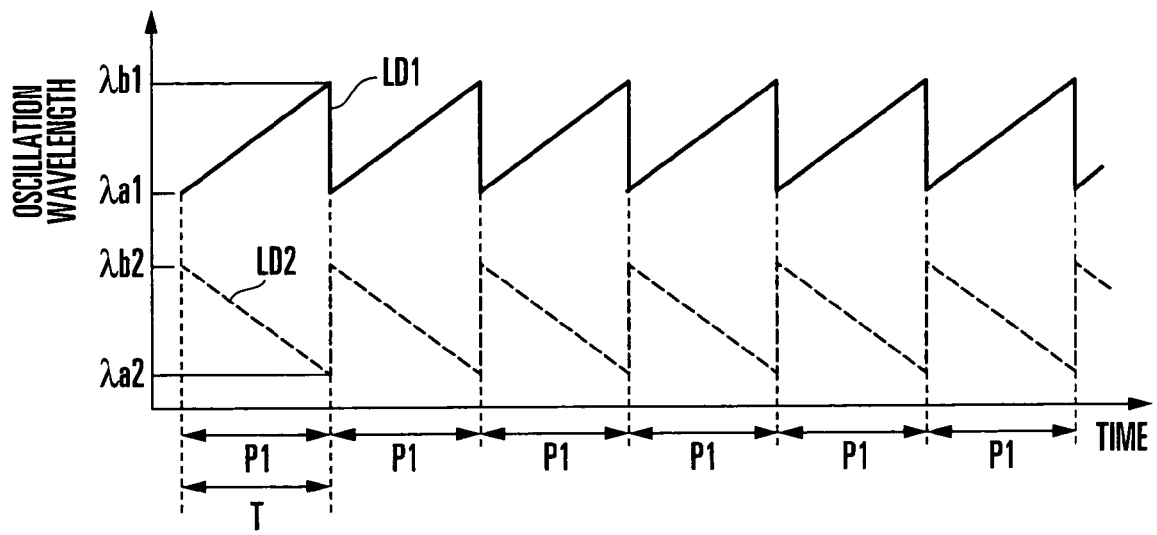
FIG. 38 is a timing chart showing still another example of a temporal change in the oscillation wavelength of each of the semiconductor lasers in the first to sixth embodiments of the present invention.
Figure 39:
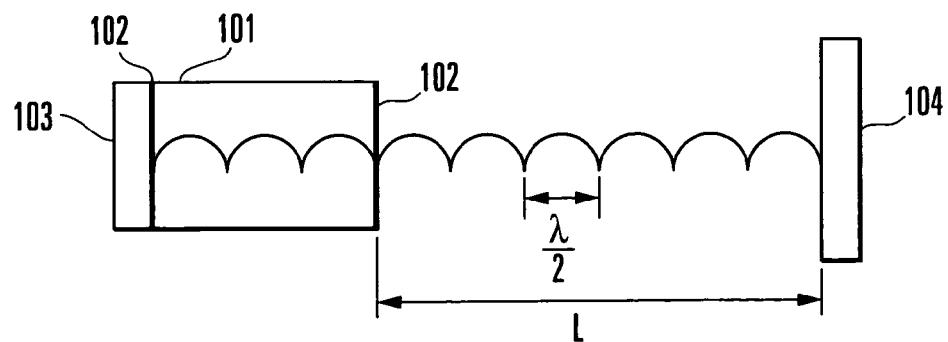
FIG. 39 is a view showing a complex cavity model of a semiconductor laser in a conventional laser measuring instrument.
Figure 40:
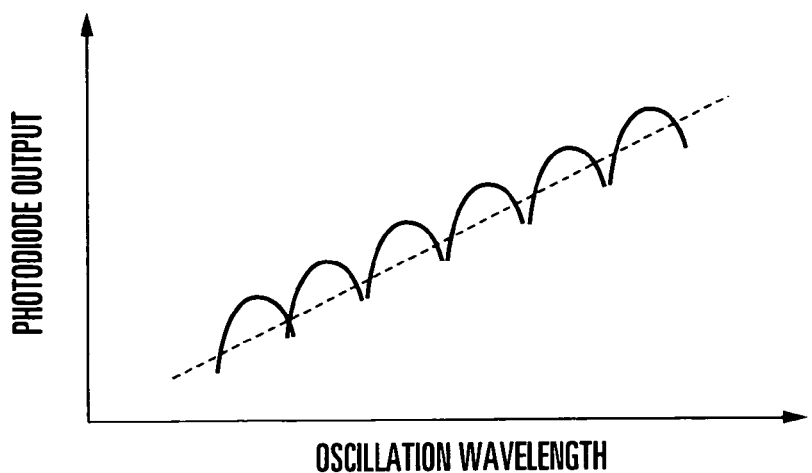
FIG. 40 is a graph showing the relationship between the oscillation wavelength of a semiconductor laser and the output waveform of a built-in photodiode.
Figure 41:
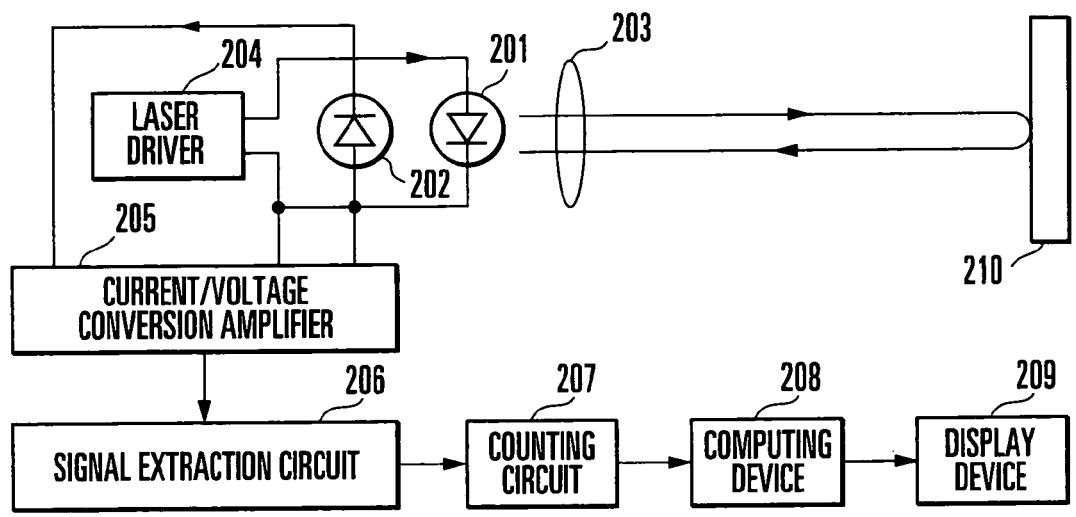
FIG. 41 is a block diagram showing the arrangement of a conventional distance/speed meter.
Figure 42:
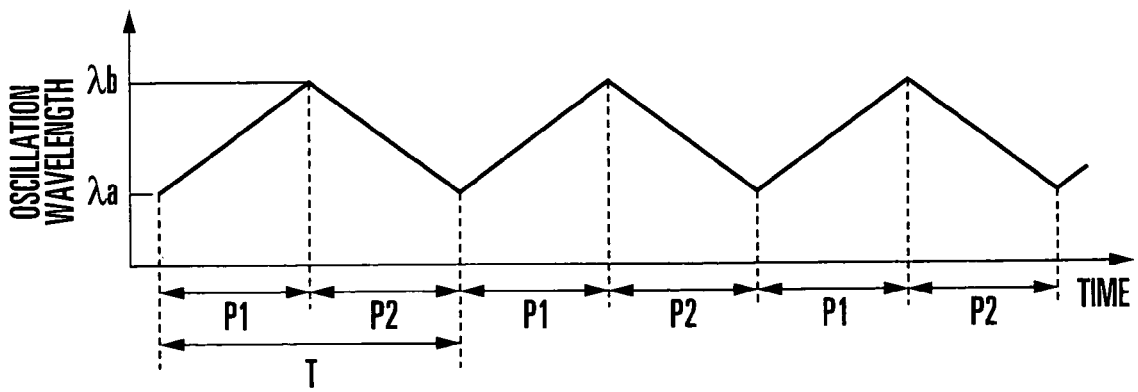
FIG. 42 is a timing chart showing an example of a temporal change in the oscillation wavelength of a semiconductor laser in the distance/speed meter in FIG. 41.

In addition, in the first to sixth embodiments, the semiconductor lasers 1-1 and 1-2 are oscillated in a triangular waveform. However, the present invention is not limited to this. As shown in FIG. 38, the semiconductor lasers 1-1 and 1-2 may be oscillated in a sawtooth waveform. That is, in the present invention, it suffices to operate the semiconductor laser 1-1 such that at least the first oscillation interval P1 repeatedly exists while operating the semiconductor laser 1-2 such that its oscillation wavelength increases and decreases inversely relative to the semiconductor laser 1-1. As in the case shown in FIG. 37, it suffices to set $\lambda a1 \neq \lambda a2$ and $\lambda b1 \neq \lambda b2$. As in the case shown in FIG. 2, it suffices to set $\lambda a1 = \lambda a2$ and $\lambda b1 = \lambda b2$.

The operation in a first oscillation interval P1 is the same as that in the case of triangular wave oscillation. When, however, the semiconductor lasers 1-1 and 1-2 are to be oscillated in a sawtooth waveform, it is necessary to fix the output of a switch 70 or 70*a* of a counting device 7. That is, the switch 70 or 70*a* always connects the output of a filter circuit 6-1 to the input of a period measuring unit 71-1 or a determination unit 73-1, and always connects the output of a filter circuit 6-2 to the input of a period measuring unit 71-2 or a determination unit 73-2.

Note that when the semiconductor lasers 1-1 and 1-2 are to be oscillated in a triangular waveform, the amplitude adjustment can be performed by the amplitude adjusting device 10 regardless of the state of the measurement target 11. When the semiconductor lasers 1-1 and 1-2 are to be oscillated in a sawtooth waveform, amplitude adjustment can be performed only when the measurement target 11 is a stationary state.

Interference type distance meters are based on the absolute requirement that when the distance to a measurement target is to be measured, the measurement target needs to be stationary. Therefore, they cannot measure distances to moving measurement targets. In contrast to this, the present invention can measure the distance to a measurement target which is not stationary. That is, the present invention can simultaneously measure the speed (magnitude and direction) of a measurement target and the distance to the measurement target. In addition, the present invention causes the first and second semiconductor lasers, whose oscillation wavelengths increase and decrease inversely to each other, to simultaneously emit parallel laser beams to a measurement target, and counts the numbers of interference waveforms contained in output signals from the first and second light-receiving devices for the respective output signals form the first and second light-receiving devices, thereby measuring a distance and a speed in a time shorter than that in the prior art.

In addition, the present invention uses the calculation result obtained by the hysteresis displacement calculating means when the state of a measurement target cannot be determined based on a speed candidate value. With this operation, it is possible to determine the state of the measurement target and calculate the distance to the measurement target and the speed of the measurement target.

In addition, in the present invention, the periods of an interference waveform in a counting interval are measured. The frequency distribution of the periods of the interference waveform in the counting interval is generated from the measurement result. A median of the periods of the interference waveform is calculated from this frequency distribution. The total sum Ns of periods in a class equal to or less than a first predetermined multiple of the median and the total sum Nw of periods in a class equal to or more than a second predetermined multiple of the median are obtained from the frequency distribution. The count result obtained by the counting means is corrected on the basis of the total sums Ns and Nw. This makes it possible to correct the interference waveform count error by removing the influences of omissions at the time of counting and excessive counting. It is therefore possible to improve the measurement accuracy of distances and speeds.

In addition, in the present invention, instead of causing the counting means to count the number of interference waveforms, the periods of a predetermined number of interference waveforms contained in an output signal from each of the first and second light-receiving devices are measured. The frequency distribution of the periods of the interference waveform is generated from the measurement result. A median of the periods of the interference waveform is calculated from this frequency distribution. The total sum Ns of periods in a class equal to or less than a first predetermined multiple of the median and the total sum Nw of periods in a class equal to or more than a second predetermined multiple of the median are obtained from the frequency distribution. The predetermined number of interference waveforms is corrected on the basis of the total sums Ns and Nw. This makes it possible to decrease the interference waveform count measurement error per unit time. It is therefore possible to further improve the measurement accuracy of distances and speeds.

The present invention adjusts the amplitude of at least one of driving currents supplied from the first and second laser drivers to the first and second semiconductor lasers such that a speed candidate value, of speed candidate values obtained on the assumption that a measurement target is in the minute displacement state and on the assumption that the measurement target is in the displacement state, which is not selected upon being determined not to be a true value by the distance/speed confirming means based on the determination result obtained by the state determination means becomes almost equal to the value obtained by multiplying the distance candidate value selected upon being determined as a true value by the distance/speed confirming means by the wavelength change rate of the first and second semiconductor lasers. This can make the absolute values of the wavelength change amounts of the first and second semiconductor lasers equal to each other, thereby improving the measurement accuracy of distances and speeds.

The present invention adjusts the amplitude of at least one of driving currents supplied from the first and second laser drivers to the first and second semiconductor lasers such that a speed or distance candidate value, of speed or distance candidate values obtained on the assumption that a measurement target is in the minute displacement state and on the assumption that the measurement target is in the displacement state, which is selected upon being determined to be a true value by the distance/speed confirming means based on the determination result obtained by the state determination means, keep its continuity before and after switching timings at which the oscillation wavelengths of the first and second semiconductor lasers change. This can make the absolute values of the wavelength change amounts of the first and second semiconductor lasers equal to each other, thereby improving the measurement accuracy of distances and speeds.

The present invention can be applied to a technique of measuring the distance to a measurement target and the speed of the measurement target.

What is claimed is:

1. A distance/speed meter comprising:
   a first semiconductor laser which emits first laser light to a measurement target;
   a second semiconductor laser which emits second laser light to the measurement target parallelly to the first laser light;
   a first laser driver which drives said first semiconductor laser such that an oscillation interval in which at least an oscillation wavelength monotonically increases repeatedly exists;
   a second laser driver which drives said second semiconductor laser such that an oscillation wavelength increases/decreases inversely to the oscillation wavelength of said first semiconductor laser;
   a first light-receiving device which converts at least an optical output from said first semiconductor laser into an electrical signal;
   a second light-receiving device which converts at least an optical output from said second semiconductor laser into an electrical signal;
   counting means for counting the number of interference waveforms generated by the first laser light and return light of the laser light from the measurement target and contained in an output signal from said first light-receiving device, and the number of interference waveforms generated by the second laser light and return light of the laser light from the measurement target and contained in an output signal from said second light-receiving device; and
   computing means for calculating at least one of a distance to the measurement target and a speed of the measurement target from a minimum oscillation wavelength and a maximum oscillation wavelength of said first semiconductor laser and said second semiconductor laser and a count result obtained by said counting means.

2. A meter according to claim 1, wherein
   said first light-receiving device converts first laser light and return light thereof into electrical signals, and
   said second light-receiving device converts second laser light and return light thereof into electrical signals.

3. A meter according to claim 1, wherein said counting means counts the number of interference waveforms generated by a self-mixing effect between first laser light, second laser light, return light of the first laser light, and the return light of the second laser light.

4. A meter according to claim 1, wherein
   said counting means obtains the number of interference waveforms contained in an output signal from a light-receiving device corresponding to a semiconductor laser, of said first semiconductor laser and said second semiconductor laser, whose oscillation wavelength has increased, in a first counting interval shorter than an oscillation interval of said first semiconductor laser and an oscillation interval of said second semiconductor laser, and obtains the number of interference waveforms contained in an output signal from a light-receiving device corresponding to a semiconductor laser, of said first semiconductor laser and said second semiconductor laser, whose oscillation wavelength has decreased, in a second counting interval starting and ending at the same time as the first oscillation interval, and said computing means comprises distance/speed calculating means for calculating a candidate value of a distance to a measurement target and a candidate value of a speed of the measurement target on the basis of a minimum oscillation wavelength and a maximum oscillation wavelength of said first semiconductor laser and said second semiconductor laser and a count result obtained by said counting means, state determination means for determining a state of the measurement target on the basis of a speed candidate value calculated by said distance/speed calculating means, and distance/speed confirming means for confirming at least one of the distance to the measurement target and the speed of the measurement target on the basis of a determination result obtained by said state determination means.

5. A meter according to claim 4, wherein said distance/speed calculating means calculates a first candidate value of the speed and a first candidate value of the distance from a count result obtained in a first counting interval and a count result obtained in a second counting interval immediately succeeding the first counting interval on the assumption that the measurement target is in the minute displacement state, calculates a second candidate value of the speed and a second candidate value of the distance from a count result obtained in a second counting interval starting and ending at the same time as the first counting interval, in which the first candidate values are calculated, and a count result obtained in a first counting interval starting and ending at the same time as the second counting interval, in which the first candidate values are calculated, calculates a third candidate value of the speed and a third candidate value of the distance from a count result obtained in a first counting interval and a count result obtained in a second counting interval immediately succeeding the first counting interval on the assumption that the measurement target is in the displacement state in which the measurement target moves faster than in the minute displacement state, and calculates a fourth candidate value of the speed and a fourth candidate value of the distance from a count result obtained in a second counting interval starting and ending at the same time as the first counting interval, in which the third candidate values are calculated, and a count result obtained in a first counting interval starting and ending at the same time as the second counting interval, in which the third candidate values are calculated, and said state determination means determines that the measurement target is in the minute displacement state, when the first candidate value of the speed and the second candidate value of the speed calculated by said distance/speed calculating means are substantially equal to each other, and determines that the measurement target is in the displacement state, when the third candidate value of the speed and the fourth candidate value of the speed calculated by said distance/speed calculating means are substantially equal to each other.

6. A meter according to claim 5, wherein said distance/speed confirming means confirms one of the first candidate value and the second candidate value of the speed as a speed of the measurement target and confirms one of the first candidate value and the second candidate value of the distance as a distance to the measurement target when said state determination means determines that the measurement target is in the minute displacement state, while confirming one of the third candidate value and the fourth candidate value of the speed as the speed of the measurement target and confirms one of the third candidate value and the fourth candidate value of the distance as the distance to the measurement target when said state determination means determines that the measurement target is in the displacement state.

7. A meter according to claim 5, wherein said distance/speed confirming means confirms an average value of the first candidate value and the second candidate value of the speed as the speed of the measurement target and confirms an average value of the first candidate value and the second candidate value of the distance as the distance to the measurement target when said state determination means determines that the measurement target is in the minute displacement state, while confirming an average value of the third candidate value and the fourth candidate value of the speed as the speed of the measurement target and confirming an average value of the third candidate value and the fourth candidate value of the distance as the distance to the measurement target when said state determination means determines that the measurement target is in the displacement state.

8. A meter according to claim 5, wherein said distance/speed confirming means compares a sum $\Sigma X$ of a count result obtained in a first counting interval, in which the first candidate value of the speed is calculated, and a count result obtained in the first counting interval, in which the second candidate value of the speed is calculated, with a sum $\Sigma Y$ of a count result obtained in a second counting interval, in which the first candidate value of the speed is calculated, and a count result obtained in the second counting interval, in which the second candidate value of the speed is calculated, and determines that the measurement target is approaching, if the sum $\Sigma X$ is larger than the sum $\Sigma Y$, while determining that the measurement target is moving away, if the sum $\Sigma Y$ is larger than the sum $\Sigma X$.

9. A meter according to claim 5, wherein said computing means further comprises hysteresis displacement calculating means for calculating hysteresis displacements as differences between distance candidate values and immediately preceding distance candidate values calculated by said distance/speed calculating means on the assumption that the measurement target is in the minute displacement state and on the assumption that the measurement target is in the displacement state, respectively, and said state determination means determines a state of the measurement target on the basis of a calculation result obtained by said hysteresis displacement calculating means when the state of the measurement target cannot be determined on the basis of a speed candidate value.

10. A meter according to claim 1, wherein said counting means comprises counters which respectively count the numbers of interference waveforms contained in output signals from said first light-receiving device and said second light-receiving device, period measuring means for measuring periods of interference waveforms of output signals from said first light-receiving device and said second light-receiving device during a counting interval in which interference waveforms are counted, every time an interference waveform is input, frequency distribution generating means for generating frequency distributions of periods of interference waveforms of output signals from said first light-receiving device and said second light-receiving device, respectively, during a counting interval from measurement result obtained by said period measuring means, median calculating means for calculating medians of periods of interference waveforms of output signals from said first light-receiving device and said second light-receiving device, respectively, from the frequency distributions generated by said frequency distribution generating means, correction value calculating means for obtaining a total sum Ns of frequencies in a class not more than a first predetermined multiple of the median calculated by said median calculating means and a total sum Nw of frequencies in a class not less than a second predetermined multiple of the median from the frequency distributions generated by said frequency distribution generating means, and correcting count results on the output signals from said first light-receiving device and said second light-receiving device, which are obtained by said counters, on the basis of the frequencies Ns and Nw, period sum calculating means for calculating total sums of periods of interference waveforms of output signals from said first light-receiving device and said second light-receiving device from measurement results obtained by said period measuring means, and count calculating means for calculating the numbers of interference waveforms of output signals from said first light-receiving device and said second light-receiving device per unit time from the count results corrected by said correction value calculating means and the total sums of periods calculated by said period sum calculating means.

11. A meter according to claim 10, wherein said correction value calculating means obtains a value N' after correction according to N'=N+Nw−Ns where N is a count result obtained by said counter.

12. A meter according to claim 11, wherein the first predetermined multiple is 0.5 and the second predetermined multiple is 1.5.

13. A meter according to claim 1, wherein said counting means comprises period measuring means for respectively measuring periods of predetermined numbers of interference waveforms contained in output signals from said first light-receiving device and said second light-receiving device every time interference waveforms of output signals from said first light-receiving device and said second light-receiving device are input, frequency distribution generating means for generating frequency distributions of periods of interference waveforms of output signals from said first light-receiving device and said second light-receiving device from measurement results obtained by said period measuring means, median calculating means for calculating medians of periods of interference waveforms of output signals from said first light-receiving device and said second light-receiving device from frequency distributions generated by said frequency distribution generating means, correction value calculating means for obtaining a total sum Ns of frequencies in a class not more than a first predetermined multiple of the median calculated by said median calculating means and a total sum Nw of frequencies in a class not less than a second predetermined multiple of the median from the frequency distributions generated by said frequency distribution generating means, and correcting the numbers of interference waveforms of output signals from said first light-receiving device and said second light-receiving device which are used for measurement of periods on the basis of the frequencies Ns and Nw, period sum calculating means for calculating total sums of periods of interference waveforms of output signals from said first light-receiving device and said second light-receiving device from measurement results obtained by said period measuring means, and count calculating means for calculating the numbers of interference waveforms of output signals from said first light-receiving device and said second light-receiving device per unit time from the numbers of interference waveforms corrected by said correction value calculating means and the total sums of periods calculated by said period sum calculating means.

14. A meter according to claim 13, wherein said correction value calculating means obtains a number N' after correction according to N'=N+Nw−Ns where N is the number of interference waveforms used for measurement of periods.

15. A meter according to claim 14, wherein the first predetermined multiple is 0.5 and the second predetermined multiple is 1.5.

16. A meter according to claim 13, wherein said period measuring means obtains a period of interference waveforms contained in an output signal from a light-receiving device corresponding to a semiconductor laser, of said first semiconductor laser and said second semiconductor laser, whose oscillation wavelength has increased, in a first counting interval shorter than an oscillation interval of said first semiconductor laser and an oscillation interval of said second semiconductor laser, and simultaneously obtains a period of interference waveforms contained in an output signal from a light-receiving device corresponding to a semiconductor laser, of said first semiconductor laser and said second semiconductor laser, whose oscillation wavelength has decreased, in a second counting interval starting and ending at the same time as the first oscillation interval.

17. A distance/speed measuring method comprising the steps of:

driving a first semiconductor laser which emits first laser light to a measurement target such that an oscillation interval in which at least an oscillation wavelength continuously monotonically increases repeatedly exists;

driving a second semiconductor laser which emits second laser light to the measurement target parallelly to the first laser light such that an oscillation wavelength increases/decreases inversely to an oscillation wavelength of the first semiconductor laser;

counting the number of interference waveforms generated by the first laser light and return light of the laser light from the measurement target and contained in an output signal from a first light-receiving device, and the number of interference waveforms generated by the second laser light and return light of the laser light from the measurement target and contained in an output signal from a second light-receiving device; and calculating at least one of a distance to the measurement target and a speed of the measurement target from a minimum oscillation wavelength and a maximum oscillation wavelength of the first semiconductor laser and the second semiconductor laser and the numbers of interference waveforms of the first laser light and the second laser light.

18. A method according to claim 17, further comprising the steps of:
  causing the first light-receiving device to convert the first laser light and the return light of the first laser light into electrical signals, and
  causing the second light-receiving device to convert the second laser light and the return light of the second laser light into electrical signals.

19. A method according to claim 17, further comprising the steps of:
  causing the first light-receiving device to convert an optical output from the first semiconductor laser into an electrical signal; and
  causing the second light-receiving device to convert an optical output from the second semiconductor laser into an electrical signal
  wherein the step of counting comprises the step of counting the number of interference waveforms generated by a self-mixing effect between first laser light, second laser light, return light of the first laser light, and return light of the second laser light.

* * * * *